(12) United States Patent
Park et al.

(10) Patent No.: US 10,528,222 B2
(45) Date of Patent: Jan. 7, 2020

(54) APPLICATION EXECUTION METHOD BY DISPLAY DEVICE AND DISPLAY DEVICE THEREOF

(71) Applicant: Samsung Electronics Co., Ltd., Suwon-si, Gyeonggi-do (KR)

(72) Inventors: Dae-wook Park, Suwon-si (KR); Young-jin Kim, Suwon-si (KR); Jae-yeol Lee, Seongnam-si (KR); Tae-soo Kim, Suwon-si (KR); Jung-hwan Choi, Seoul (KR); Kang-tae Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 14/912,530

(22) PCT Filed: Aug. 14, 2014

(86) PCT No.: PCT/KR2014/007563
§ 371 (c)(1),
(2) Date: Feb. 17, 2016

(87) PCT Pub. No.: WO2015/026101
PCT Pub. Date: Feb. 26, 2015

(65) Prior Publication Data
US 2016/0202852 A1 Jul. 14, 2016

(30) Foreign Application Priority Data

Aug. 22, 2013 (KR) .......................... 10-2013-0099927

(51) Int. Cl.
*G06F 3/0482* (2013.01)
*G06F 3/0481* (2013.01)
(Continued)

(52) U.S. Cl.
CPC ........ *G06F 3/0482* (2013.01); *G06F 3/04817* (2013.01); *G06F 3/04842* (2013.01); *G06F 3/04845* (2013.01); *G06F 3/04883* (2013.01)

(58) Field of Classification Search
CPC .................. G06F 3/04886; G06F 2203/04803
See application file for complete search history.

(56) References Cited

U.S. PATENT DOCUMENTS 5,682,550 A * 10/1997 Brown .................. G06F 9/4418
710/10
8,208,964 B2 6/2012 Dobroth et al.
(Continued)

FOREIGN PATENT DOCUMENTS

CN 101606124 A 12/2009
KR 10-2009-0024508 A 3/2009
(Continued)

OTHER PUBLICATIONS

Chinese Office Action dated Sep. 5, 2018; Application #: 201480058455.7.

*Primary Examiner* — Christopher J Fibbi
*Assistant Examiner* — James T Tsai
(74) *Attorney, Agent, or Firm* — Jefferson IP Law, LLP

(57) ABSTRACT

Disclosed is a method for executing at least one application by a display device having a touch screen. An application execution method according to the present invention may include the steps of: displaying a window for executing an application in each of a plurality of areas arranged on a touch screen; displaying a button on at least one boundary line dividing the plurality of areas; receiving an input for selecting the button; and displaying, in a predetermined area, on the basis of the received input, a list of at least one application executed in the predetermined area among the plurality of areas.

14 Claims, 47 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 8,302,026 B2 | 10/2012 | Wang et al. | |
| 8,549,429 B2 | 10/2013 | Tsuruta et al. | |
| 8,584,050 B2 | 11/2013 | Carding et al. | |
| 2008/0034317 A1* | 2/2008 | Fard | G06F 3/0481 715/781 |
| 2009/0119589 A1* | 5/2009 | Rowell | G06F 3/04817 715/716 |
| 2009/0293007 A1 | 11/2009 | Duarte et al. | |
| 2010/0081475 A1 | 4/2010 | Chiang et al. | |
| 2010/0088634 A1 | 4/2010 | Tsuruta et al. | |
| 2010/0138767 A1* | 6/2010 | Wang | G06F 3/0481 715/769 |
| 2011/0099512 A1 | 4/2011 | Jeong | |
| 2012/0169768 A1 | 7/2012 | Roth et al. | |
| 2012/0174020 A1* | 7/2012 | Bell | G06F 3/0481 715/779 |
| 2013/0311932 A1 | 11/2013 | Sareen et al. | |
| 2013/0346912 A1* | 12/2013 | Buening | G06F 3/0488 715/783 |
| 2014/0298272 A1* | 10/2014 | Doan | G06F 3/017 715/863 |
| 2014/0310642 A1* | 10/2014 | Vranjes | G06F 3/0481 715/781 |
| 2014/0351722 A1* | 11/2014 | Frederickson | G06F 9/4443 715/761 |
| 2015/0015520 A1* | 1/2015 | Narita | G06F 3/0485 345/173 |

FOREIGN PATENT DOCUMENTS

| | | |
|---|---|---|
| KR | 10-2011-0085189 A | 7/2011 |
| KR | 10-1173982 B1 | 8/2012 |
| KR | 10-2013-0054072 A | 5/2013 |

* cited by examiner

FIG. 6V
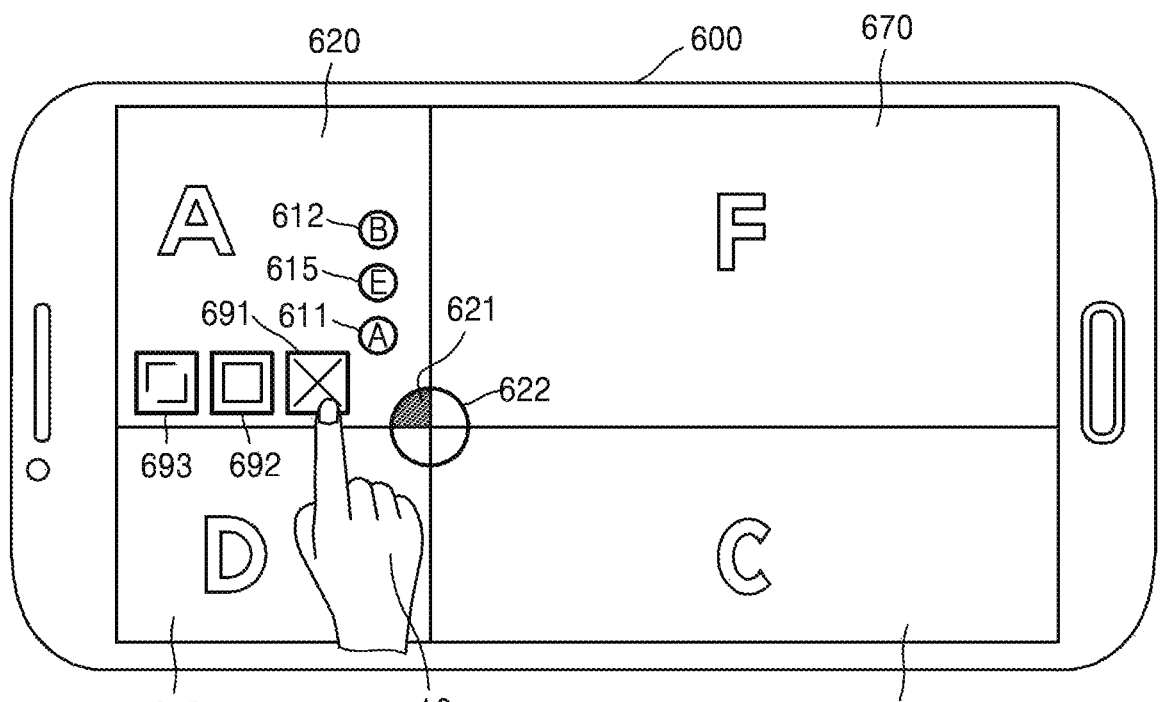
(a)
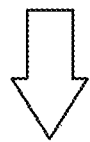
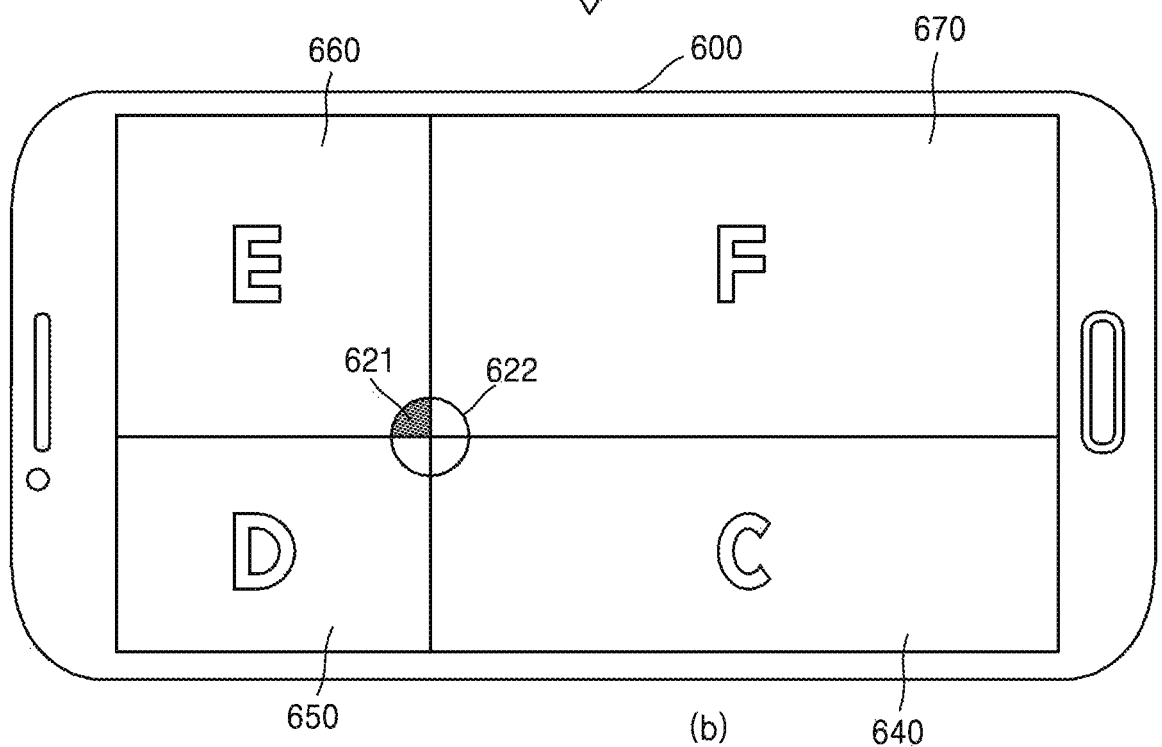
(b)

FIG. 6W
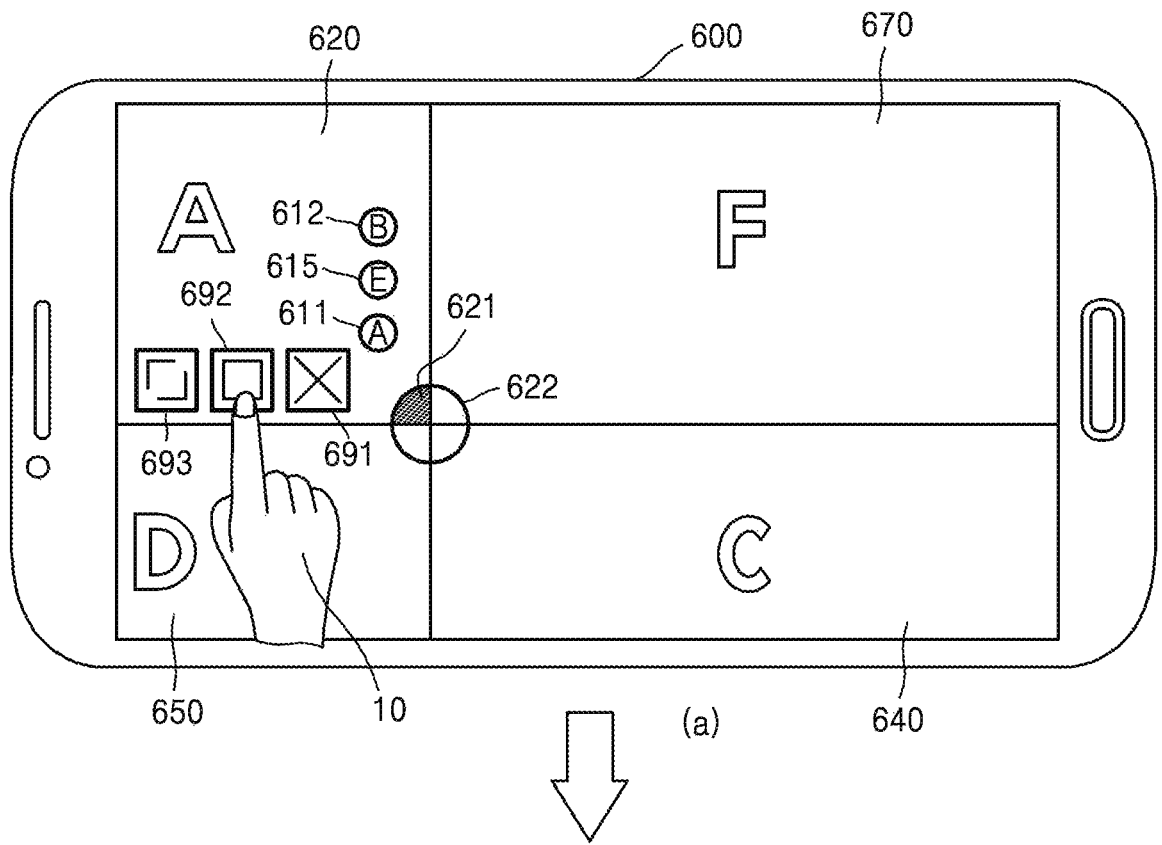
(a)
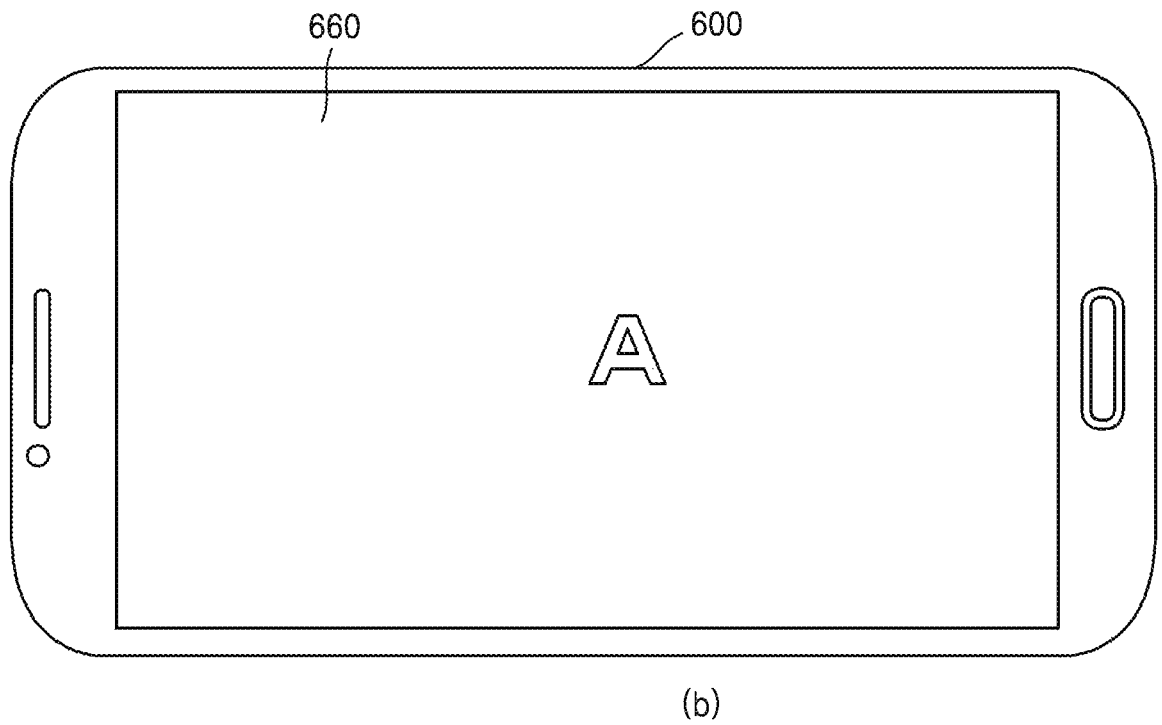
(b)

FIG. 7A

| A | Region F |
|---|---|

APPLICATION    REGION

FIG. 7B

| B | Region 6 |
|---|---|
| A | Region 5 |

APPLICATION    REGION

FIG. 7C

| C | Region 4 |
|---|---|
| B | Region 2 |
| A | Region 5 |

APPLICATION    REGION

FIG. 7D

| D | Region 3 |
|---|---|
| C | Region 4 |
| B | Region 2 |
| A | Region 1 |

APPLICATION    REGION

FIG. 7E

| E | Region 7 |
|---|---|
| D | Region 3 |
| C | Region 4 |
| B | Region 7 |
| A | Region 7 |

APPLICATION　　REGION

FIG. 7F

| F | Region 2 |
|---|---|
| E | Region 1 |
| D | Region 3 |
| C | Region 4 |
| B | Region 1 |
| A | Region 1 |

APPLICATION　　REGION

FIG. 7G

| F | Region 2 |
|---|---|
| E | Region 1 |
| D | Region 3 |
| C | Region 4 |
| B | Region 1 |
| A | Region 1 |

APPLICATION　　REGION

| E | Region 1 |
|---|---|
| F | Region 2 |
| D | Region 3 |
| C | Region 4 |
| B | Region 1 |
| A | Region 1 |

APPLICATION　　REGION

FIG. 7H

| APPLICATION | REGION |
|---|---|
| E | Region 1 |
| F | Region 2 |
| D | Region 3 |
| C | Region 4 |
| B | Region 1 |
| A | Region 1 |

| APPLICATION | REGION |
|---|---|
| A | Region 1 |
| E | Region 1 |
| F | Region 2 |
| D | Region 3 |
| C | Region 4 |
| B | Region 1 |

FIG. 7I

| APPLICATION | REGION |
|---|---|
| A | Region 1 |
| E | Region 1 |
| F | Region 2 |
| D | Region 3 |
| C | Region 4 |
| B | Region 1 |

| APPLICATION | REGION |
|---|---|
| B | Region 4 |
| A | Region 1 |
| E | Region 1 |
| F | Region 2 |
| D | Region 3 |
| C | Region 4 |

FIG. 7J

| APPLICATION | REGION |
|---|---|
| A | Region 1 |
| E | Region 1 |
| F | Region 2 |
| D | Region 3 |
| C | Region 4 |
| B | Region 1 |

| APPLICATION | REGION |
|---|---|
| E | Region 1 |
| F | Region 2 |
| D | Region 3 |
| C | Region 4 |
| B | Region 1 |

FIG. 11C
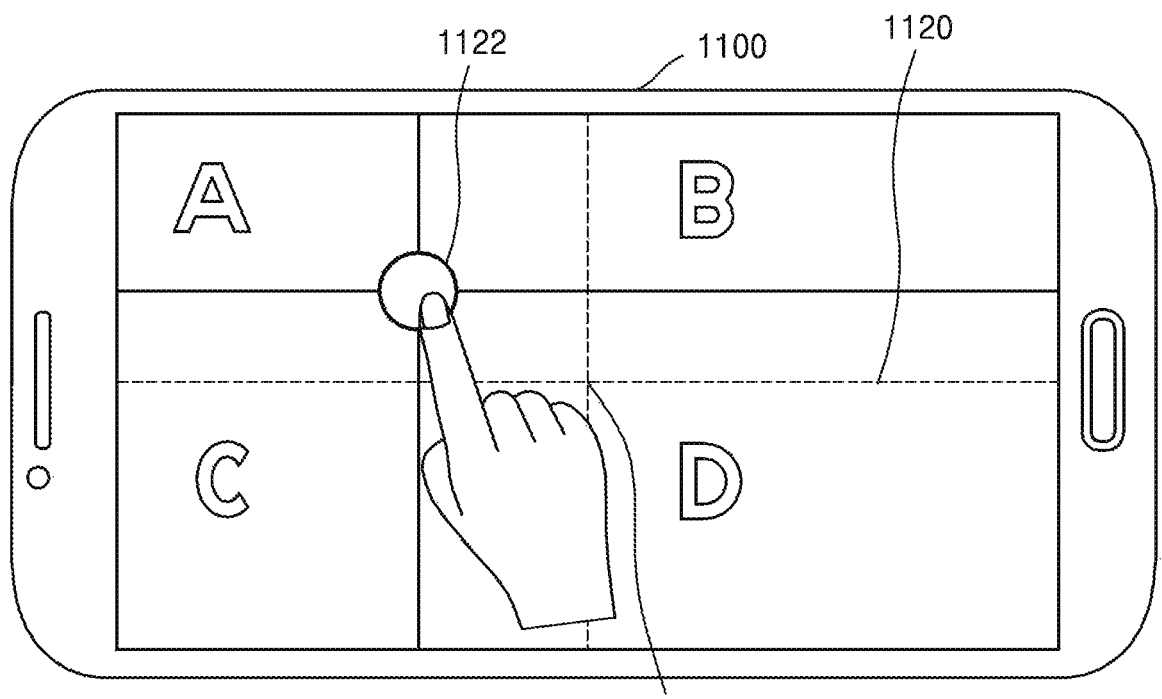
(a)
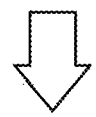
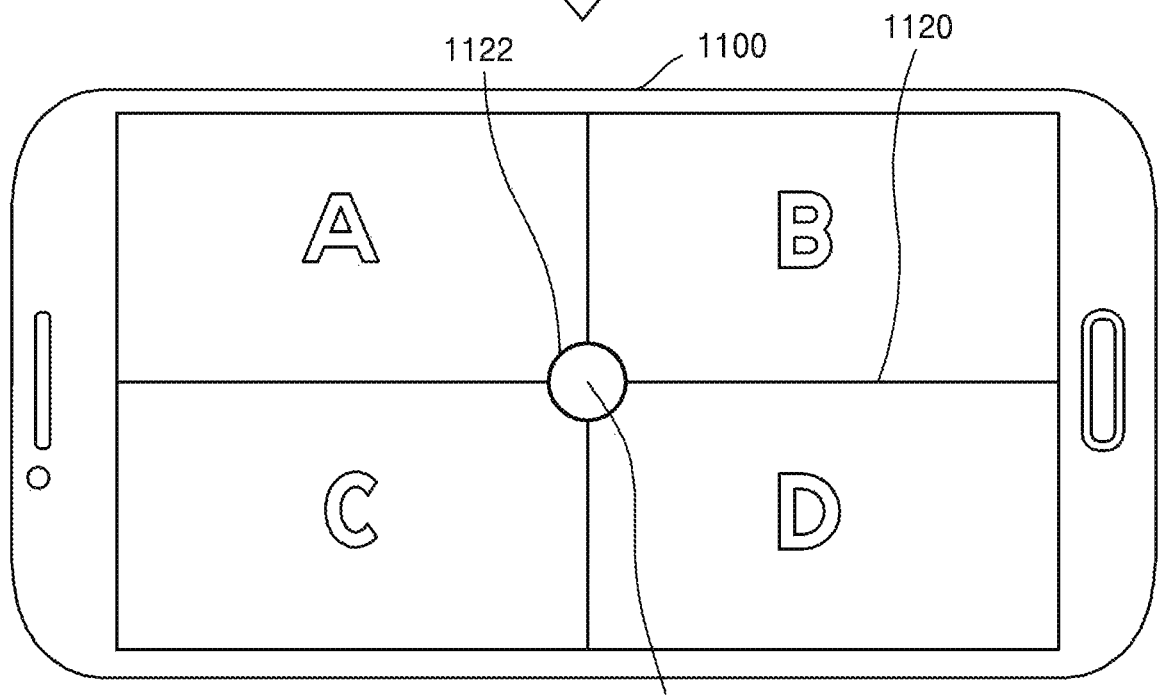
(b)

APPLICATION EXECUTION METHOD BY DISPLAY DEVICE AND DISPLAY DEVICE THEREOF

TECHNICAL FIELD

The present invention is related to a method of executing an application by using a display device, and the display device, and more particularly, to a method of executing at least one application, performed by a display device using an application execution window, and the display device.

BACKGROUND ART

A desktop computer or a mobile device (e.g., a mobile phone, a smartphone, or a tablet PC) using a touch screen may include at least one display device.

In the case of a desktop computer, a user may divide a screen of a display device according to work environments. When a web browser is opened, a 'page up' button or a 'page down' button on a keyboard may be used to move a web page up or down. When a mouse is used instead of the keyboard, a scroll bar at a side of the web page may be selected by using a cursor of the mouse to move the web page up or down.

In comparison, a mobile device has a relatively small output screen size, and input methods thereof are limited. It may be difficult to divide a screen of the mobile device and use the mobile device.

Also, along with the size reduction of high-performance hardware, various applications may also be executed in the mobile device. Basic applications that are installed in the mobile device by a manufacturer and various applications that are developed by general users may be executed in the mobile device.

Although various applications for satisfying user demands are provided in the mobile device, since the mobile device is manufactured to a portable size, a display size and a user interface (UI) are limited. Therefore, it may be inconvenient for the user to execute a plurality of applications in the mobile device. For example, in the mobile device, an application execution screen is displayed on an entire area of a display to execute a single application. Afterward, in order to execute another application, the displayed application has to be closed first, and then the other application has to be executed. That is, execution and closing processes for each application have to be repeated in the mobile device to execute various applications.

Therefore, technology for displaying a plurality of application execution windows on a display has to be developed. Also, while displaying the plurality of application execution windows, a user interface for controlling the plurality of application execution windows as a user desires is necessary.

DETAILED DESCRIPTION OF THE INVENTION

Technical Problem

Embodiments of the present invention provide a method of executing an application for easily controlling a plurality of application execution windows while displaying the plurality of application execution windows on a display of a display device, and the display device.

Technical Solution

A method of executing an application by using a display device that includes a touch screen may include displaying an application execution window in each of a plurality of regions on the touch screen, displaying a button on at least one boundary line that divides the plurality of regions, receiving an input of selecting the button, and displaying, based on the input, on a predetermined region from among the plurality of regions, a list of at least one application that is executed in the predetermined region.

Advantageous Effect

According to some embodiments of the present invention, a user interface, via which a plurality of applications may be executed and a plurality of application execution windows may be easily controlled by a user, may be provided to the user.

DESCRIPTION OF THE DRAWINGS

FIGS. 7A to 7J are conceptual diagrams of an activity stack, according to other embodiments.

FIGS. 11A to 11D are diagrams for describing a method of displaying a button, according to some embodiments.

BEST MODE

Figure 1:
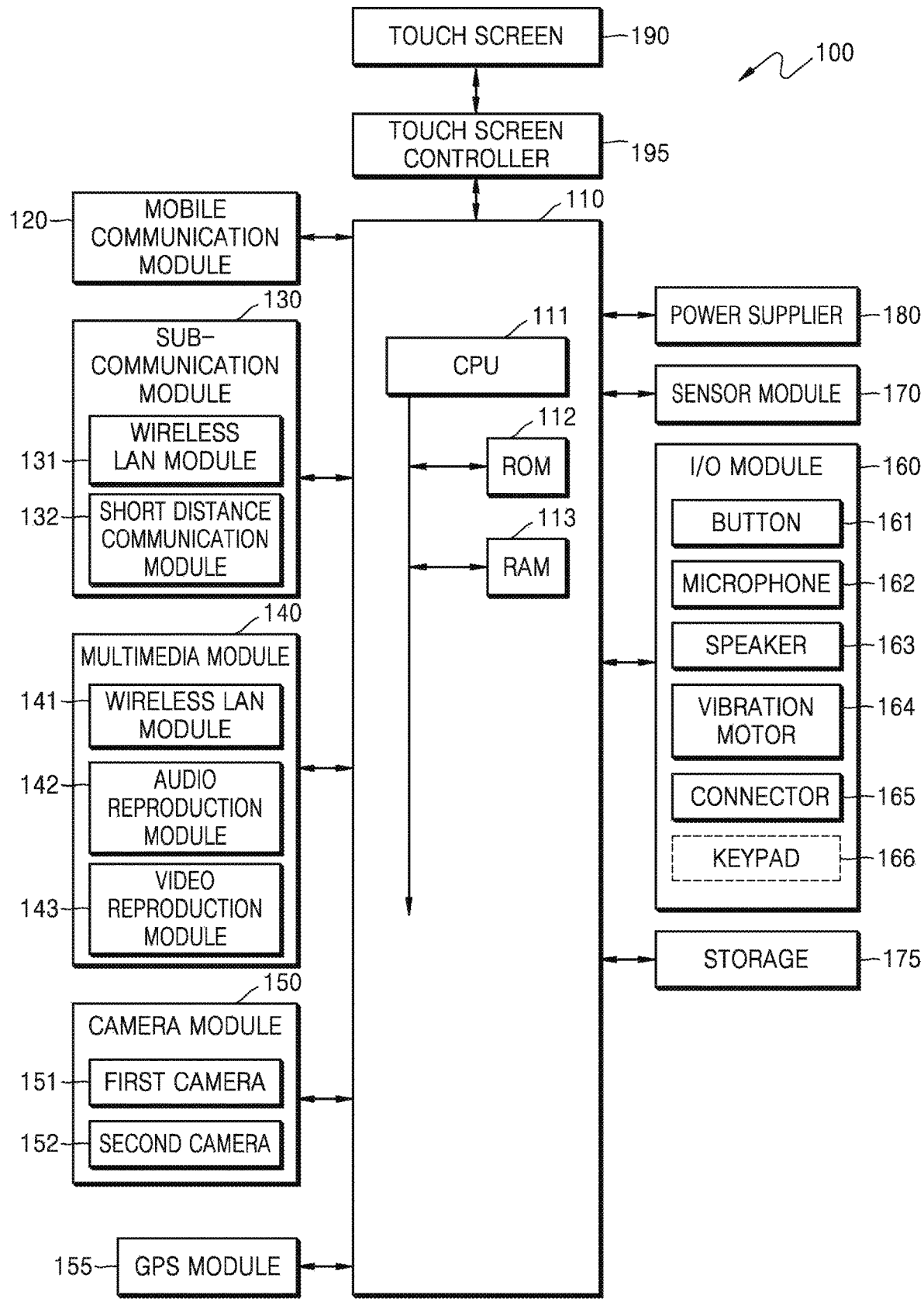
FIG. 1 is a block diagram of a display device according to some embodiments.

According to some embodiments, a method of executing an application by using a display device that includes a touch screen includes displaying an application execution window in each of a plurality of regions on the touch screen, displaying a button on at least one boundary line that divides the plurality of regions, receiving an input of selecting the button, and displaying, based on the input, on a predetermined region from among the plurality of regions, a list of at least one application that is executed in the predetermined region.

According to another embodiment, the predetermined region includes an active region that is controllable by an input from a user.

According to another embodiment, the active region is a region that is selected last from among the plurality of regions before receiving the input of selecting the button.

According to another embodiment, the method further includes displaying an indicator that indicates the active region on the button.

According to another embodiment, the method further includes receiving an input of selecting at least one application from applications in the list, and displaying an execution window of the selected application on the selected region.

According to another embodiment, the displaying of the list includes displaying a list of at least one icon that represents the at least one application, and the method further includes displaying a touch input of dragging an icon in the list of the at least one icon, and displaying, on a region corresponding to a location where the touch input ends, an execution window of an application that corresponds to the icon.

According to another embodiment, the displaying of the list includes further displaying, on the predetermined region, an icon that represents an operation related to an application execution window displayed in the predetermined region.

According to another embodiment, the icon includes at least one selected from a capture button that captures the application execution window displayed in the predetermined region, a close button that closes the application execution window displayed in the predetermined region, and a full screen button that displays the application execution window displayed in the predetermined region on an entire area of the touch screen.

According to some embodiments, a method of executing an application by using a display device that includes a touch screen includes displaying an application execution window in each of a plurality of regions on the touch screen, displaying a button on at least one boundary line that divides the plurality of regions, displaying a list of at least one application execution icon on a portion of the touch screen, receiving an input of dragging an application execution icon in the list, determining a new application execution region based on a location where the input ends and a location of the button, and displaying an execution window of an application that corresponds to the application execution icon on the determined new application execution region.

According to another embodiment, the determining of the new application execution region includes determining the new application execution region such that, when the location where the input ends is within a boundary region that includes the at least one boundary line, the new application execution region includes areas near the at least one boundary line.

According to some embodiments, a display device includes a touch screen displaying an application execution window in each of a plurality of regions, displaying a button on at least one boundary line that divides the plurality of regions, and receiving an input of selecting the button, and a controller controlling, based on the input, the touch screen such that a list of at least one application executed in a predetermined region from among the plurality of regions is displayed on the predetermined region.

According to another embodiment, the predetermined region includes an active region that is controllable by an input from a user.

According to another embodiment, the active region is a region that is selected last from among the plurality of regions before receiving the input of selecting the button.

According to another embodiment, the controller controls the touch screen such that an indicator indicating the active region on the button is displayed.

According to another embodiment, the touch screen receives an input of selecting at least one application from applications in the list, and the controller controls the touch screen such that an execution window of the selected application is displayed on the selected region.

According to another embodiment, the touch screen displays a list of at least one icon that represents the at least one application, and receives a touch input of dragging an icon in the list of the at least one icon, and the controller controls the touch screen such that an execution window of an application that corresponds to the icon is displayed on a region corresponding to a location where the touch input ends.

According to another embodiment, the touch screen further displays, on the predetermined region, an icon that represents an operation related to an application execution window displayed in the predetermined region.

According to another embodiment, the icon includes at least one selected from a capture button that captures the application execution window displayed in the predetermined region, a close button that closes the application execution window displayed in the predetermined region, and a full screen button that displays the application execution window displayed in the predetermined region on an entire area of the touch screen.

According to some embodiments, a display device includes a touch screen displaying an application execution window in each of a plurality of regions, displaying a button on at least one boundary line that divides the plurality of regions, and a list of at least one application execution icon on the touch screen, and receiving an input of dragging an application execution icon in the list, and a controller determining a new application execution region based on a location where the input ends and a location of the button, and controlling the touch screen such that an execution window of an application that corresponds to the application execution icon is displayed on the determined new application execution region According to another embodiment, the controller determines the new application execution region such that, when the location where the input ends is within a boundary region that includes the at least one boundary line, the new application execution region includes areas near the at least one boundary line.

According to some embodiments, a method of controlling a display device that includes a touch screen includes displaying, on the touch screen, a button that is moved according to a touch input of a user, displaying, on the touch screen, a user interface for controlling the display device, according to a display location of the button on the touch screen, and controlling the display device when a user input with respect to the user interface displayed on the screen is received.

According to another embodiment, the user interface includes at least one layout button that determines a display method of an application execution window, and the controlling of the display device includes displaying at least one application execution window based on a display method that is determined when an input of selecting one from the at least one layout button is received.

According to another embodiment, the displaying of the user interface on the touch screen includes obtaining coordinates that indicate a location of the button on the touch screen, and displaying, when there is an application execution window corresponding to the coordinates, a user interface that corresponds to an application displayed on the application execution window corresponding to the coordinates.

According to another embodiment, the application execution window corresponding to the coordinates includes an application execution window displayed in a region including the coordinates.

According to another embodiment, the user interface includes an application list that includes at least one selected from an application that is being executed by the display device and an application installed in the display device, and the controlling of the display device includes executing an application that is selected according to an input of the user from the application list.

According to some embodiments, a display device includes a touch screen receiving a touch input of a user, displaying a button that is moved according to the touch input, and displaying, on the touch screen, a user interface for controlling the display device according to a display location of the button, and a controller controlling the display device when an input with respect to the user interface displayed on the touch screen is received from the user.

According to another embodiment, the user interface includes at least one layout button that determines a display method of an application execution window, the controller determines a display method when an input of selecting one from the at least one layout button is received, and the touch screen displays at least one application execution window based on the determined display method.

According to another embodiment, the controller obtains coordinates that indicate a location of the button on the touch screen, determines whether there is an application execution window that corresponds to the coordinates, and when there is an application execution window that corresponds to the coordinates, the touch screen displays a user interface that corresponds to an application displayed on the application execution window corresponding to the coordinates.

According to another embodiment, the application execution window corresponding to the coordinates includes an application execution window displayed in a region including the coordinates.

According to another embodiment, the user interface includes an application list that includes at least one selected from an application that is being executed by the display device and an application installed in the display device, and the controlling of the display device includes executing an application that is selected according to an input of the user from the application list.

According to some embodiments, a non-transitory computer-readable recording medium having recorded thereon a program, which, when executed by a computer, performs the method described above.

MODE OF THE INVENTION

Hereinafter, embodiments of the present invention will now be described more fully with reference to the accompanying drawings so that this disclosure will be thorough and complete, and will fully convey the present invention to one of ordinary skill in the art. The present invention may, however, be embodied in many different forms and should not be construed as being limited to the embodiments set forth herein. Features that are unnecessary for clearly describing the present invention are not included in the drawings. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a portion "includes" an element, another element may be further included, rather than excluding the existence of the other element, unless otherwise described.

In the present specification, "touch" or "touch input" may not only indicate directly touching, but also a case in which a display device detects the body of a user that is near (e.g., within 2 cm) the display device.

Also, in the present specification, "drag" indicates a case where the user is touching the display device and moving a touched point on the display device.

Hereinafter, the present invention will be described in detail with reference to the accompanying drawings.

FIG. 1 is a block diagram of a display device according to some embodiments. FIG. 1 is merely a display device according to an embodiment. A display device according to the present invention may include more or less components than those illustrated in FIG. 1.

A display device 100 may be connected with an external device (not shown) by using a mobile communication module 120, a sub-communication module 130, and a connector 165. The external device may include at least one selected from another device (not shown), a cellular phone (not shown), a smartphone (not shown), a tablet PC (not shown), and a server (not shown).

Referring to FIG. 1, the display device 100 includes a touch screen 190 and a touch screen controller 195. Also, the display device 100 includes a controller 110, the mobile communication module 120, the sub-communication module 130, a multimedia module 140, a camera module 150, a GPS module 155, an input/output (I/O) module 160, a sensor module 170, a storage 175, and a power supplier 180. The sub-communication module 130 may include at least one selected from a wireless LAN module 131 and a short distance communication module 132, and the multimedia module 140 may include at least one selected from a broadcasting communication module 141, an audio reproduction module 142, and a video reproduction module 143.

The camera module 150 may include at least one selected from a first camera 151 and a second camera 152, and the I/O module 160 may include at least one selected from a button 161, a microphone 162, a speaker 163, a vibration motor 164, the connector 165, and a keypad 166.

The controller 110 may include a central processing unit (CPU) 111, a ROM 112 that stores a control program for controlling the display device 100, and a RAM 113 that stores signals or data that is input from the outside of the display device 100 or is used as a memory space for operations performed by the display device 100. The CPU 111 may include a plurality of processors, such as a single-core processor, a dual-core processor, a triple-core processor, or a quad-core processor. The CPU 111, the ROM 112, and the RAM 113 may be connected to each other via an internal bus.

The controller 110 may control the mobile communication module 120, the sub-communication module 130, the multimedia module 140, the camera module 150, the GPS module 155, the I/O module 160, the sensor module 170, the storage 175, the power supplier 180, the touch screen 190, and the touch screen controller 195.

Under the control of the controller 110, the mobile communication module 120 may connect the display device 100 to an external device via mobile communication by using at least one (one or a plurality of) antenna. The mobile communication module 120 may transmit/receive wireless signals for voice calls, video calls, and transmissions of short messages (SMS) or multimedia messages (MMS) with a cellular phone (not shown) of which a contact number is input to the display device 100, a smartphone (not shown), a tablet PC (not shown), or other devices (not shown).

The sub-communication module 130 may include at least one selected from the wireless LAN module 131 and the short distance communication module 132. For example, only the wireless LAN module 131, only the short distance communication module 132, or both of the wireless LAN module 131 and the short distance communication module 132 may be included.

The wireless LAN module 131 may be controlled by the controller 110 such that the wireless LAN module 131 is connected with the Internet at a place where a wireless access point (AP) (not shown) is provided. The wireless LAN module 131 may support the wireless LAN standard IEEE 802.11x of the Institute of Electrical and Electronics Engineers (IEEE). The short distance communication module 132 may be controlled by the controller 110 such that the short distance communication module 132 performs a short distance wireless communication between the display device 100 and an imaging apparatus (not shown). Examples of short distance wireless communication techniques may include Bluetooth, Infrared Data Association (IrDA), and ZigBee.

Based on performance, the display device 100 may include at least one selected from the mobile communication module 120, the wireless LAN module 131, and the short distance communication module 132.

The multimedia module 140 may include the broadcasting communication module 141, the audio reproduction module 142, or the video reproduction module 143. The broadcasting communication module 141 may be controlled by the controller 110 and receive broadcasting signals (e.g., TV broadcasting signals, radio broadcasting signals, or data broadcasting signals) and additional broadcasting information (e.g., an electric program guide (EPG) or an electric service guide (ESG)) transmitted from broadcasting stations via a broadcasting communication antenna (not shown). The audio reproduction module 142 may be controlled by the controller 110 and reproduce stored or received digital audio files. The video reproduction module 143 may be controlled by the controller 110 and reproduce stored or received digital video files. The video reproduction module 143 may reproduce digital audio files.

The multimedia module 140 may include the audio reproduction module 142 and the video reproduction module 143, and not include the broadcasting communication module 141. Alternatively, the audio reproduction module 142 or the video reproduction module 143 of the multimedia module 140 may be included in the controller 110.

The camera module 150 may include at least one selected from the first camera 151 and the second camera 152 which capture a still image or a video under the control of the controller 110. Also, the first camera 151 or the second camera 152 may include an auxiliary light source (not shown) that provides an amount of light that is necessary for photography. The first camera 151 may be located at a front side of the display device 100, and the second camera 152 may be located at a back side of the display device 100. Alternatively, the first camera 151 and the second camera 152 may be adjacently (e.g., a distance greater than 1 cm but smaller than 8 cm) located and capture a 3-dimensional (3D) still image or a 3D video.

The GPS module 155 may receive radio waves from a plurality of GPS satellites (not shown) in the Earth's orbit, and estimate a location of the display device 100 by using a time of arrival of the radio waves from the GPS satellites to the display device 100.

The I/O module 160 may include at least one selected from a plurality of buttons 161, the microphone 162, the speaker 163, the vibration motor 164, the connector 165, and the keypad 166.

The button 161 may be formed at a front surface, a side surface, or a back surface of a housing of the display device 100, and may include at least one selected from a power/lock button (not shown), a volume button (not shown), a menu button, a home button, a back button, and a search button.

The microphone 162 may be controlled by the controller 110 and receive voice or sound and generate electric signals.

The speaker 163 may be controlled by the controller 110 and output sounds that correspond to various signals of the mobile communication module 120, the sub-communication module 130, the multimedia module 140, or the camera module 150 to the outside of the display device 100. The speaker 163 may output sounds that correspond to functions of the display device 100. The speaker 163 may be formed of one or a plurality of speakers at an appropriate location or appropriate locations on the housing of the display device 100.

The vibration motor 164 may be controlled by the controller 110 and convert electric signals to mechanical vibrations. For example, when the display device 100 receives a voice call from another device (not shown) in a vibration mode, the vibration motor 164 may operate. The vibration motor 164 may operate in response to a touch operation of a user that contacts the touch screen 190 and consecutive movements of a touch input on the touch screen 190.

The connector 165 may be used as an interface for connecting the display device 100 and an external device (not shown) or a power source (not shown). Under the control of the controller 110, data stored in the storage 175 of the display device 100 may be transmitted to the external device or data may be received from the external device via a cable connected to the connector 165. Power may be input from the power source or a battery may be charged via the cable connected to the connector 165.

The keypad 166 may receive a key input from the user to control the display device 100. The keypad 166 includes a physical keypad (not shown) that is formed on the display device 100 or a virtual keypad (not shown) that is displayed on the touch screen 190. The physical keypad formed on the display device 100 may be omitted depending on the performance or a structure of the display device 100.

The sensor module 170 includes at least one sensor that detects status of the display device 100. For example, the sensor module 170 may include a proximity sensor (not shown) that detects whether the user is near the display device 100, an illuminator sensor (not shown) that detects an amount of light around the display device 100, or a motion sensor (not shown) that detects motions (e.g., rotations of the display device 100, or acceleration or vibration applied to the display device 100) of the display device 100. The sensors of the sensor module 170 may be added or removed according to the performance of the display device 100.

The storage 175 may be controlled by the controller 110 and store signals or data that are input/output with respect to operations of the mobile communication module 120, the sub-communication module 130, the multimedia module 140, the camera module 150, the GPS module 155, the I/O module 160, the sensor module 170, and the touch screen 190. The storage 175 may store a control program for controlling the display device 100 or the controller 110, and applications.

The term "storage" may include the storage 175, the ROM 112 and the RAM 113 in the controller 110, or a memory card (not shown) inserted into the display device 100. The storage may include a non-volatile memory, a volatile memory, a hard disk drive (HDD), or a solid state drive (SSD).

The power supplier 180 may be controlled by the controller 110 and supply power to at least one battery (not shown) that is located in the housing of the display device 100. Also, the power supplier 180 may supply power that is input from an external power source (not shown) to components in the display device 100 via the cable connected to the connector 165.

The touch screen 190 may output user interfaces that correspond to various services to the user. The touch screen 190 may transmit analog signals, which correspond to at least one touch that is input to a user interface, to the touch screen controller 195. The touch screen 190 may receive at least one touch input via the body (e.g., a finger) of the user or a touch input tool (e.g., a stylus pen). Also, the touch screen 190 may receive consecutive motions of the at least one touch input. The touch screen 190 may transmit analog signals that correspond to the consecutive motions of the touch input to the touch screen controller 195.

A touch input according to the present invention is not limited to an input that transmitted when the body of the user or a touch input tool contacts the touch screen 190, and may include a non-contact input (e.g., a distance between the touch screen 190 and the body is 1 mm or less). A distance that may be detected on the touch screen 190 may vary according to the performance or the structure of the display device 100.

The touch screen 190 may be, for example, a resistive type, a capacitive type, an infrared type, or an ultrasound wave type, but is not limited thereto.

The touch screen controller 195 may convert the analog signals received from the touch screen 190 into digital signals (e.g., X-coordinates and Y-coordinates) and transmit the digital signals to the controller 110. The controller 110 may control the touch screen 190 by using the digital signals from the touch screen controller 195. For example, the controller 110 may select an application execution icon (not shown) displayed on the touch screen 190 or execute an application in response to a touch input. The touch screen controller 195 may be included in the touch screen 190 or the controller 110.

Figure 2A:
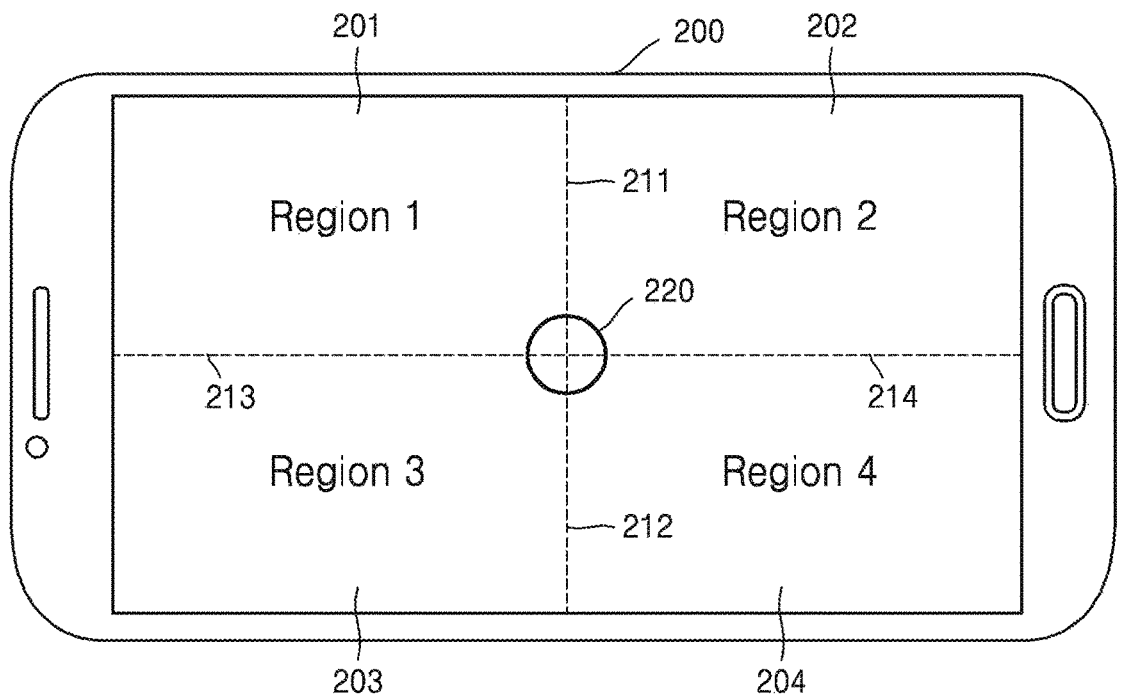
FIGS. 2A to 2K are conceptual diagrams for describing a method of displaying application execution windows, according to some embodiments.

FIGS. 2A to 2K are conceptual diagrams for describing a method of displaying application execution windows, according to an embodiment of the present invention. In the present specification, a button that is described as being displayed on a display device is different from the button 161 of FIG. 1. The button displayed on the display device is an object that is displayed on the displayed device to provide a user interface. The button may have not only a shape illustrated in the drawings but also other shapes. The button may be changed into various shapes, for example, a circle, an oval, a polygon, or a random image include circular. Alternatively, the button may not have a fixed shape but vary according to context of a device. For example, when the number of application execution windows displayed on a display device increases from four to five, a quadrilateral button may be changed to a pentagonal button. Although the button is described as being displayed on a touch screen in the present specification, according to some embodiments, the button may be not displayed on the touch screen but referring to a portion set on the touch screen. For example, even when the button is not displayed on the touch screen, when a touch input of the user is received at an area corresponding to the button, the display device may determine that a touch input with respect to the button is received from a user. A display device 200 may be formed as not only a mobile device described with reference to FIG. 1, but also a TV or a medical data display apparatus. As shown in FIG. 2A, the display device 200 may set a plurality of regions (201 to 204) on a touch screen. For convenience of description, in the present specification, the regions set by the display device 200 are indicated as a first region 201, a second region 202, a third region 203, and a fourth region 204. Also, a region formed by combining the first and third regions 201 and 203 is indicated as a fifth region (not shown). A region formed by combining the second and fourth regions 202 and 204 is indicated as a sixth region (not shown). A region formed by combining the first and second regions 201 and 202 is indicated as a seventh region. A region formed by combining the third and fourth regions 203 and 204 is indicated as an eighth region. A combination of the first to fourth regions 201 to 204, i.e., a full screen, is indicated as an F region. A controller (not shown) may set a first boundary line 211 that divides the first and second regions 201 and 202, a second boundary line 212 that divides the third and fourth regions 203 and 204, a third boundary line 213 that divides the first and third regions 201 and 203, and a fourth boundary line 214 that divides the second and fourth regions 202 and 204. The first and second boundary lines 211 and 212 may form a single line. The third and fourth boundary lines 213 and 214 may form a single line. The first to fourth boundary lines 211 to 214 do not have to be always displayed, but may be lines that are virtually set on the display device 200. The controller may set the first to fourth regions 201 to 204 such that the first to fourth regions 201 to 204 do not overlap each other. For example, as shown in FIG. 2A, the controller may set the first region 201 at an upper left end. The controller may set the second region 202 at an upper right end. The controller may set the third region 203 at a lower left end. The controller may set the fourth region 204 at a lower right end. The controller may set the first and second boundary lines 211 and 212 such that a screen is vertically divided. The controller may set the third and fourth boundary lines 213 and 214 such that the screen is horizontally divided.

Also, the touch screen may display a button 210 at a point where the first to fourth boundary lines 211 to 214 meet. The button 210 may be a function key for changing a size of a region displaying an application execution window or entering an operation mode of controlling the execution window.

The controller may control the touch screen such that an application execution window is displayed on each region. For example, the controller may control the touch screen such that an application execution window is displayed on each of the plurality of regions (201 to 204) as shown in FIGS. 2B to 2K.

In the present specification, an application execution window indicates a window that displays an application execution screen. That is, "execution window" may indicate a type of a frame that displays an execution screen of a corresponding application. Objects related to an application may be displayed on an execution screen of the application. The objects may include text, figures, icons, buttons, check boxes, images, videos, the web, or a map. When a user touches an object, a function or an event that is preset to the object may be performed. The object may be referred to as 'view' according to operating systems. For example, at least one button, from among a capture button for capturing the execution window, a minimize button for minimizing the execution window, a full screen button for maximizing the execution window, and a close button for closing the execution window, may be displayed for controlling the display of an execution window.

Figure 2B:
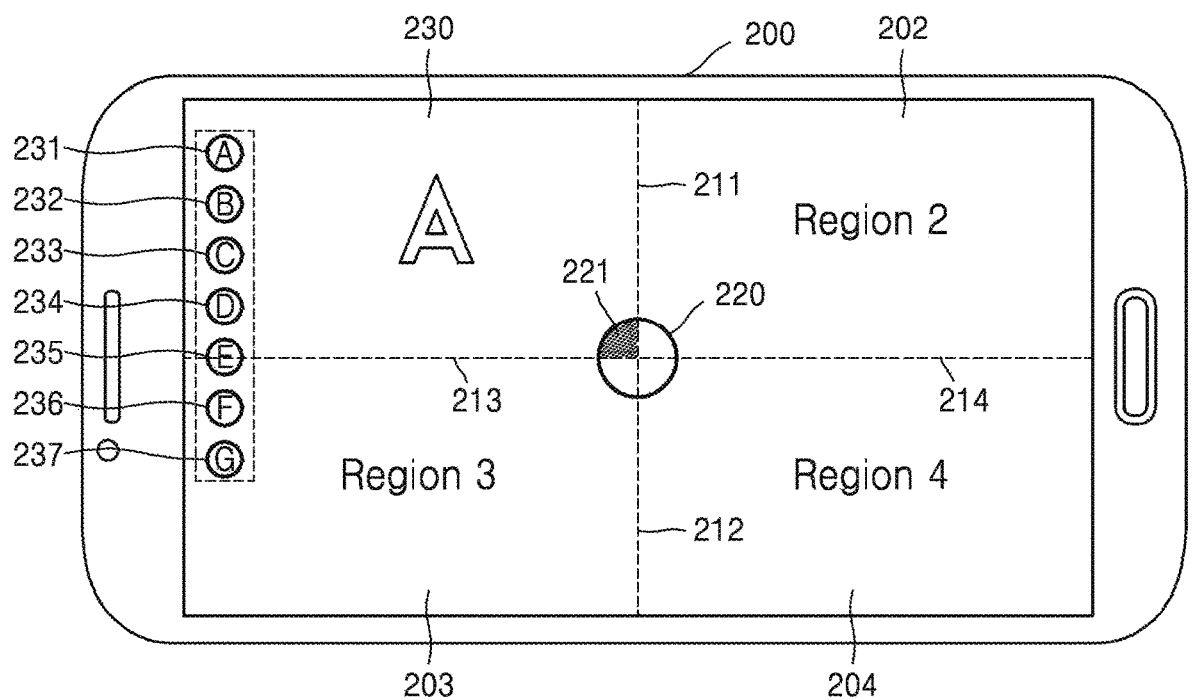

Referring to FIG. 2B, the controller may control the touch screen such that icons 231 to 237 that represent executable applications are displayed on the touch screen. The display device 200 may execute an A application. As shown in FIG. 2B, when the A application is executed, the controller may control the touch screen such that an execution window 230 of the A application is displayed in the first region 201. Also, the controller may control the touch screen such that the icons 231 to 237 that represent the executable applications are displayed at a random location of the touch screen. When an input of touching an icon from among the icons 231 to 237 that represent to the applications, i.e., an input of selecting an icon that represents an application to execute, is received, the display device 200 may display an execution window of the application that corresponds to the selected icon in one of the first to fourth regions 201 to 204.

Also, the controller may display an indicator 221 that indicates an active region on the button 220 that is displayed. In the present specification, the active region may indicate a region displaying an execution window of an application that is executed last or selected last by the user. The application manipulated by the user may be referred to as the application selected by the user.

The indicator 221 may be provided in various ways to display a location of the active region. For example, at least a portion of an application execution window in an active region may be displayed in an area where the application execution window of the active region and the button 220 are overlapping. Alternatively, an arrow indicating a direction of the active region may be displayed on the button 220.

The active region may be determined by using an activity stack. An activity stack of an application, which is executed last or selected last by the user, may be located at the top. The display device 200 may determine a region that displays an execution window of an application corresponding to a stack located at the top as the active region. The active region may be referred to as a focused region.

That is, in FIG. 2B, the indicator 221 may be displayed to indicate the first region 201.

Figure 3A:
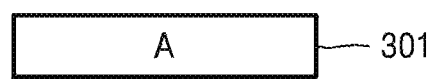
FIGS. 3A to 3F are conceptual diagrams of an activity stack, according to some embodiments.

FIG. 3A is a conceptual diagram of an activity stack that is managed by the display device 200. In response to the execution of the A application, the controller may generate and manage an A application stack 301 on the activity stack.

Figure 2C:
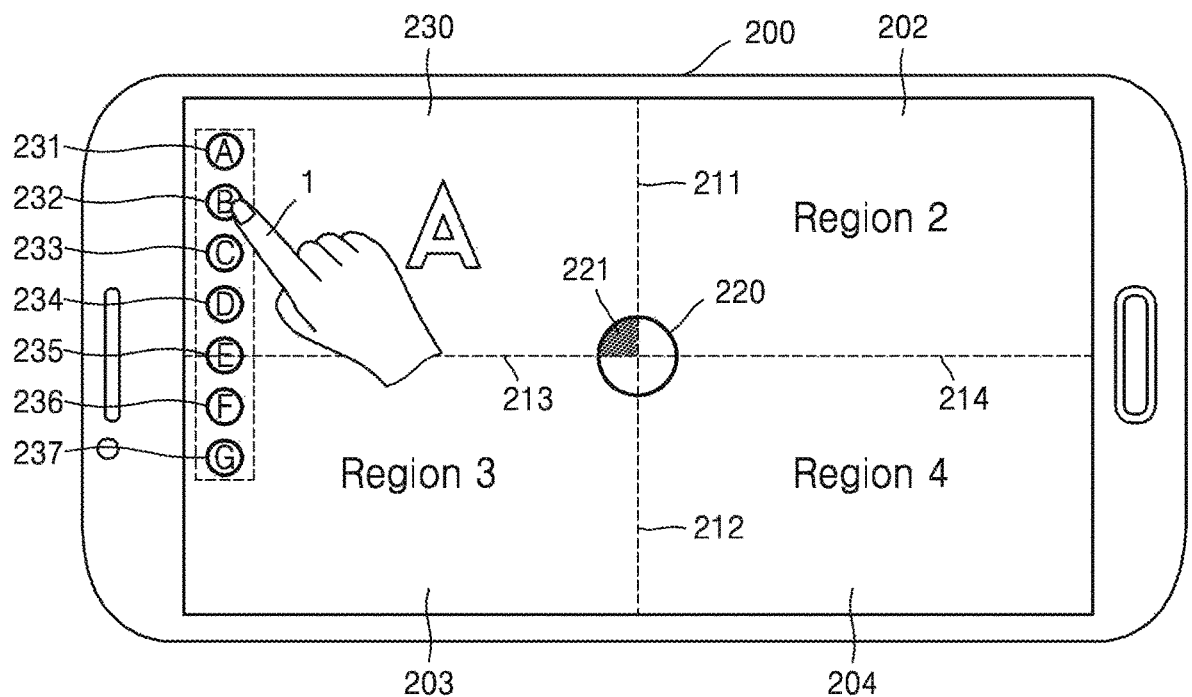
Figure 2D:
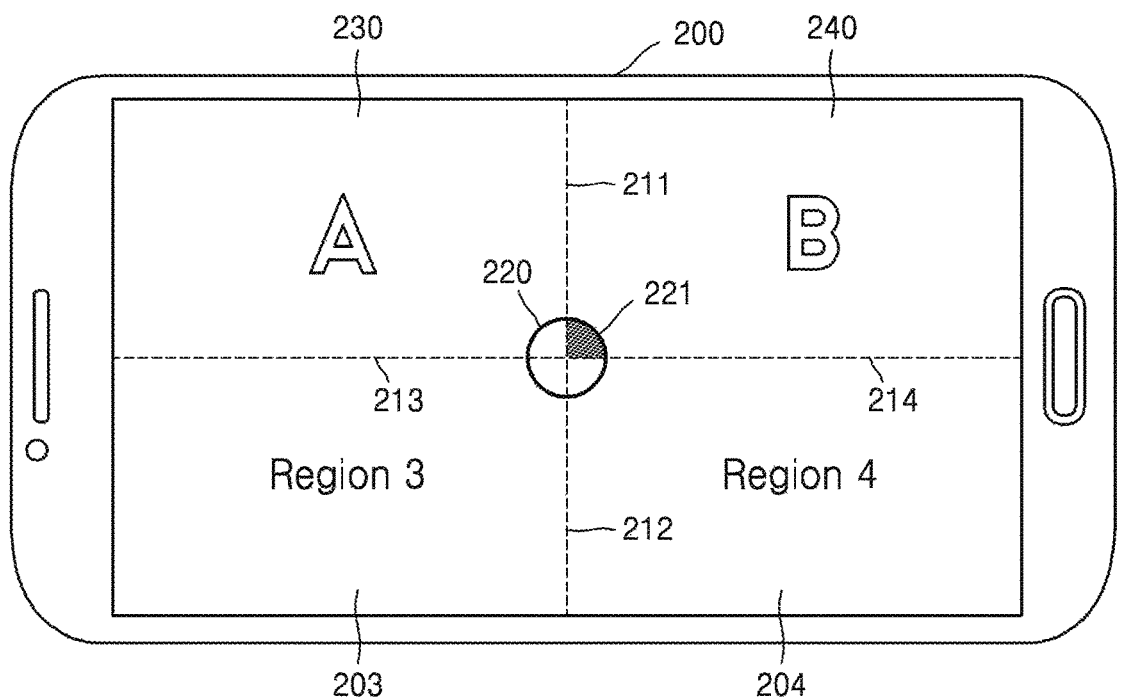

In FIG. 2C, a user 1 may touch an icon that represents a B application. When an input of selecting the icon that represents the B application is received, the controller controls the touch screen such that an execution window 240 of the B application is displayed in the second region 202 as shown in FIG. 2D. The controller may determine a region to display an execution window according to a preset order. For example, the controller may determine a new application execution region in which execution windows of new applications are s displayed in the order of the second region 202, the third region 203, and the fourth region 204. The order above is only an example and may be modified according to embodiments.

In FIG. 2D, when the execution window 240 of the B application is displayed in the second region 202, the indicator 221 may be displayed and indicate the second region 202.

Figure 3B:
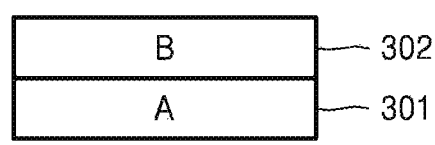

FIG. 3B is a conceptual stack that corresponds to FIG. 2D. In response to the execution of the B application, the controller generates a B application stack 302 on the activity stack. The controller may place the B application stack 302 of the B application that is most recently executed above the A application stack 301.

Figure 2E:
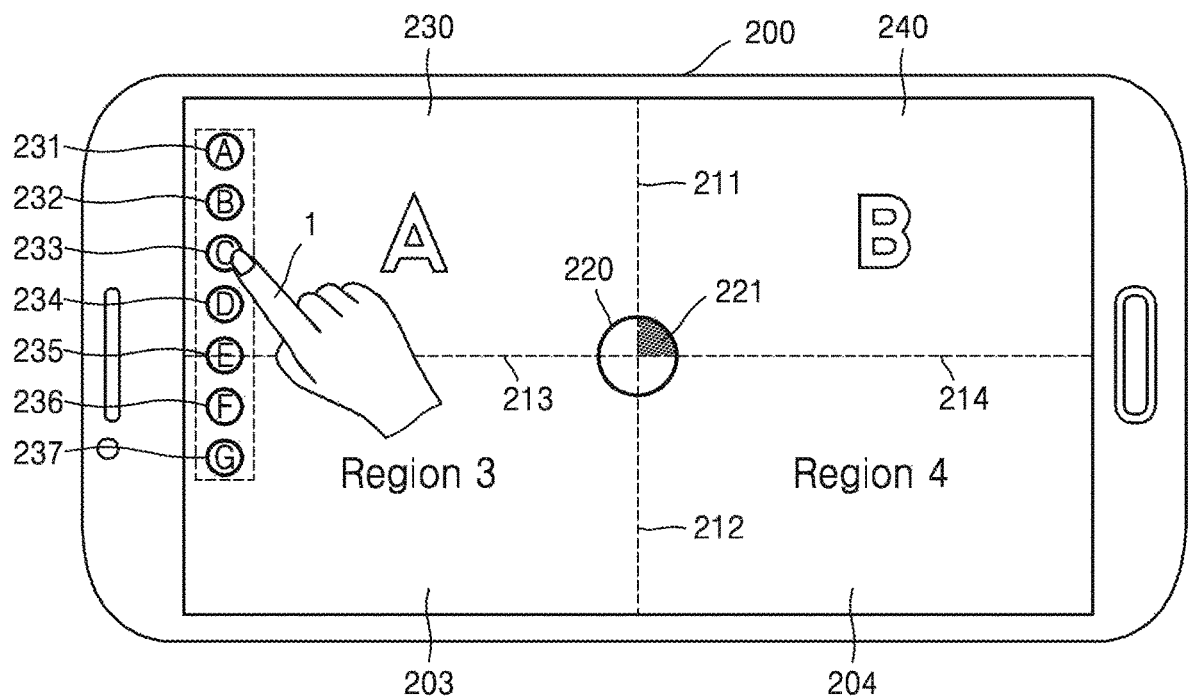

In FIG. 2E, the user 1 may touch an icon 233 that represents a C application.

Figure 2F:
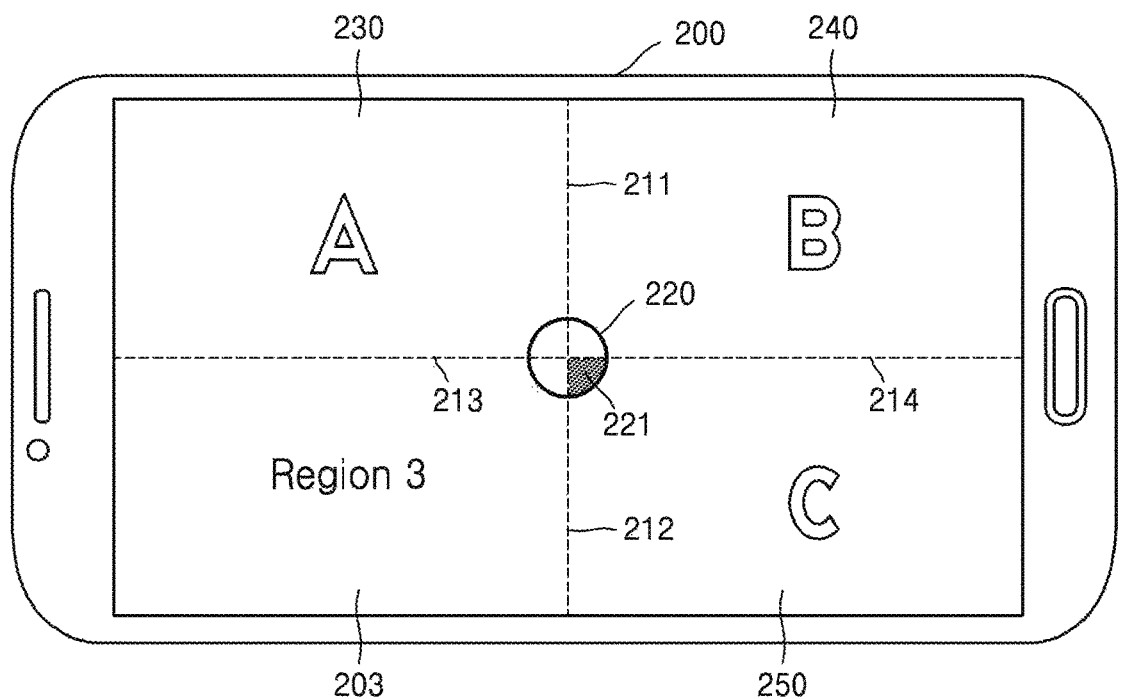

When an input of selecting the icon 233 that represents the C application is received, the controller may display an execution window 250 that executes the C application on the fourth region 204 as shown in FIG. 2F. When the execution window 250 that executes the C application is displayed on the fourth region 204, the indicator 221 may be displayed to indicate the fourth region 204.

Figure 3C:
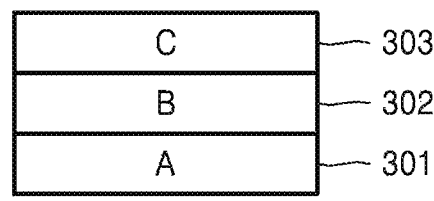

FIG. 3C is a conceptual diagram of an activity stack that corresponds to FIG. 2F. When the C application is executed, the controller generates a C application stack 303 on the activity stack. The controller disposes the B application stack 302 of the B application that is most recently executed at the top.

Figure 2G:
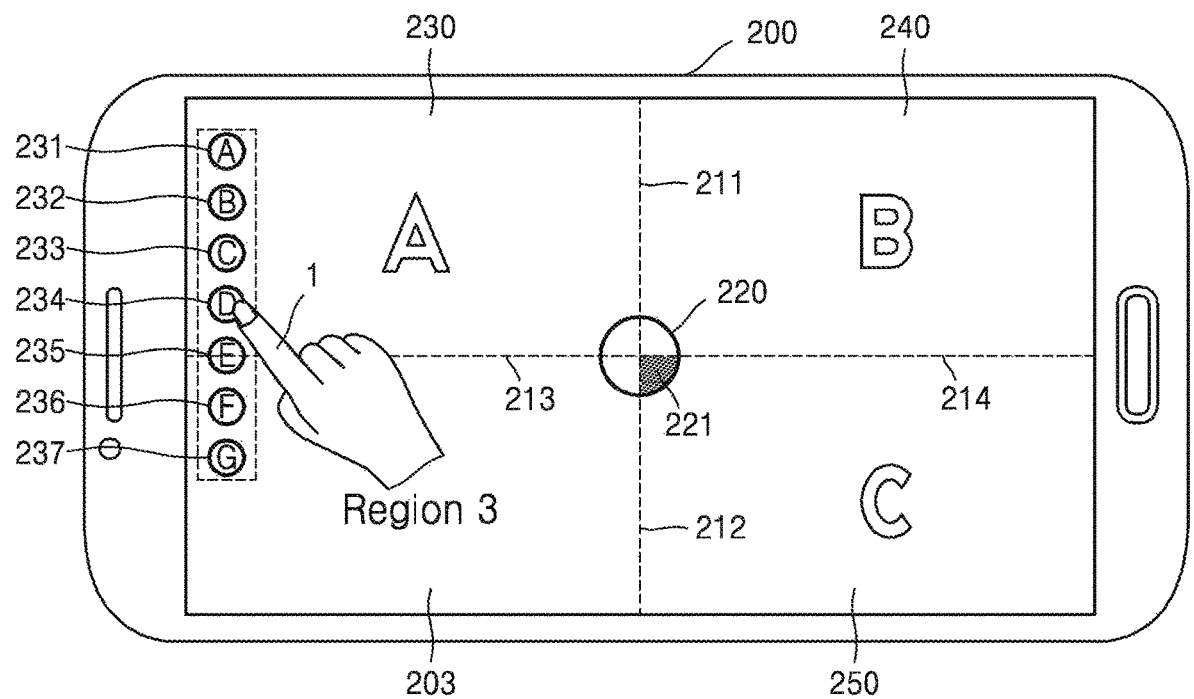
Figure 2H:
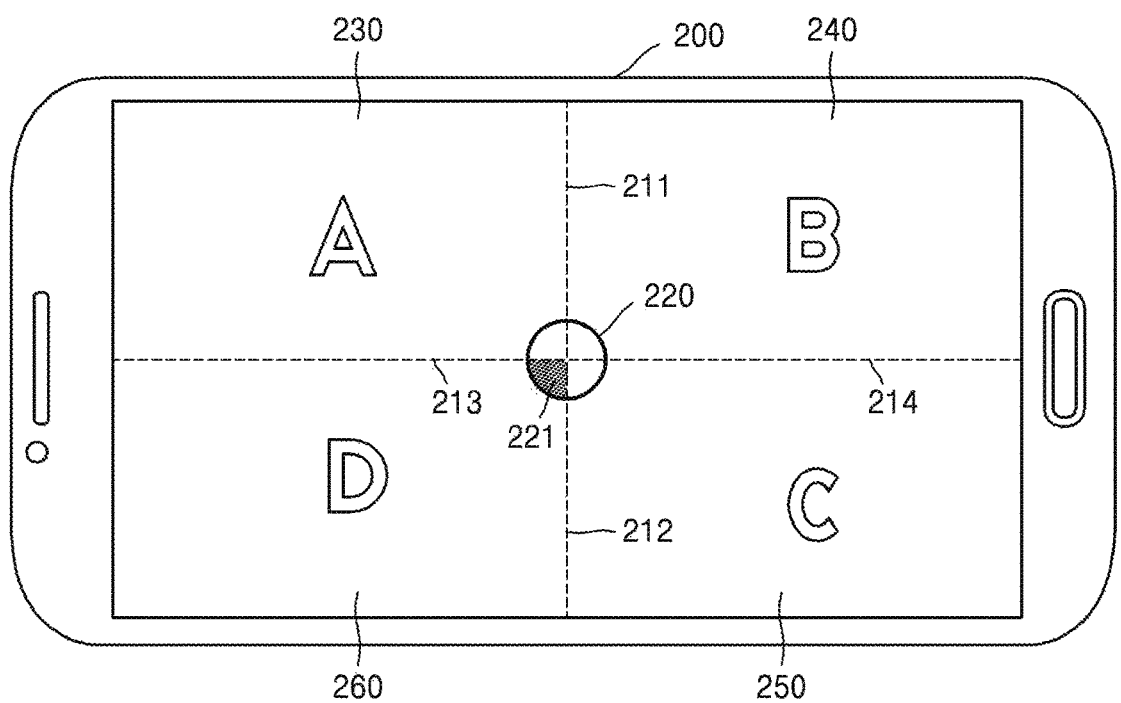

In FIG. 2G, the user 1 may touch an icon 234 that represents a D application. When the icon 234 that represents the D application is selected, the controller may control the touch screen such that an execution window 260 that executes the D application is displayed on the third region 203 as shown in FIG. 2H. When the execution window 260 that executes the D application is displayed on the third region 203, the indicator 221 may be displayed on the button 220 to indicate the third region 203.

Figure 3D:
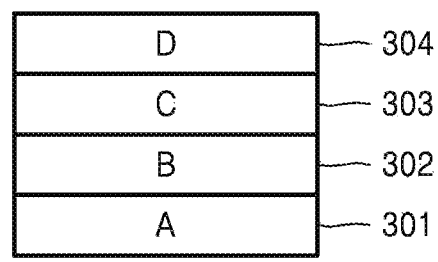

FIG. 3D is a conceptual diagram of an activity stack that corresponds to FIG. 2H. When the D application is executed, the controller may generate a D application stack 304 on the activity stack. The controller disposes the D application stack 304 of the D application that is most recently executed at the top.

Figure 2I:
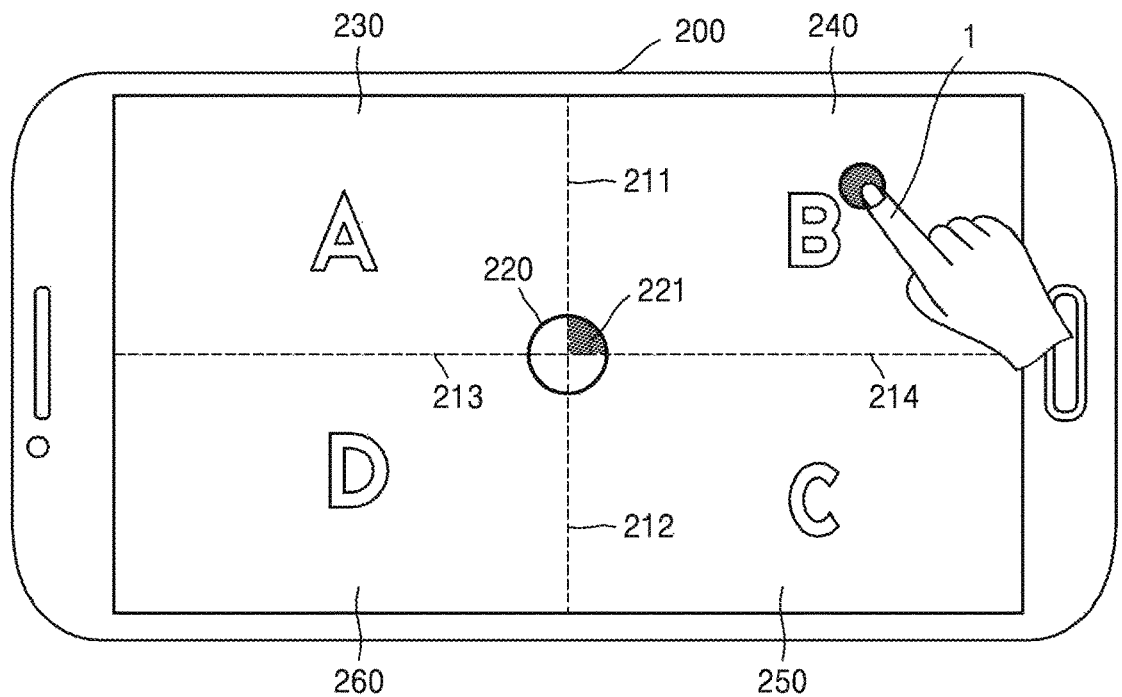
Figure 3E:
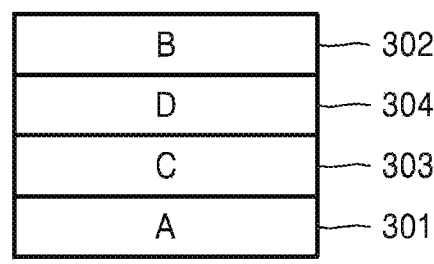

The user 1 may manipulate the B application as in FIG. 2I. FIG. 3E is a conceptual diagram of an activity stack that corresponds to FIG. 2I. When a user input with respect to the execution window 240 of the B application is received, the controller may dispose the B application stack 302 at the top.

As shown in FIG. 2I, when the user input with respect to the execution window 240 of the B application is received, the controller may determine the second region 202 as the active region. Accordingly, the indicator 221 that indicates the second region 202 may be displayed on the button 220.

Figure 2J:
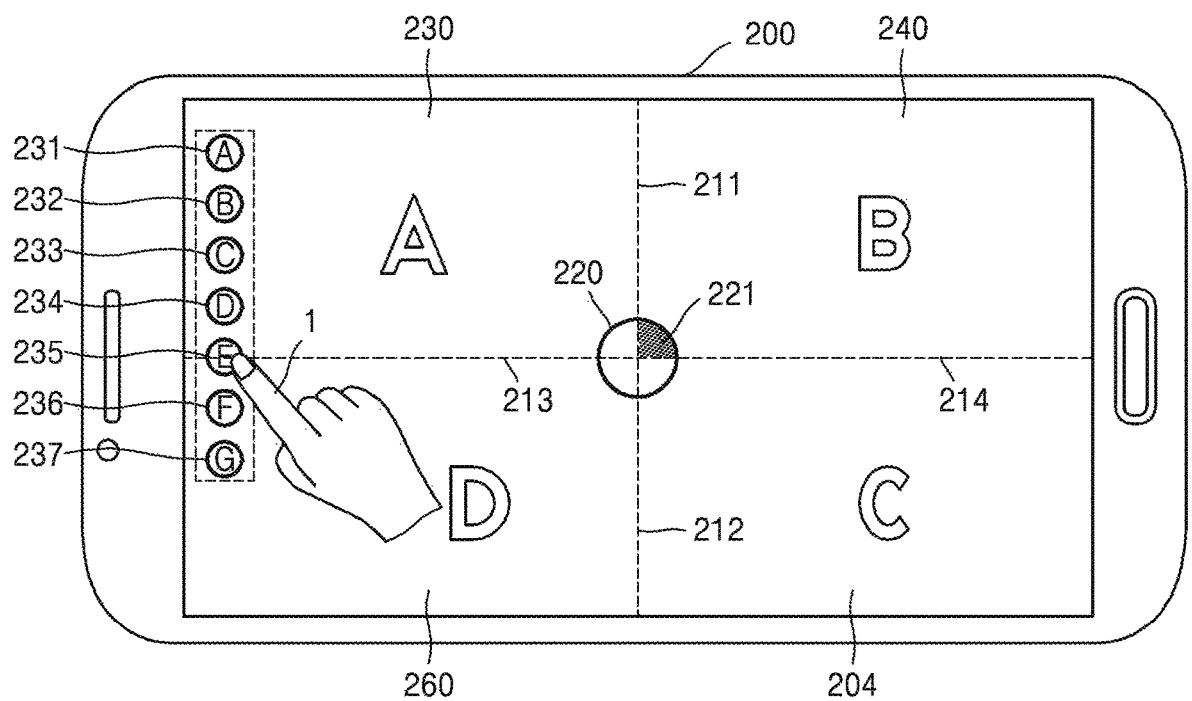
Figure 2K:
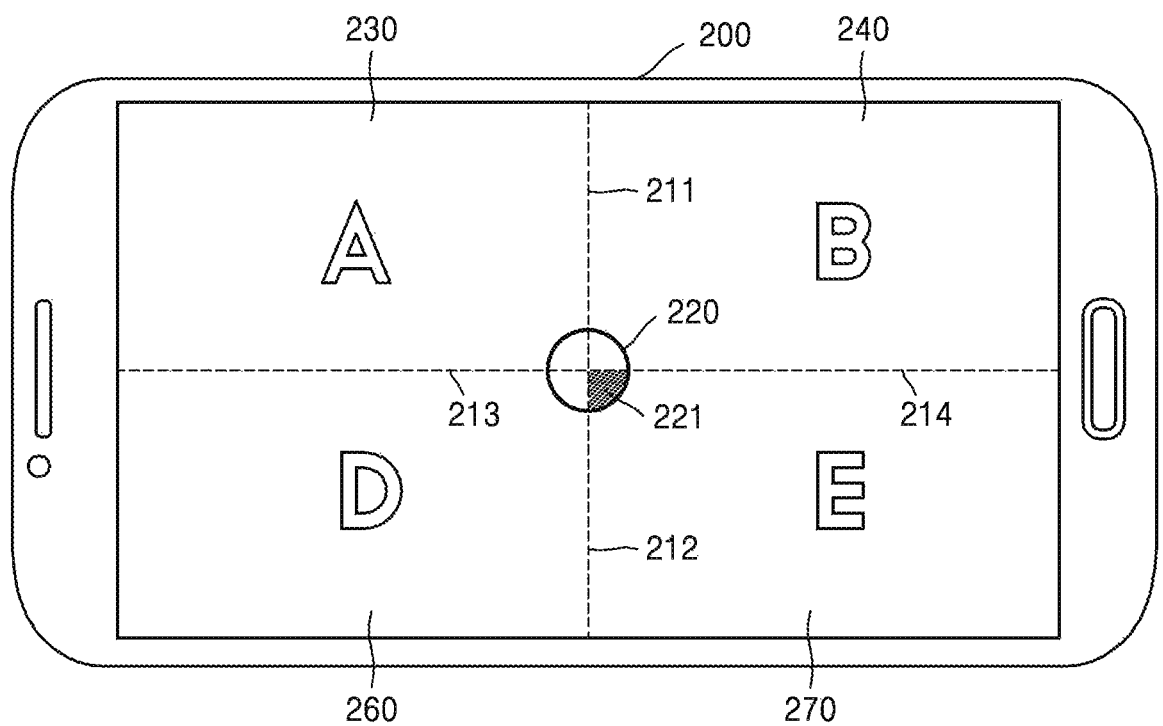

In FIG. 2J, the user 1 may touch an icon 235 that represents an E application. When an input of selecting the icon 235 that represents the E application is received, the controller may control the touch screen such that an execution window 270 of the E application is displayed on the fourth region 204 as shown in FIG. 2K. When there is no empty region, the controller may refer to the activity stack of FIG. 3E. The controller may select a stack located at the lowest part of the activity stack. The display device 200 may display the execution window 270 of the E application on the fourth region 250 displaying the execution window of the C application located at the lowest part.

Figure 3F:
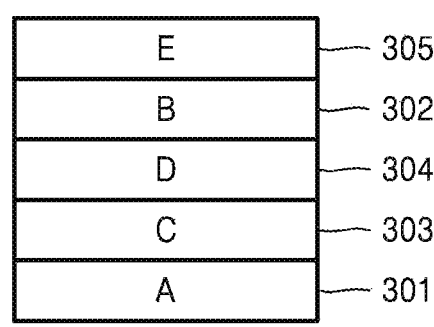

FIG. 3F is a conceptual diagram of an activity stack that corresponds to FIG. 2K. When the E application is executed, the controller may generate an E application stack 305 on the activity stack. The controller may dispose the E application stack 305 at the top.

Figure 4:
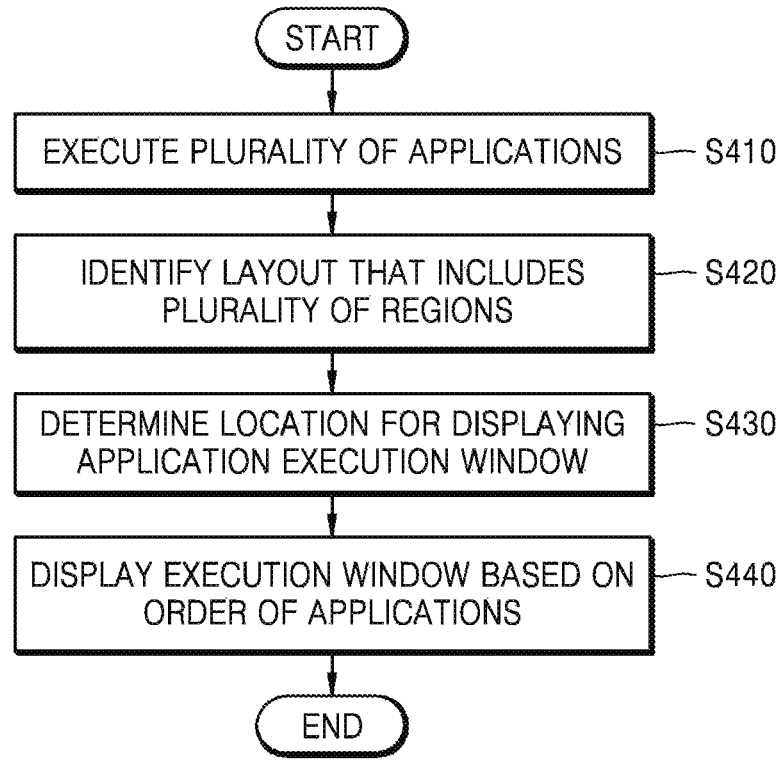
FIG. 4 is a flowchart of a method of executing an application by using a display device, according to some embodiments.

FIG. 4 is a flowchart of a method of executing an application by using a display device, according to an embodiment of the present invention.

First, the display device may execute a plurality of applications (S410). For example, when an input of touching an icon that represents the application is received, an application may be executed.

The display device may identify a layout for disposing an application execution window (S420). The layout refers to a concept of defining regions for disposing application execution windows. The layout may have various forms, for example, an upper and lower 2-split layout, a left and right 2-split layout, a 3-split layout, and a 4-split layout.

The display device may determine a location for displaying the application execution window according to the identified layout (S430). For example, when the layout is a left and right 2-split layout that is divided into fifth and sixth regions, the display device may dispose an execution window of a web browser and an execution window of a telephone directory application in the fifth region, and dispose an execution window of a video reproduction application in the sixth region.

Next, the display device may display the execution windows based on an order of the applications (S440). For example, when the execution window of the web browser and the execution window of the telephone directory application are disposed in the fifth region, the display device may refer to an activity stack, and from among the execution window of the web browser and the execution window of the telephone directory application, display an execution window with a higher rank than the other in the fifth region.

Figure 5A:
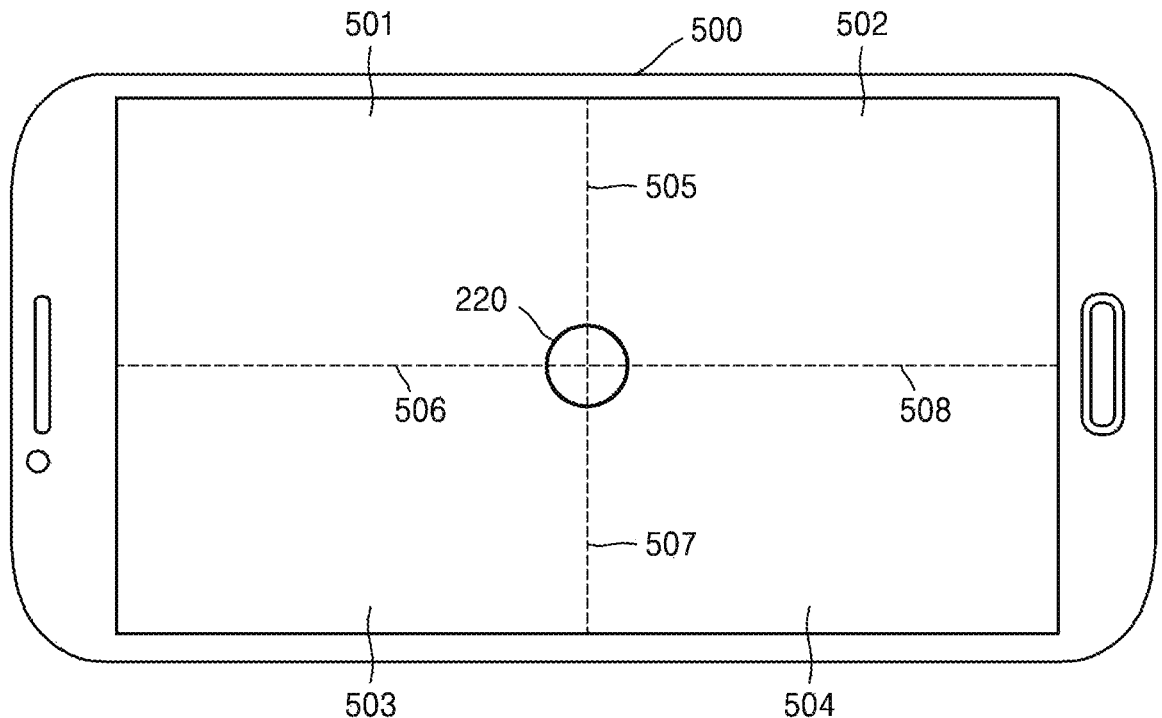
FIGS. 5A and 5B are conceptual diagrams for describing a method of controlling a region displaying an application execution window by using a button, according to some embodiments.
Figure 5B:
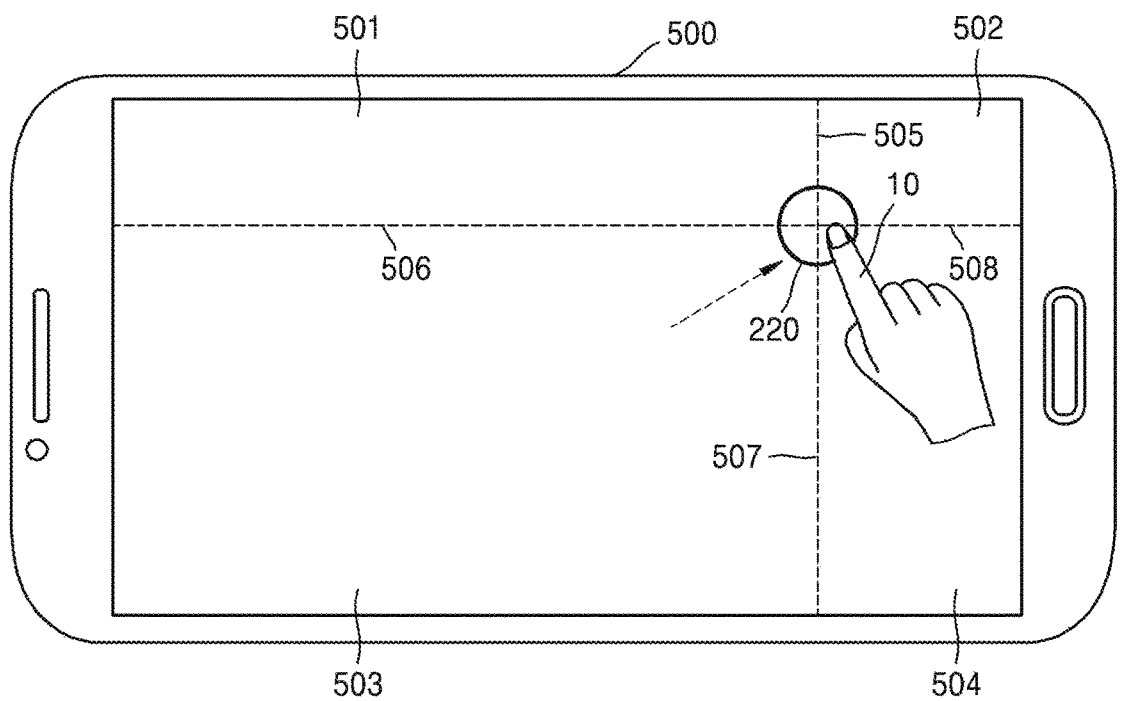

FIGS. 5A and 5B are conceptual diagrams for describing a method of controlling a region displaying an application execution window by using a button, according to an embodiment of the present invention.

Referring to FIG. 5A, a display device 500 may set a first region 501, a second region 502, a third region 503, a fourth region 504, a first boundary line 505, a second boundary line 507, a third boundary line 506, and a fourth boundary line 508. However, the present invention is not limited thereto, and the display device 500 may determine regions and boundary lines by using various methods.

Also, the display device 500 may display the button 220 on at least one boundary line. For example, as shown in FIG. 5A, when the first boundary line 505, the second boundary line 507, the third boundary line 506, and the fourth boundary line 508 is set, the display device 500 may display the button 220 at a point where the boundary lines meet. As another example, when the display device 500 has set a fifth region (not shown), a sixth region (not shown), the first boundary line 505, and the second boundary line 507, the display device 500 may display the button 220 on the first boundary line 505 or the second boundary line 507.

Referring to FIG. 5B, when a touch input that is input by a user 10 is an input of dragging the button 220, the display device 500 may move the button 220 according to a location where the touch input is received. Also, the display device 500 may change locations and sizes of regions displaying application execution windows and boundary lines when a location of the button 220 is moved.

Figure 6A:
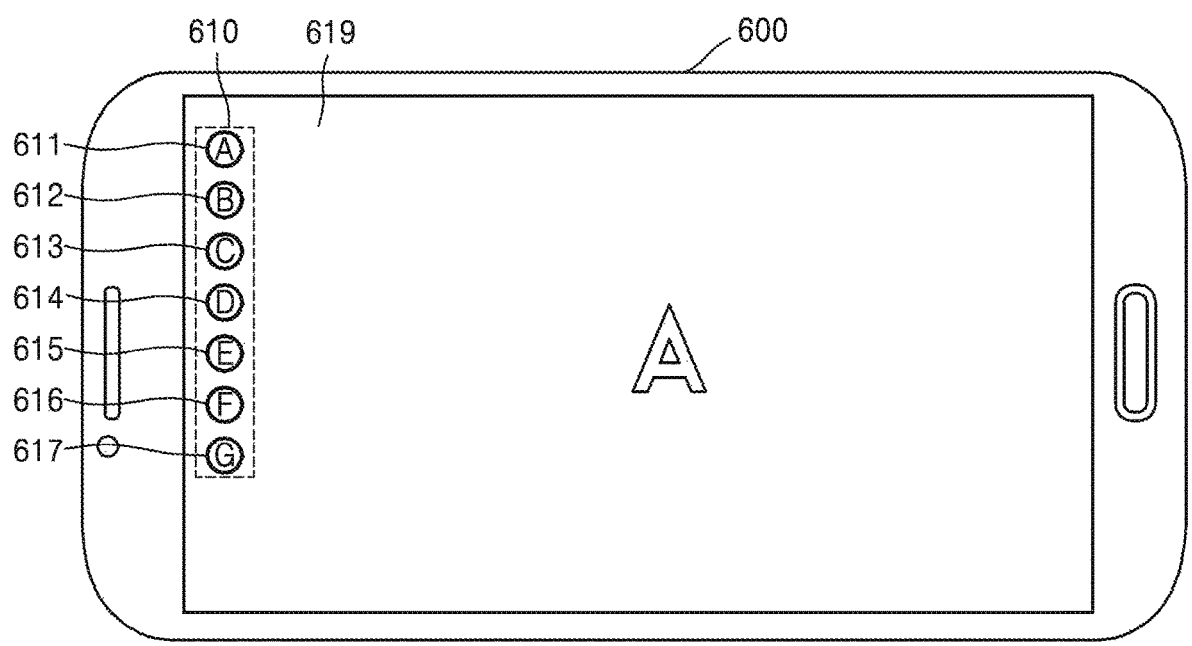
FIGS. 6A to 6W are conceptual diagrams for describing a method of executing a plurality of applications, according to some embodiments.

FIGS. 6A to 6W are conceptual diagrams for describing a method of executing a plurality of applications, according to an embodiment of the present invention.

Referring to FIG. 6A, a display device 600 may display a list 610 of at least one application while an A application is executed. A list of applications refers to executable applications, for example, icons 611 to 617 that represent executable applications.

FIG. 7A is a conceptual diagram of an activity stack that corresponds to FIG. 6A. When an execution window of the A application is displayed on a full screen, i.e., an F region, a controller (not shown) generates a stack of the A application as shown in FIG. 7A.

Figure 6B:
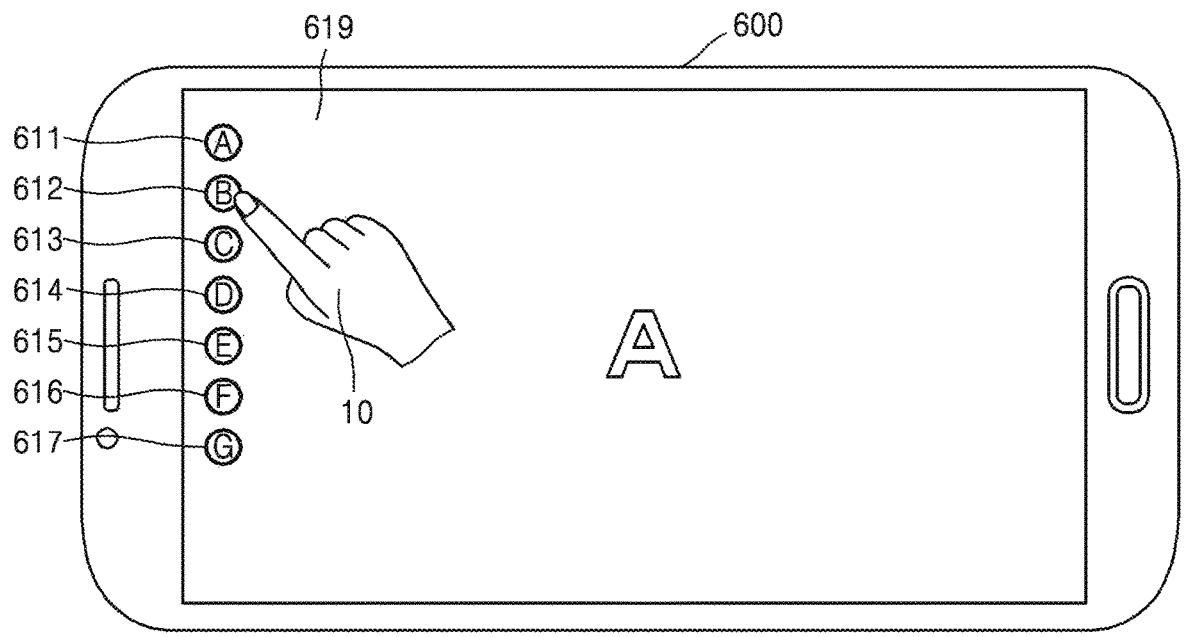
Figure 6C:
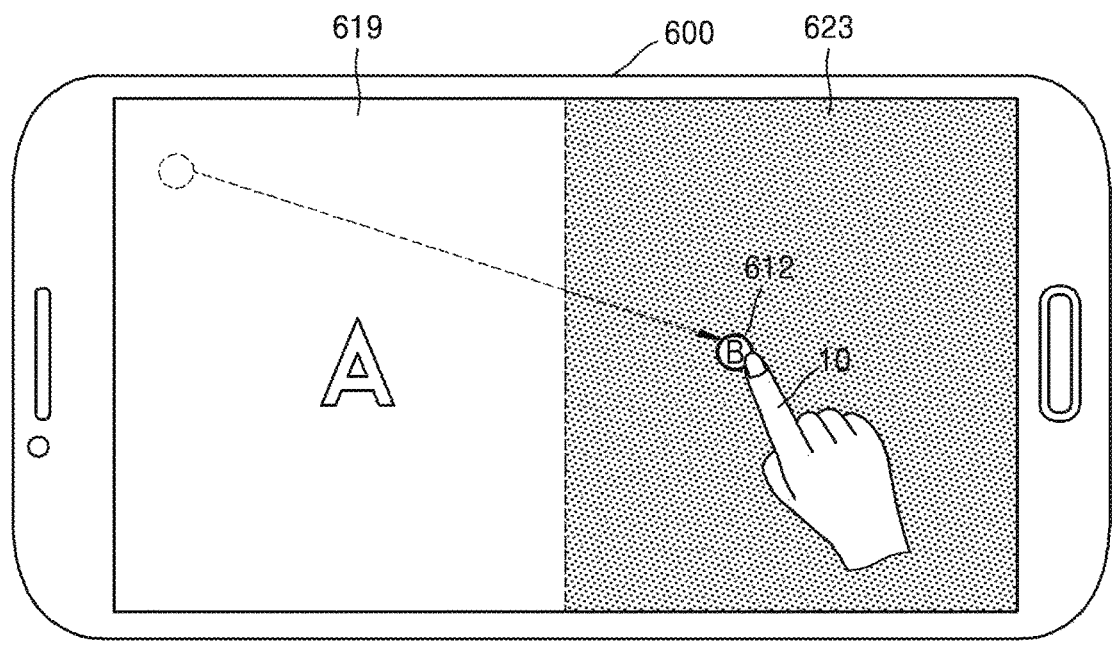

The user 10 may manipulate the display device 600 such that a B application is additionally executed. For example, after touching an icon 612 that represents the B application as shown in FIG. 6B, the user may drag the icon 612 to a sixth region 623 as shown in FIG. 6C.

When a received drag input ends in the sixth region 623, the display device 600 may execute the B application that corresponds to the selected icon. Also, the display device 600 may dispose the A application, which was in the F region, in a fifth region 619. The display device 600 disposes the additionally executed B application in the sixth region 623.

Figure 6D:
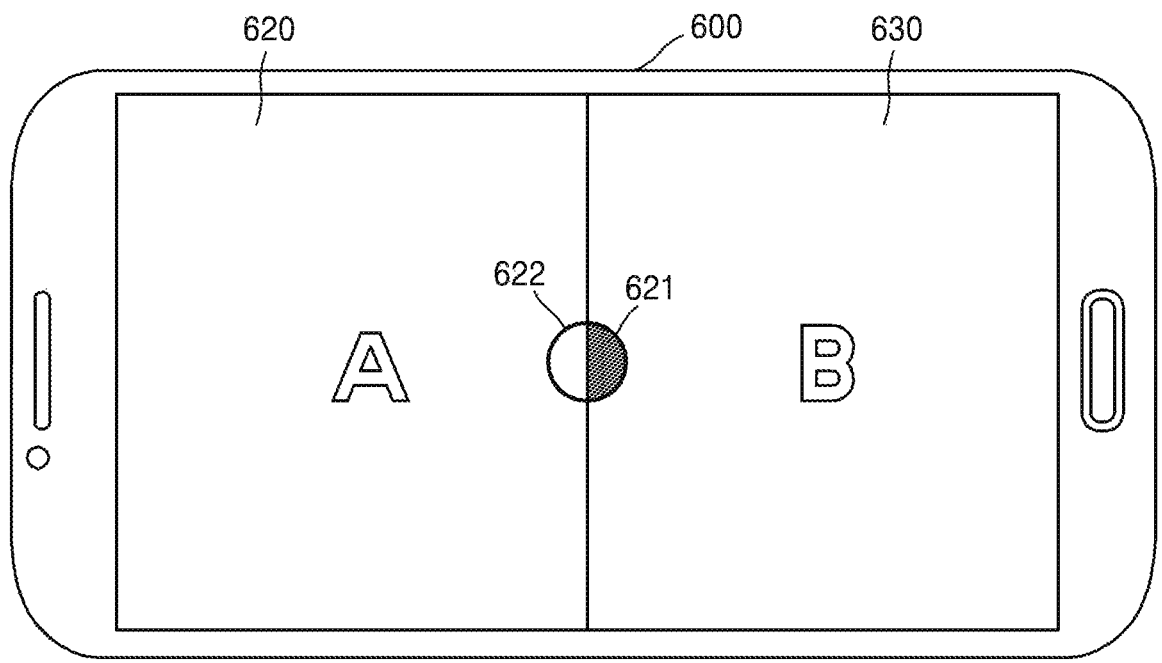

As a result, as shown in FIG. 6D, an execution window 620 of the A application is displayed in the fifth region 619, and an execution window 630 of the B application is displayed in the sixth region 623.

In this case, the display device 600 may display a button 622 on a boundary line between the fifth and sixth regions 619 and 623. Also, an indicator 621, which indicates the execution window 630 of the B application that has been executed last, may be displayed on the button 622. The indicator 621 may indicate a region where an execution window of an application located at the top of the activity stack is displayed.

FIG. 7B is a conceptual diagram of an activity stack that corresponds to FIG. 6D. A stack of the A application that was displayed in the F region is changed to a stack being displayed in the fifth region 619. Also, when the B application is executed, an activity stack of the B application is generated, and the B application is disposed in the sixth region 623. The activity stack of the B application is located at the top.

Figure 6E:
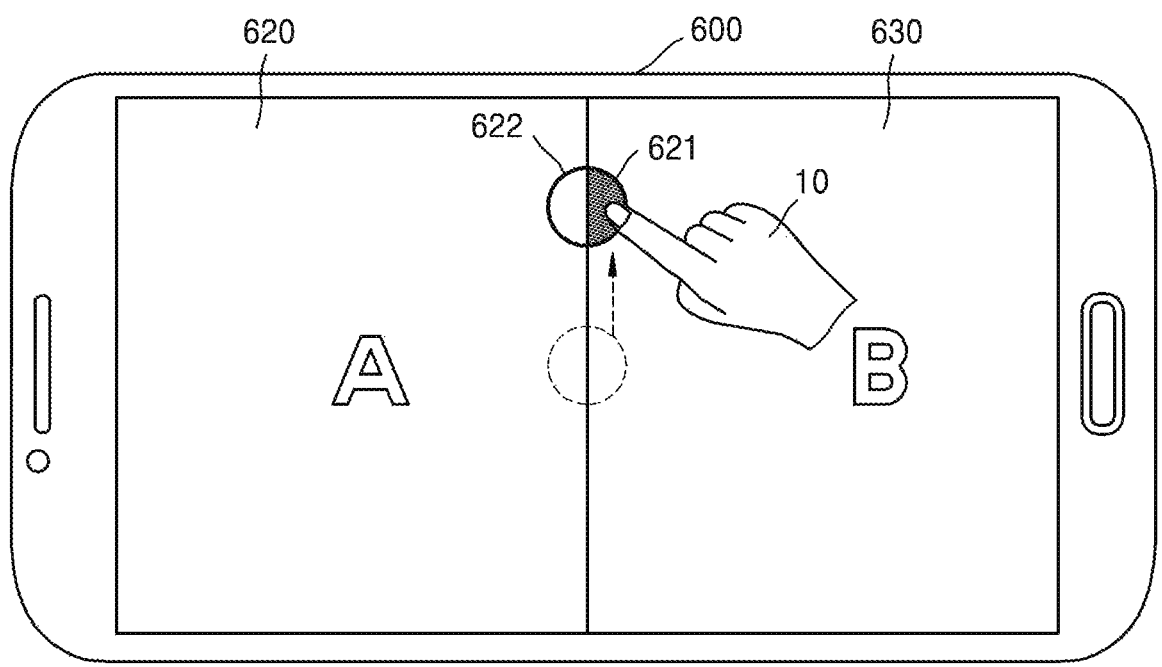

Referring to FIG. 6E, while the button 622 is displayed, the user 10 may change a location of the button. As shown in FIGS. 5A and 5B, sizes of regions displaying application execution windows may be changed according to locations of a button.

Figure 6F:
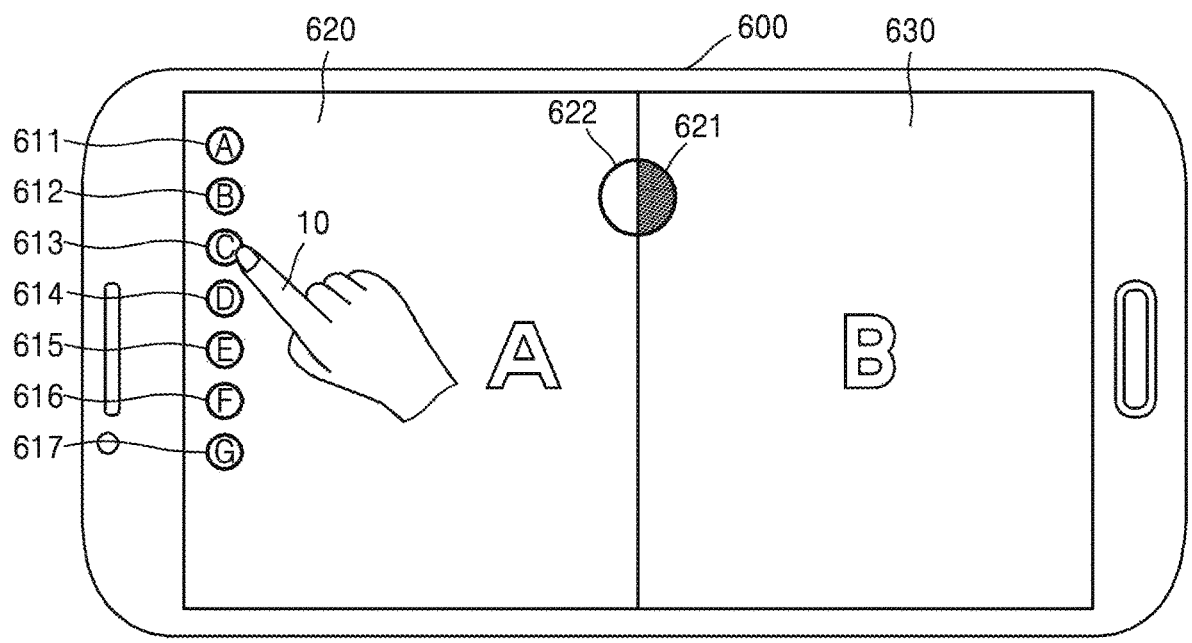
Figure 6G:
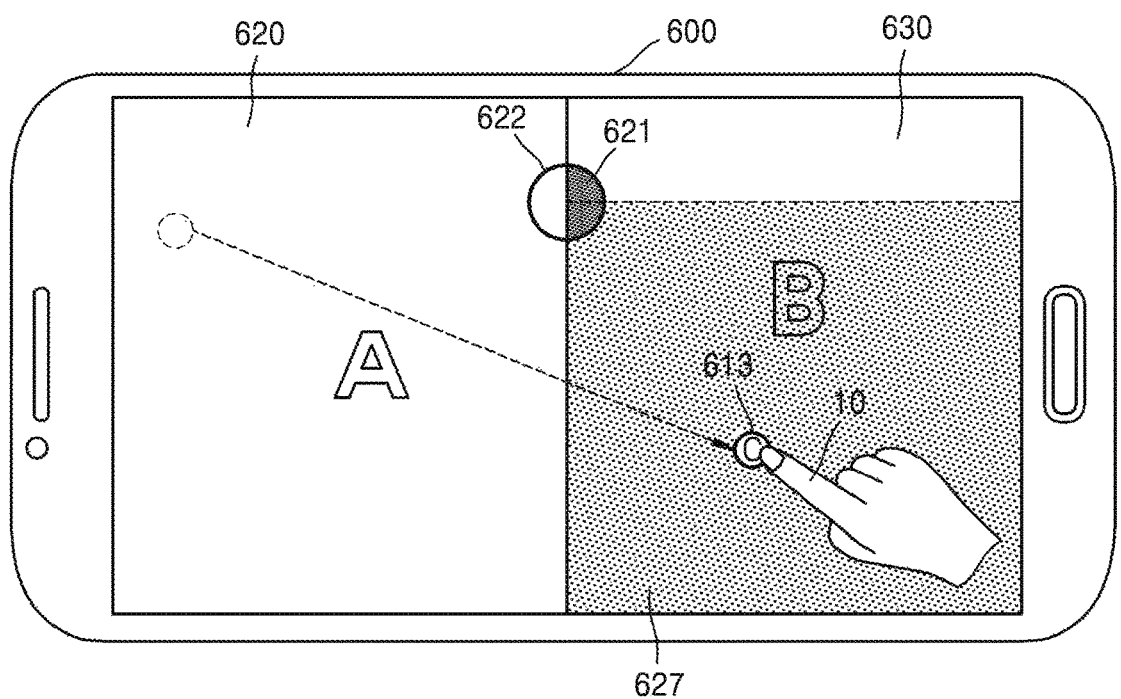

Next, the user 10 may touch an icon 613 that represents a C application as shown in FIG. 6F, and then drag the icon 613 to a fourth region 627 as shown in FIG. 6G. A size of the fourth region 627 may be determined according to the location of the button 622.

Figure 6H:
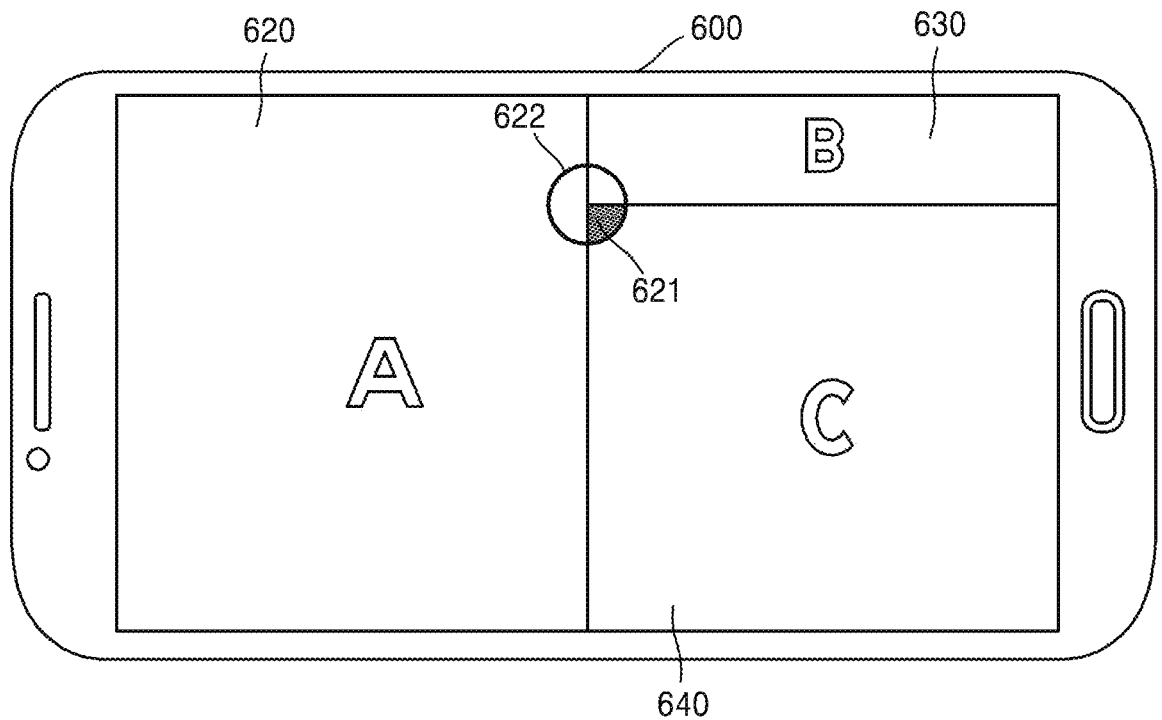

When an input of dragging the icon 613 that represents the C application to the fourth region 627 is finished, the display device 600 may execute the C application. As shown in FIG. 6H, the display device 600 may display an execution window 640 of the C application on the fourth region 627. In this case, on the button 622, the display device 600 may display the indicator 621 that indicates an active region in which the execution window 640 of the C application is displayed.

FIG. 7C is a conceptual diagram of an activity stack that corresponds to FIG. 6H. The controller generates a stack of the C application when the C application is executed. The C application is assigned to the fourth region 627. Since a region displaying the execution window 630 of the B application in FIG. 6E is divided, the B application is assigned to a second region.

Figure 6I:
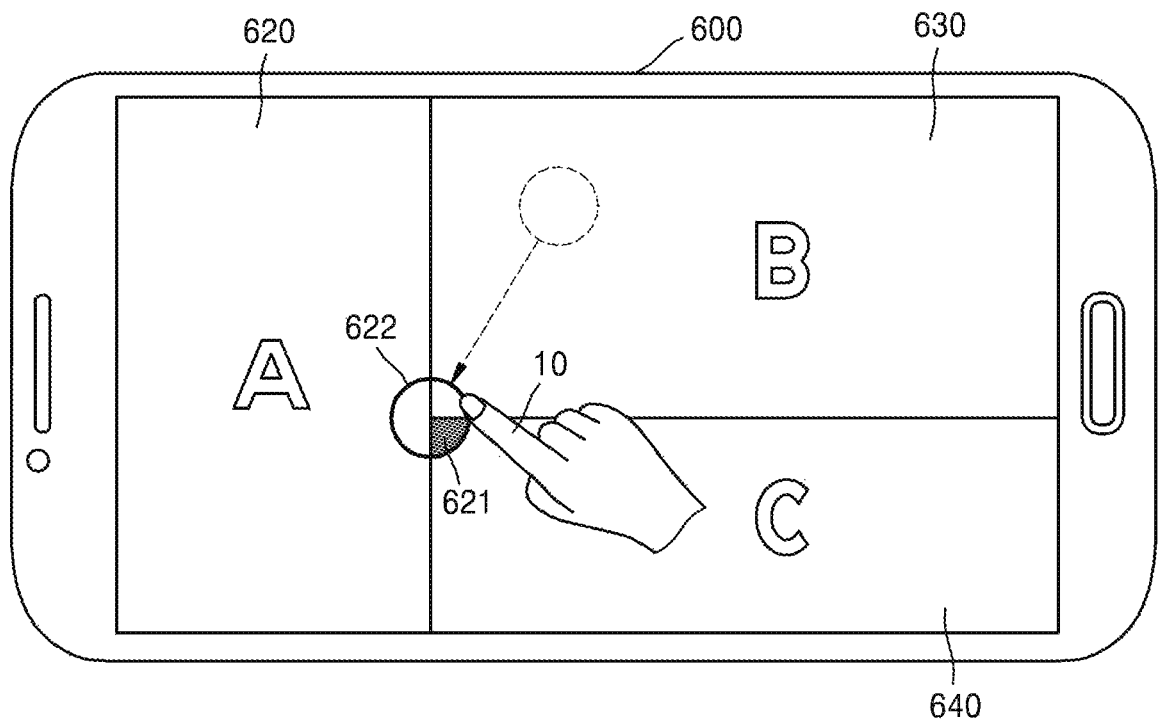

As shown in FIG. 6I, the user 10 may adjust sizes of regions displaying the execution windows 620 to 640 of the applications, according to an input of moving the button 622.

Figure 6J:
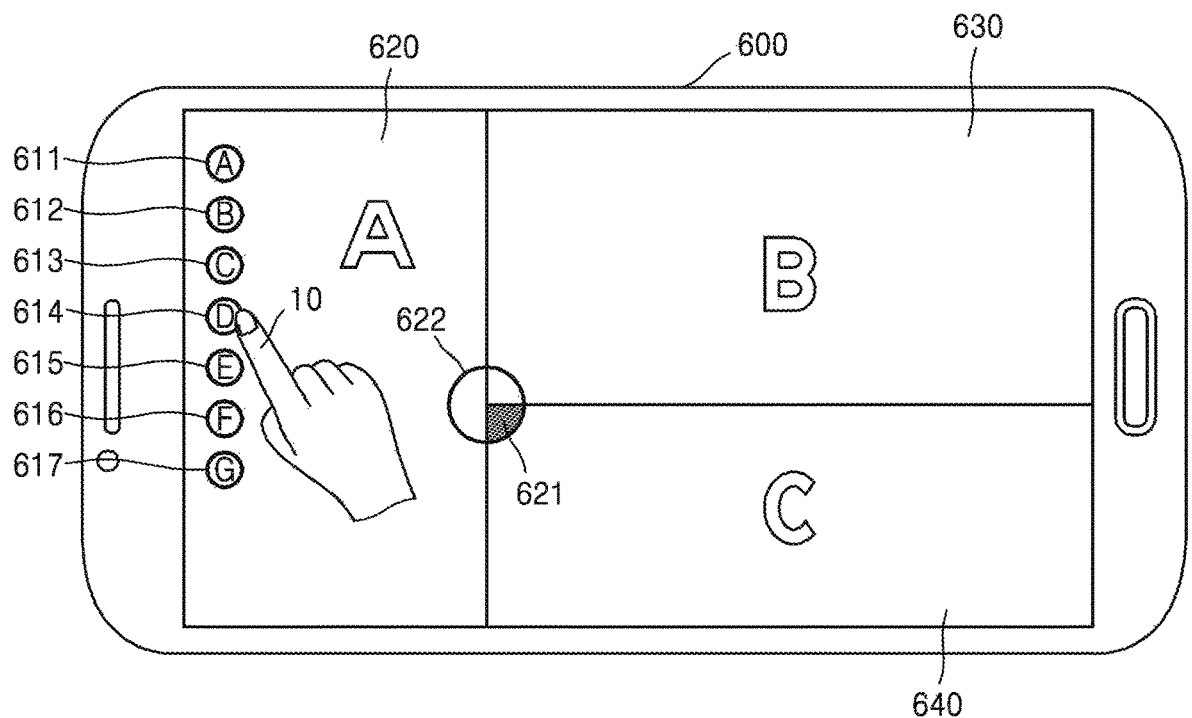
Figure 6K:
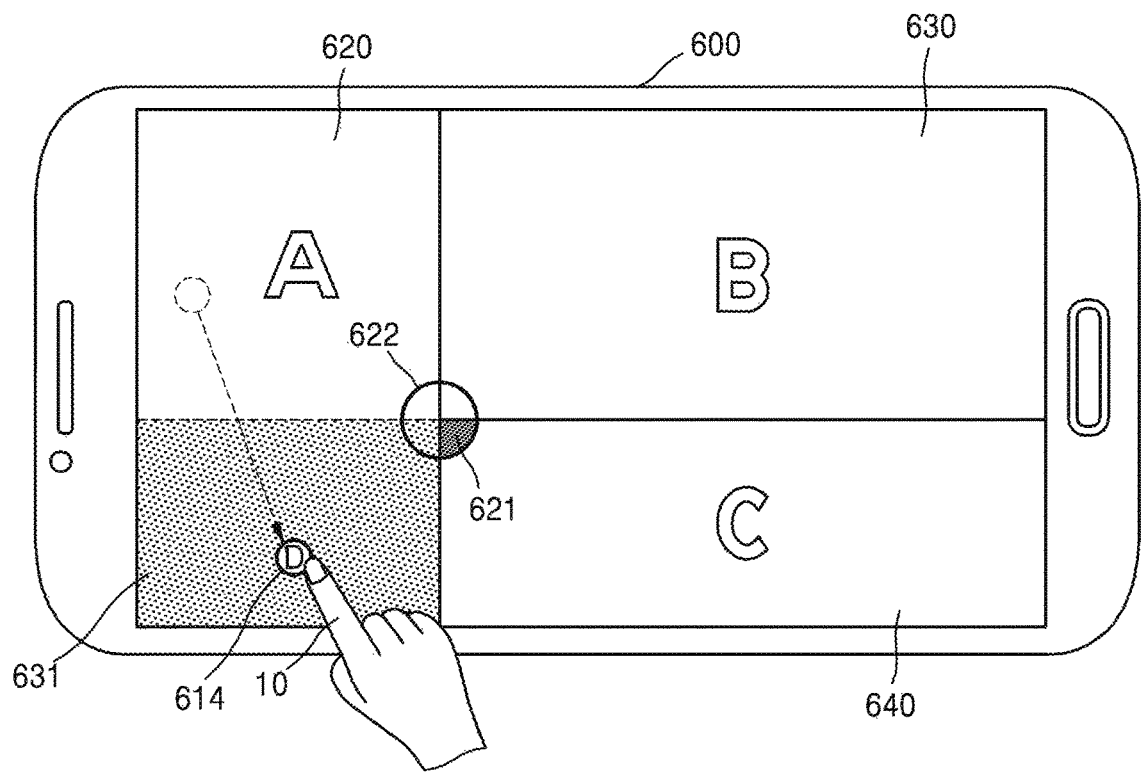

Next, the user 10 may touch an icon 614 that represents a D application as shown in FIG. 6J, and drag the icon 614 that represents the D application to a third region 631 as shown in FIG. 6K.

Figure 6L:
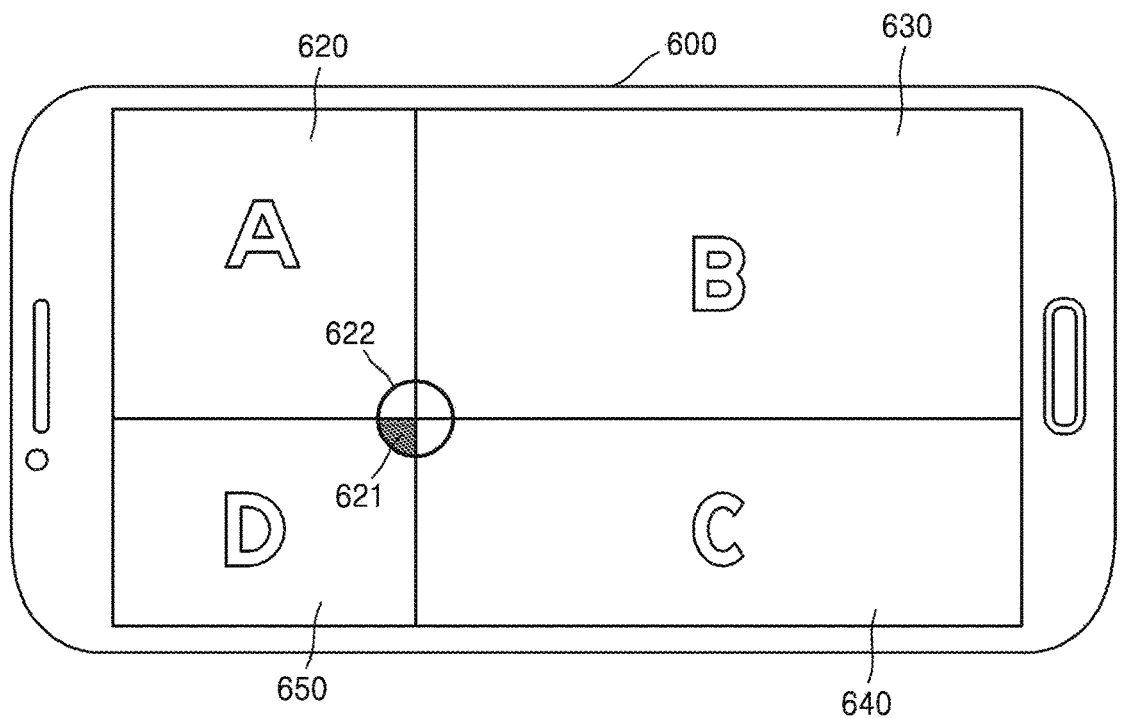

When an input of dragging the icon 614 that represents the D application to the third region 631 is finished, the display device 600 may execute the D application. As shown in FIG. 6L, the display device 600 may display an execution window 650 of the D application on the third region 631. In this case, on the button 622, the display device 600 may display the indicator 621 that indicates an active region in which the execution window 650 of the D application is displayed.

FIG. 7D is a conceptual diagram of an activity stack that corresponds to FIG. 6L. The controller generates a stack of the D application when the D application is executed. The D application is assigned to the third region 631. Since a region displaying the execution window 620 of the A application in FIG. 6I is divided, the A application is assigned to a first region.

Figure 6M:
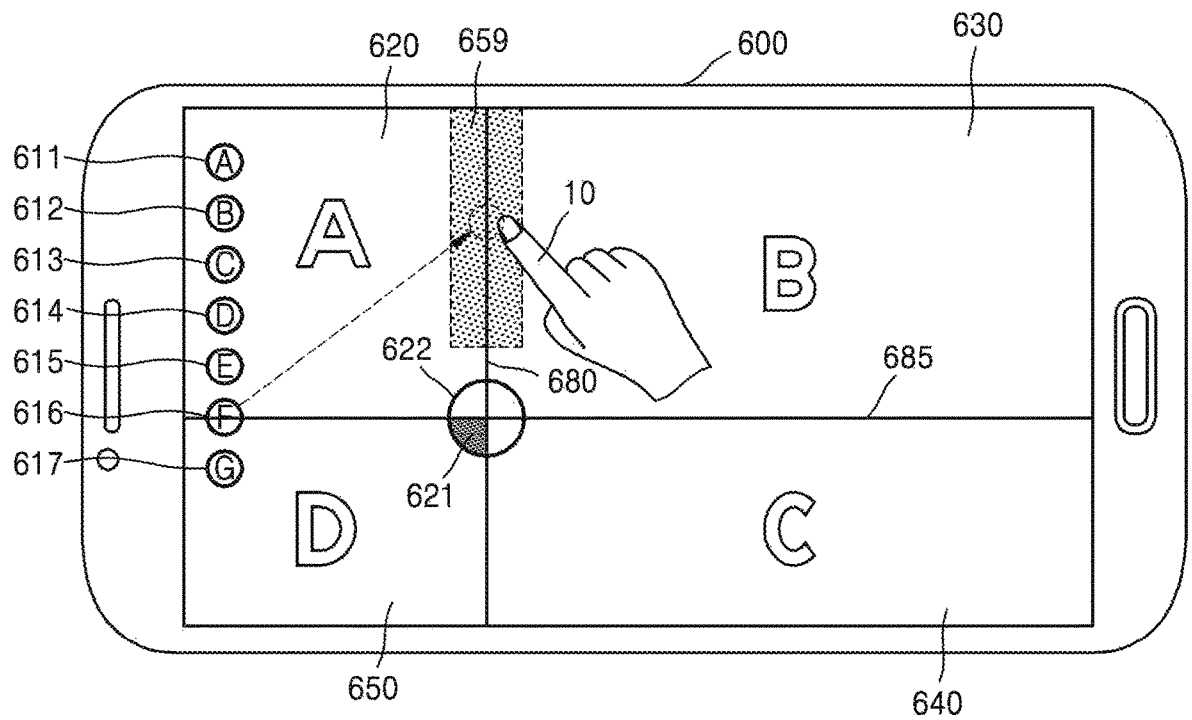

Next, as shown in FIG. 6M, the user 10 may touch an icon 615 that represents an E application, and then drag the icon 615 that represents the E application to a boundary region 659. The boundary region 659 is set by the display device 600 and includes a boundary line 680.

Figure 6N:
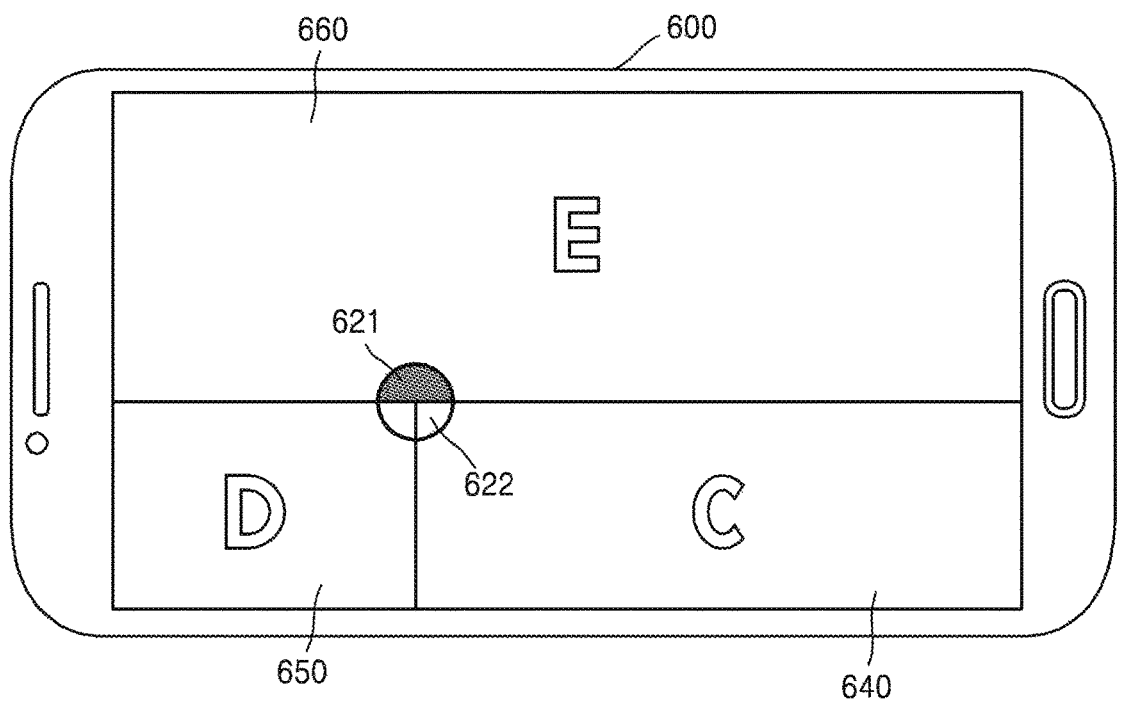

When an input of dragging the icon 615 that represents the E application to the boundary region 659 is finished, the display device 600 may execute the E application. As shown in FIG. 6N, the display device 600 may dispose an execution window 660 of the E application on a seventh region that includes first and second regions that are adjacent to the boundary line 680 in the boundary region. On the button 622, the display device 600 may display the indicator 621 that indicates an active region where the execution window 660 of the E application is displayed.

FIG. 7E is a conceptual diagram of an activity stack that corresponds to FIG. 6N. The controller may generate a stack of the E application. The E application is disposed in the seventh region, and the A and B application, which were respectively displayed in the first and second regions that are included in the seventh region, are disposed in the seventh region.

Figure 6O:
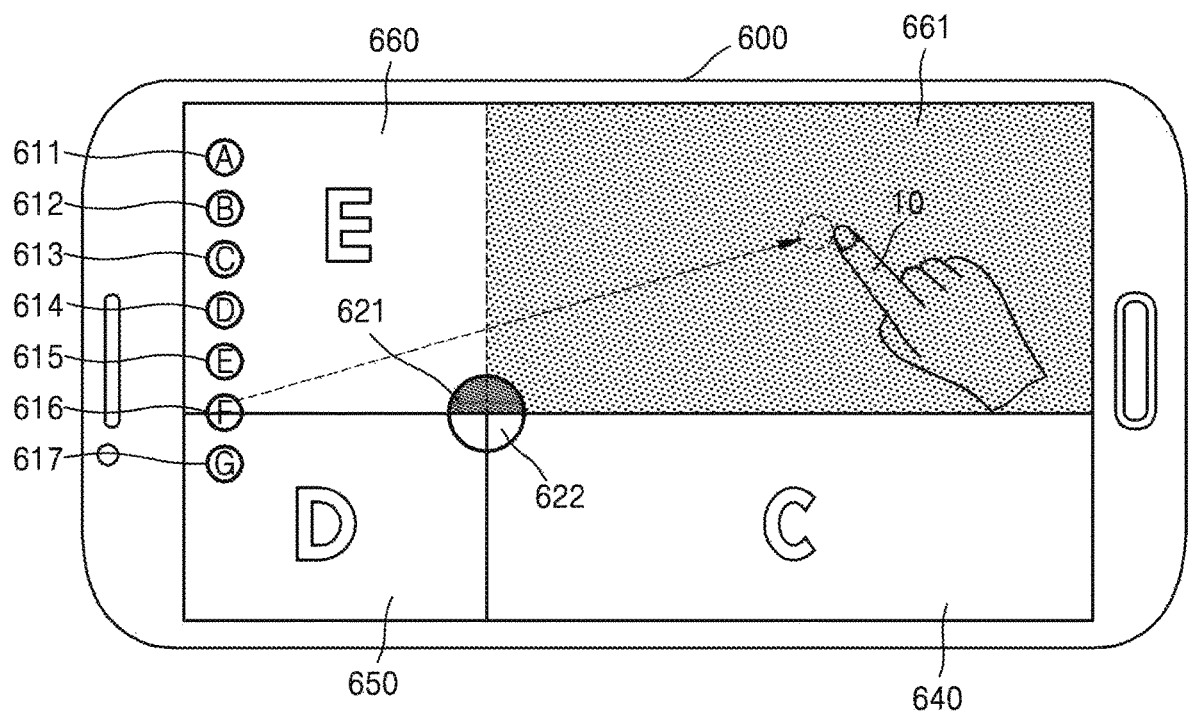

Next, as shown in FIG. 6O, the user 10 may touch an icon 616 that represents an F application, and drag the icon 616 that represents the F application to a second region 661.

Figure 6P:
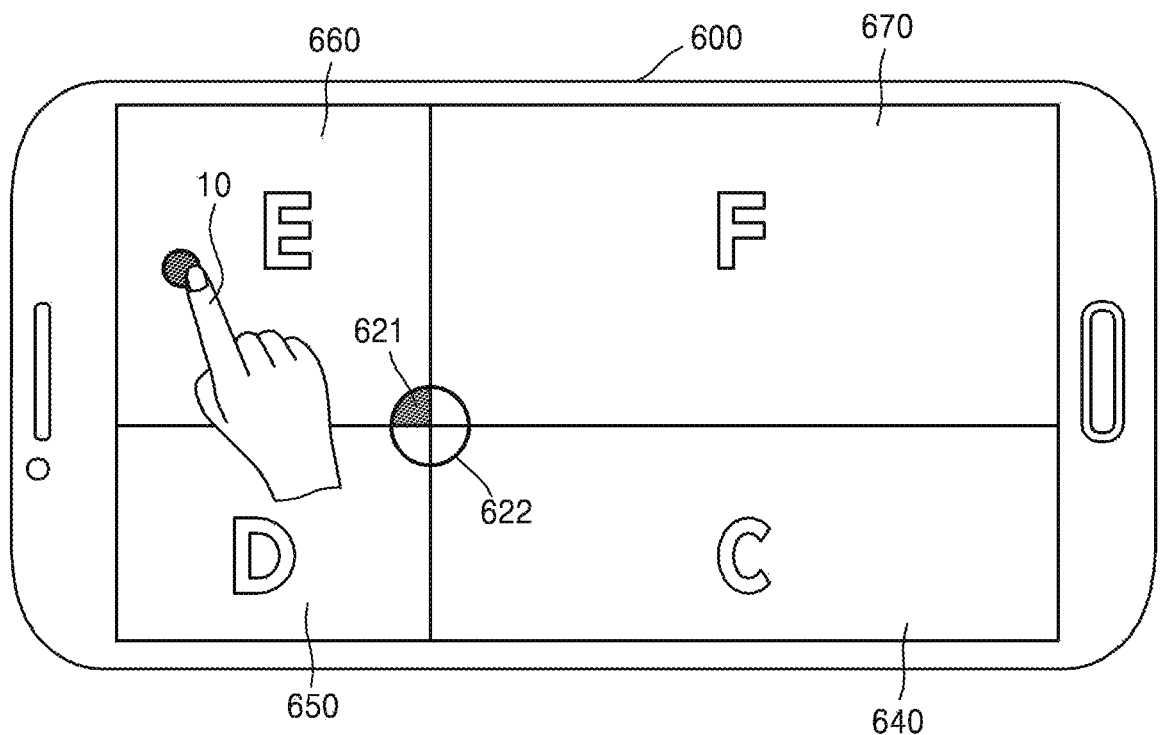

When an input of dragging the icon 616 that represents the F application to the second region 661 is finished, the display device 600 may execute the F application. As shown in FIG. 6P, the display device 600 may display an execution window 670 of the F application on the second region 661. In this case, the controller may generate a stack of the F application located in the second region, as shown in FIG. 7F. Since the seventh region is divided, the A application, the B application, and the E application located in the seventh region may be disposed to a first region.

Next, as shown in FIG. 6P, the touch screen may receive an input of selecting the execution window 660 of the E application from the user 10. When the execution window 660 of the E application is selected, the controller may dispose the stack of the E application at the top, as shown in FIG. 7G. In this case, on the button 622, the display device 600 may display the indicator 621 that indicates a location where the execution window 660 of the E application is displayed.

Figure 6Q:
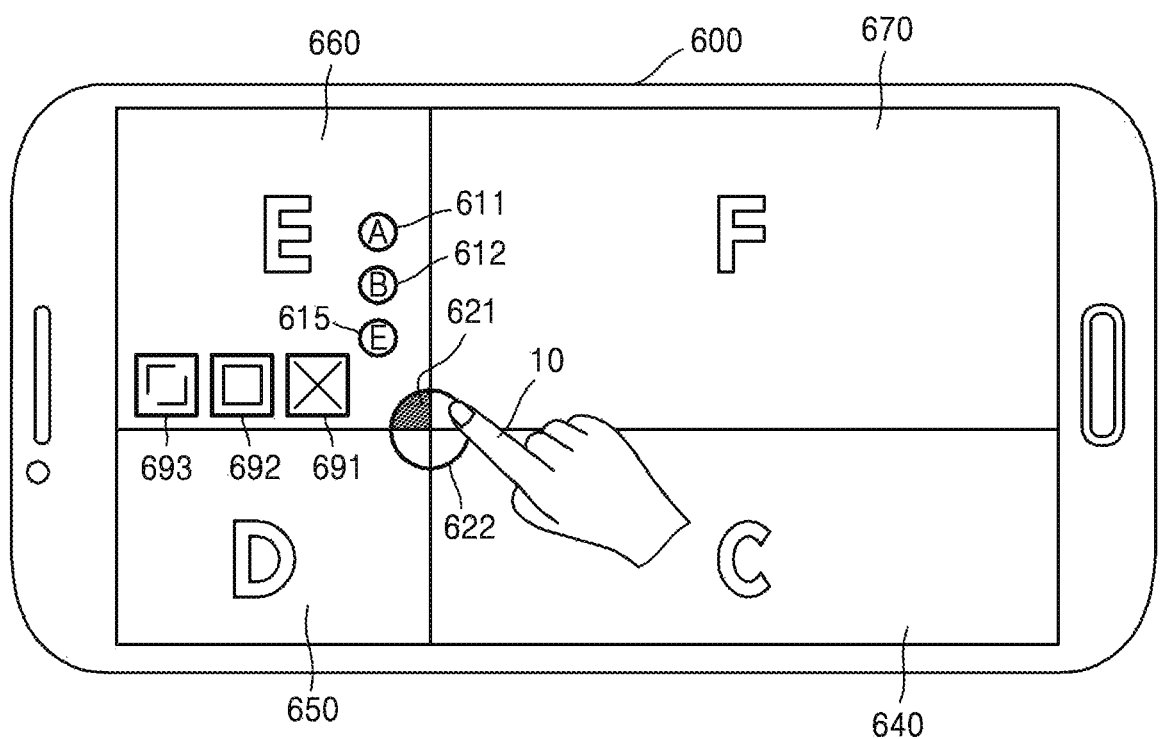
Figure 6R:
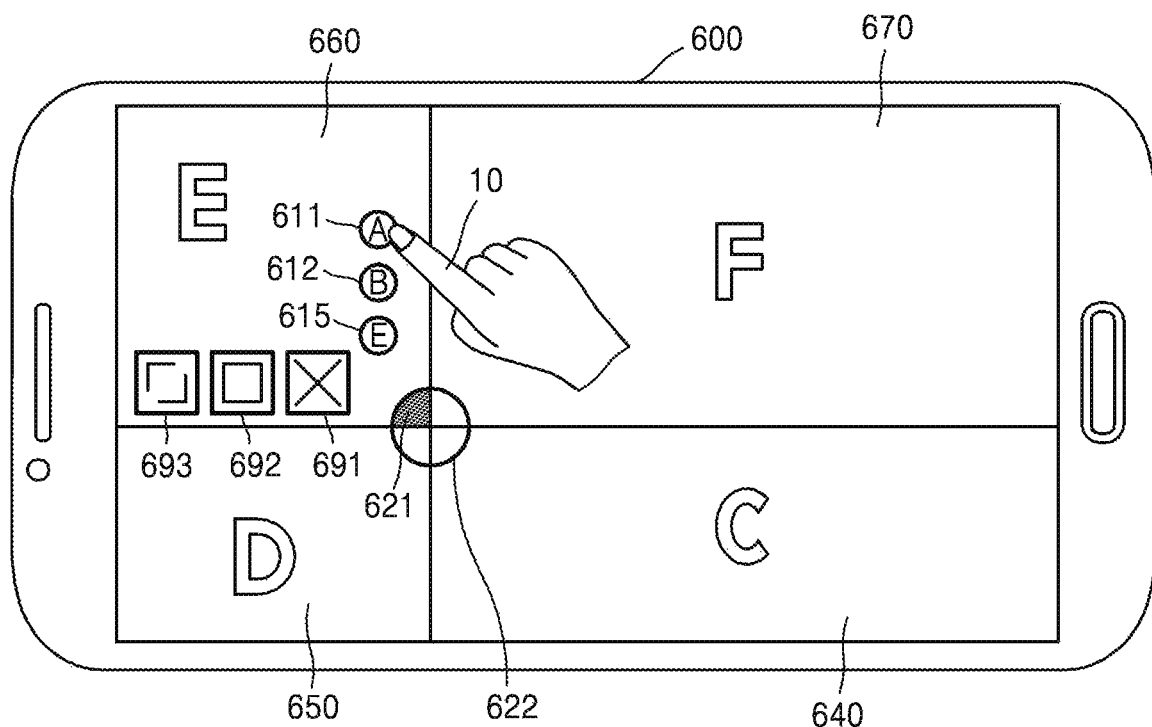

Referring to FIG. 6Q, the display device 600 may receive an input of selecting the button 622 from the user 10. For example, the user 10 may touch the button 622. When the input of selecting the button 622 is received, the display device 600 may display a list of applications (611, 612, and 615) located in a first region that is an active region. That is, with reference to the activity stack of FIG. 7G, icons that respectively represent the A application, the B application, and the E application located in the first region may be displayed in the first region.

Also, when the input of selecting the button 622 is received, the display device 600 may further display icons 691, 692, and 693 that represent operations related to application execution windows displayed in the first region.

Figure 6S:
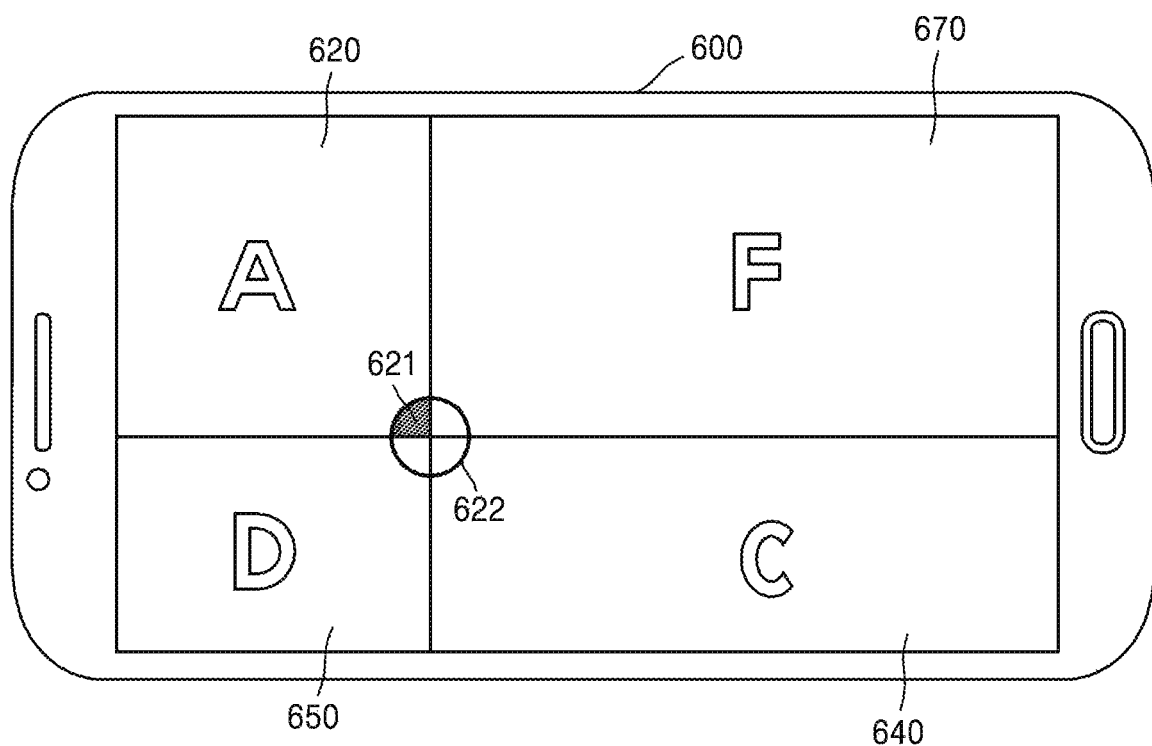

When an input of selecting the icon 611 that represents the A application from among icons shown on the first region is received, the display device 600 may display the execution window 620 of the A application in the first region, as shown in FIG. 6S.

FIG. 7H is a conceptual diagram of an activity stack that corresponds to FIG. 6S. When the icon 611 that represents the A application is received, the controller may dispose the stack of the A application at the top.

Figure 6T:
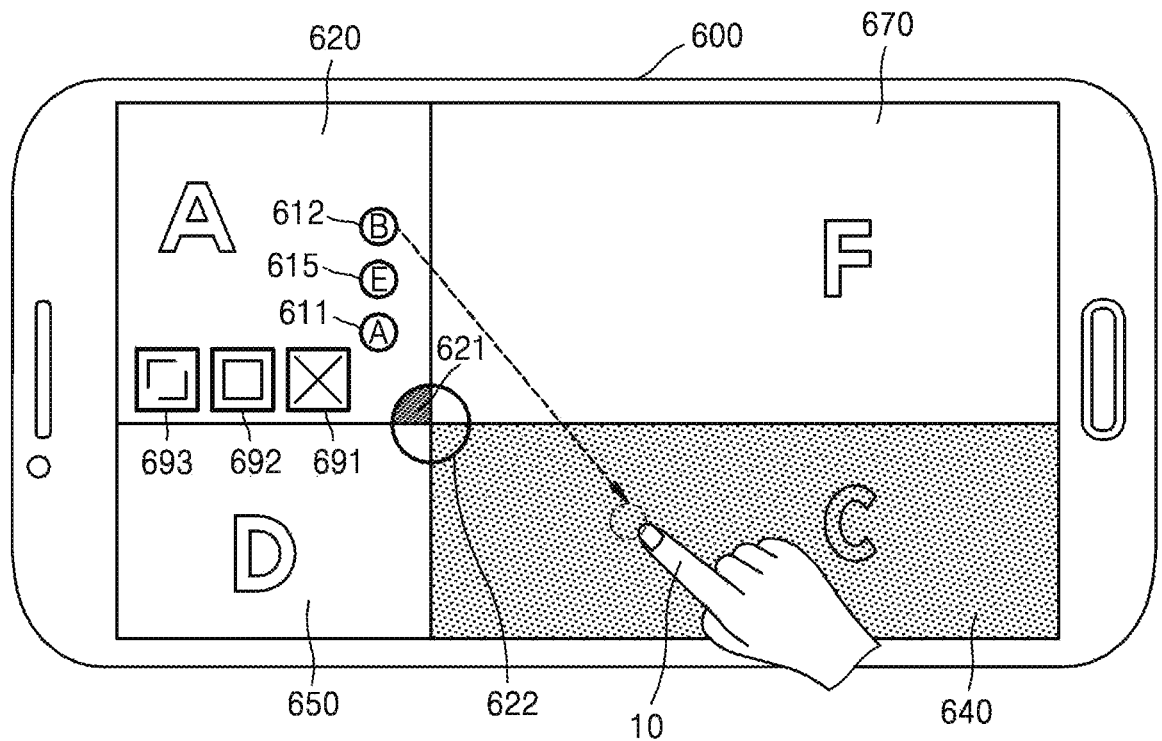
Figure 6U:
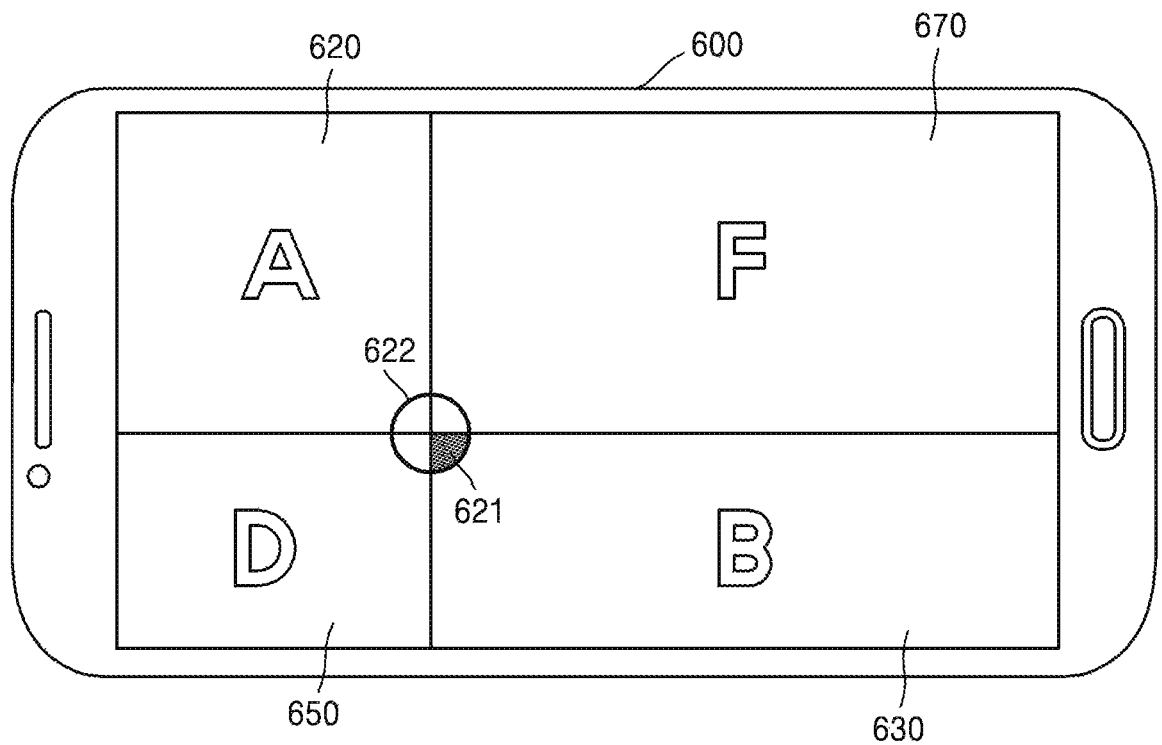

Referring to FIG. 6T, when an input of selecting the button 622 is received, the list of the applications (611, 612, and 615), which are located in the first region that is an active region, may be displayed. Also, as shown in FIG. 6T, an input of dragging the icon 612 that represents the B application to a region displaying the execution window 640 of the C application may be received from the user 10. When the input of dragging the icon 612 that represents the B application to the region displaying the execution window 640 of the C application is finished, the display device 600 may display the execution window 630 of the B application in a fourth region, as shown in FIG. 6U. In this case, on the button 622, the display device 600 may display the indicator 621 that indicates a location where the execution window 630 of the B application is displayed.

FIG. 7I is a conceptual diagram of an activity stack that corresponds to FIG. 6U. When the execution window 630 of the B application is displayed in the fourth region, the controller may update a region where the B application is located to the fourth region, and dispose the stack of the B application to the top.

Referring to FIG. 6V, when an input of selecting the button 622 is received, the icons 691, 692, and 693, which represent operations related to the application execution windows displayed in the first region that is an active region, may be further displayed. The operations related to the application execution windows may include performing various additional functions related to the application execution windows. For example, an icon that represents an execution window related operation may include at least one selected from a close button 691 for closing the execution window, a full screen button 692 for displaying the execution window on an entire area of the touch screen, and a capture button 693 for capturing the execution window. However, the present invention is not limited to the example above. When an input of selecting the close button 691 is received from the user 10 as shown in (a) of FIG. 6V, the controller may close the execution window of the A application as shown in (b) of FIG. 6V.

FIG. 7J is a conceptual diagram of an activity stack that corresponds to FIG. 6V. When the execution window of the A application is closed, the stack of the A application may be deleted.

Referring to FIG. 6W, when an input of selecting the full screen button 692 is received from the user 10 as shown in (a) of FIG. 6W, the display device 600 may display the execution window 660 of the A application, which is displayed in the active region, on the entire area of the touch screen as shown in (b) of FIG. 6W

Also, when an input of selecting the capture button 693 is received from the user 10, the display device 600 may capture the execution window 660 that is activated.

Figure 8:
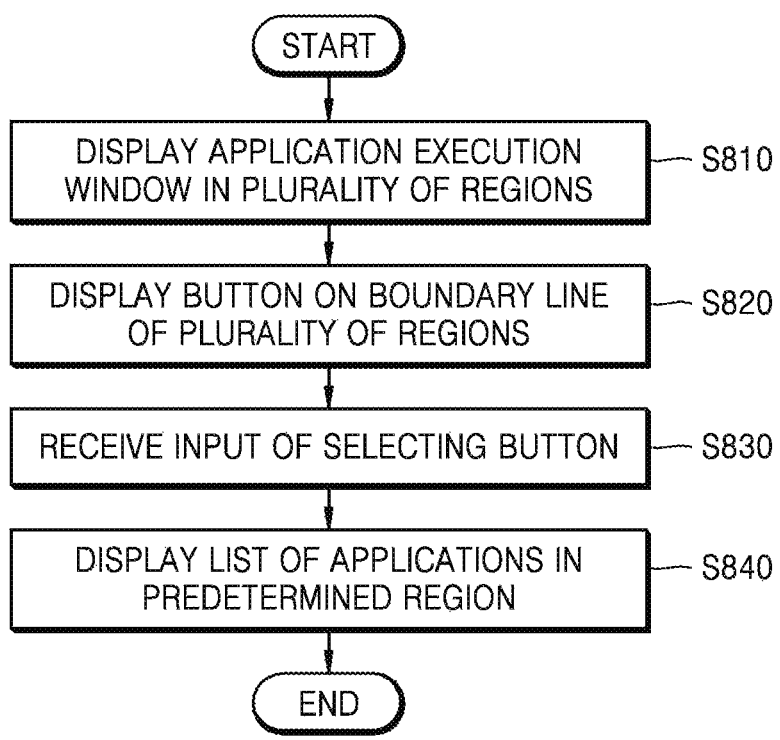
FIG. 8 is a flowchart of a method of providing a user interface for executing an application by using a display device, according to some embodiments.

FIG. 8 is a flowchart of a method of providing a user interface for executing an application by using a display device, according to an embodiment of the present invention.

First, the display device may display an application execution window on each of a plurality of regions in a touch screen (S810). Also, the display device may display a button on at least one boundary line that divides the plurality of regions (S820).

On the button, the display device may display an indicator that indicates an active region. The active region may refer to a region that is selected last from among the plurality of regions. Also, the active region refers to a region displaying an execution window that may be controlled by an input of a user.

Next, the display device may receive an input of selecting the button (S830). When the input of selecting the button is received, the display device may display a list of applications in a predetermined region (S840). The predetermined region may be the active region.

Also, the list of applications may be a list of at least one icon that represents at least one application. When an input of selecting at least one of the applications in the list is received, the display device may display an execution window of the selected application on a selected region. When a touch input of dragging an icon in the list is received, the display device may display an execution window of an application that corresponds to the icon in an area to which the icon has been dragged.

Also, the display device may further display an icon that represents an operation related to an application execution window displayed in a predetermined region. An icon that represents an operation related to the application execution window displayed in the predetermined region may include at least one selected from a capture button for capturing the application execution window displayed in the predetermined region, a close button for closing the application execution window displayed in the predetermined region, and a full screen button that displays the application execution window displayed in the predetermined region on an entire area of the touch screen.

Figure 9:
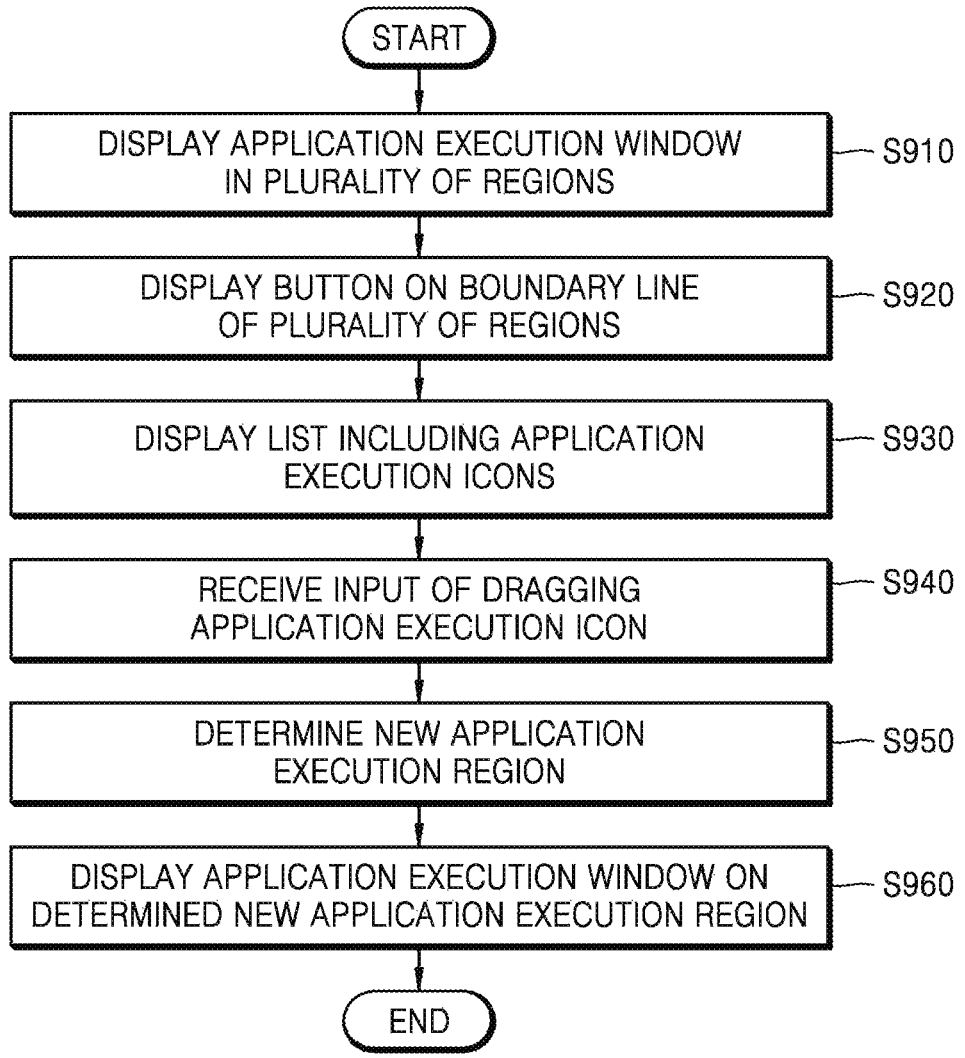
FIG. 9 is a flowchart of a method of executing an application by using a display device, according to other embodiments.

FIG. 9 is a flowchart of a method of executing an application by using a display device, according to another embodiment of the present invention.

First, the display device may display an application execution window on each of a plurality of regions in a touch screen (S910). Also, the display device may display a button on at least one boundary line that divides the plurality of regions (S920).

Next, the display device may display a list including at least one application execution icon on a portion of the touch screen (S930).

Next, based on a location to which an application execution icon is dragged and a location of the button, the display device may determine a new application execution region (S940). The new application execution region refers to a region where an execution window of an additionally executed application is to be displayed.

When a location where a drag input is finished is included in a boundary region that includes the at least one boundary line, the new application execution region may be determined such that areas near the at least one boundary line are included.

Next, the display device may display an application execution window on the determined new application execution region (S950).

Figure 10:
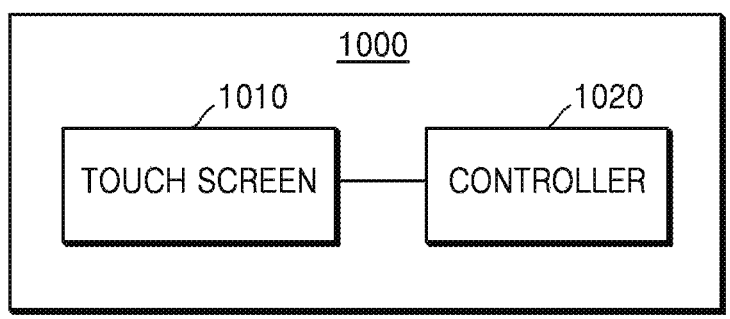
FIG. 10 is a simple block diagram of a display device according to some embodiments.

FIG. 10 is a simple block diagram of a display device according to an embodiment of the present invention.

A display device 1000 according to an embodiment of the present invention may display an application execution window on each of a plurality of regions, and display a button on at least one boundary line that divides the plurality of regions. The display device 1000 may include a touch screen 1010 that receives an input of selecting the button, and a controller 1020 that controls, based on the received input, the touch screen such that a list of at least one application executed in a predetermined region from among the plurality of regions is displayed in the predetermined region.

The predetermine region includes an active region that may be controlled by an input of the user. The active region may be a region that is selected last from among the plurality of regions.

Also, the controller 1020 may control the touch screen such that an indicator that indicates the active region is displayed on the button.

FIGS. 11A to 11D are diagrams for describing a method of displaying a button according to an embodiment of the present invention.

Figure 11A:
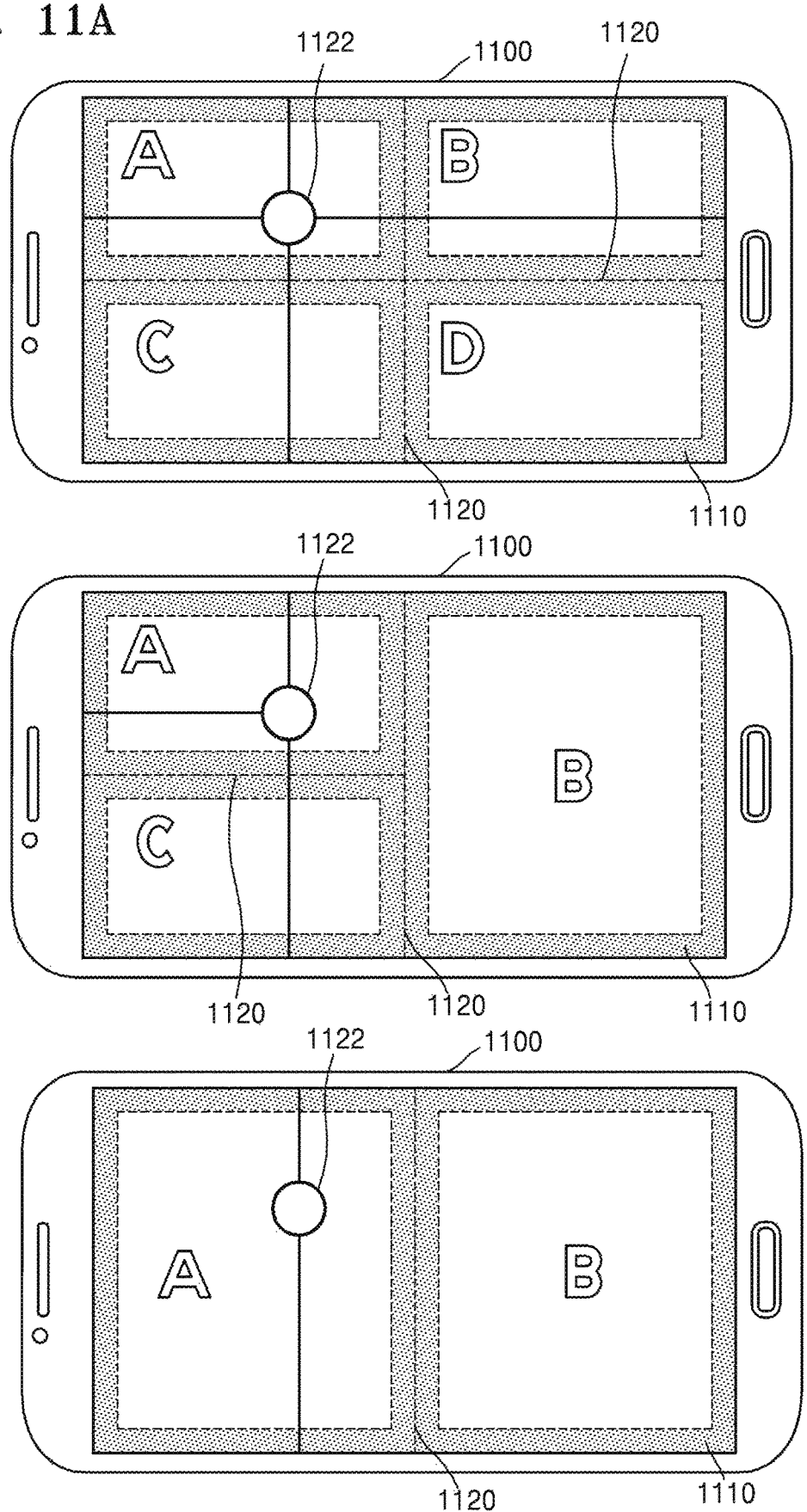

Referring to FIG. 11A, a display device 1100 may display a button 1122 on a boundary line that divides a region in which execution windows of a plurality of applications are displayed. Also, the display device 1100 may set an alignment line 1120 according to a layout that displays the execution windows. Other than a dotted line 1120 shown in FIG. 11A, a boundary line of a touch screen may be further included in the alignment line.

Also, the display device 1100 may further set an alignment region 1110. The alignment line 1120 may be included in the alignment region 1110.

As shown in FIG. 11A, the alignment line 1120 and the alignment region 1110 may be determined based on the number and locations of the execution windows of the applications displayed on the touch screen. That is, when the layout is an upper and lower 2-split layout, a left and right 2-split layout, a 3-split layout, or a 4-split layout, the alignment line 1120 and the alignment region 1110 may be determined according to each layout.

Figure 11B:
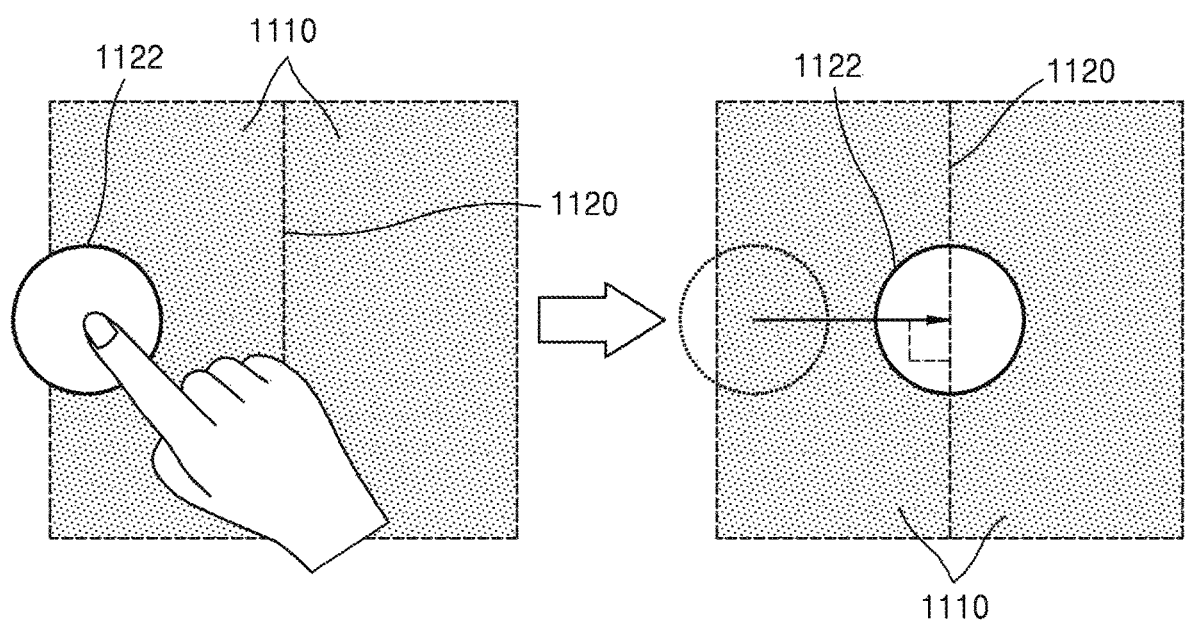

Referring to FIG. 11B, when the display device 1100 receives an input of moving the button 1122 into the alignment region 1110 via the touch screen, the display device 1100 may move the button 1122 from a location where the button 1122 was moved last to the alignment line 1120 nearby.

The display device 1100 may determine regions displaying the execution windows of the plurality of applications based on the location of the button 1122 that is moved onto the alignment line 1120. Accordingly, the display device 1100 may arrange the regions displaying the execution windows of the plurality of applications.

Also, referring to (a) of FIG. 11C, the display device 1100 may set an alignment point 1130 at a preset point on the alignment line 1120. When the display device 1100 receives a predetermined input (e.g., an input of consecutively touching a button two times) with respect to the button 1122, the display device 1100 may move the button 1122 to the alignment point 1130 as shown in (b) of FIG. 11C.

Figure 11D:
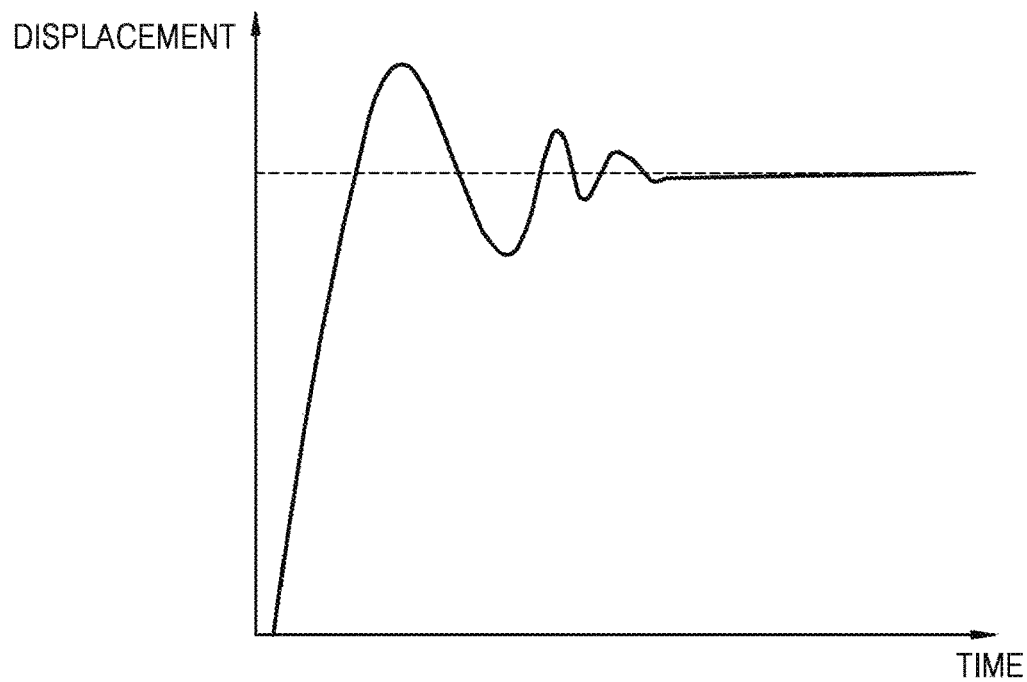

Also, according to an embodiment of the present invention, when the button 1122 is moved based on FIGS. 11A to FIG. 11C, an animation may be applied by using a function shown in FIG. 11D. That is, when the button 1122 is moved to the alignment line 1120 or the alignment point 1130, the button 1122 may pass by the alignment line 1120 or the alignment point 1130 and then be moved to the alignment line 1120 or the alignment point 1130 again.

Figure 12:
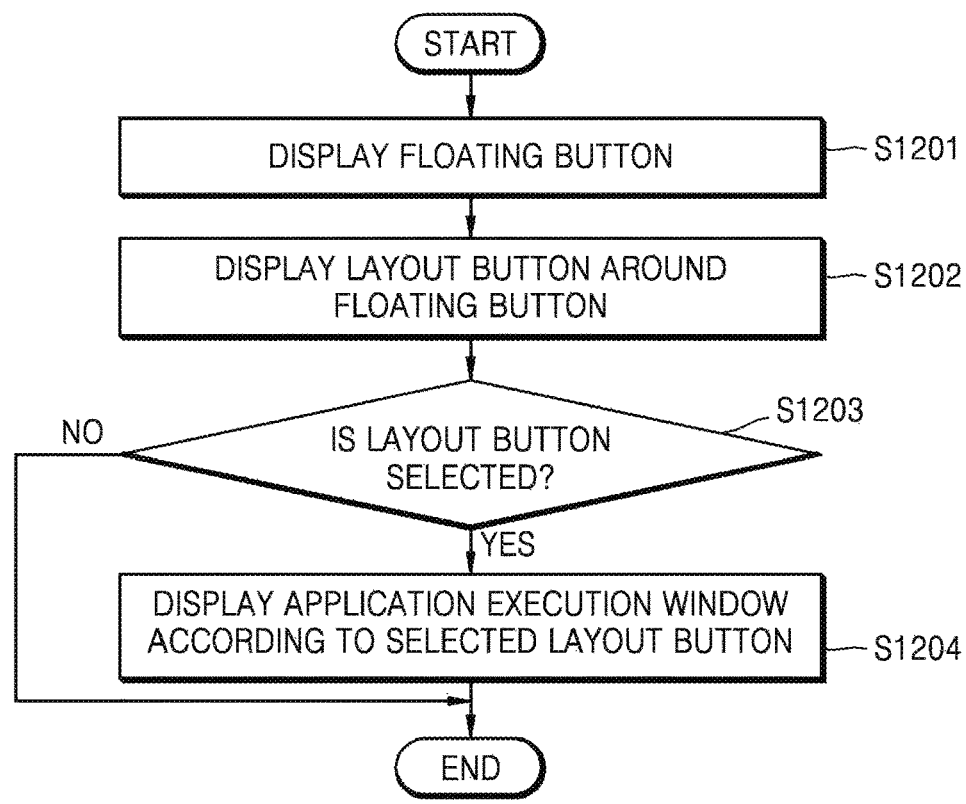
FIG. 12 is a flowchart of a process of controlling a display device such that an application execution window is displayed, according to some embodiments.

FIG. 12 is a flowchart of a process of controlling a display device such that an application execution window is displayed, according to some embodiments.

First, the display device may display a floating button on a touch screen (S1201). The floating button may refer to an object that is displayed "on top" in front of content (e.g., an application execution window) displayed by the display device, and moved according to an input of a user. For example, the floating button may be a semi-transparent icon that is moved when a drag input is received from the user.

Figure 19:
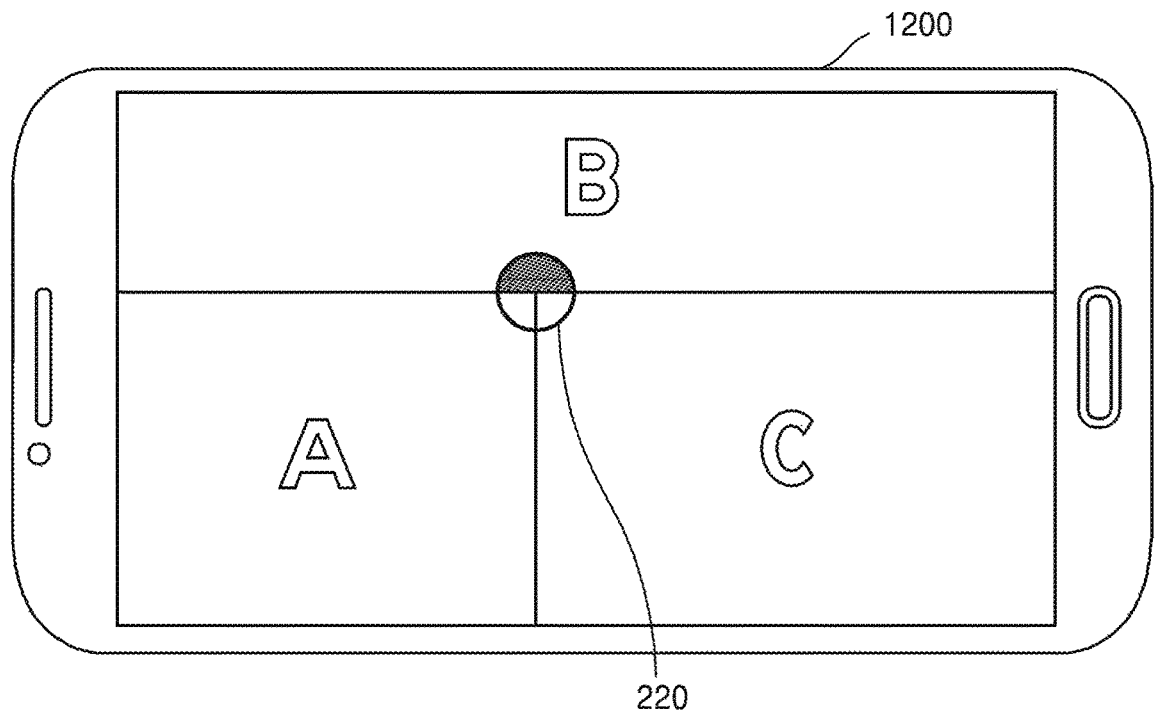
Figure 21:
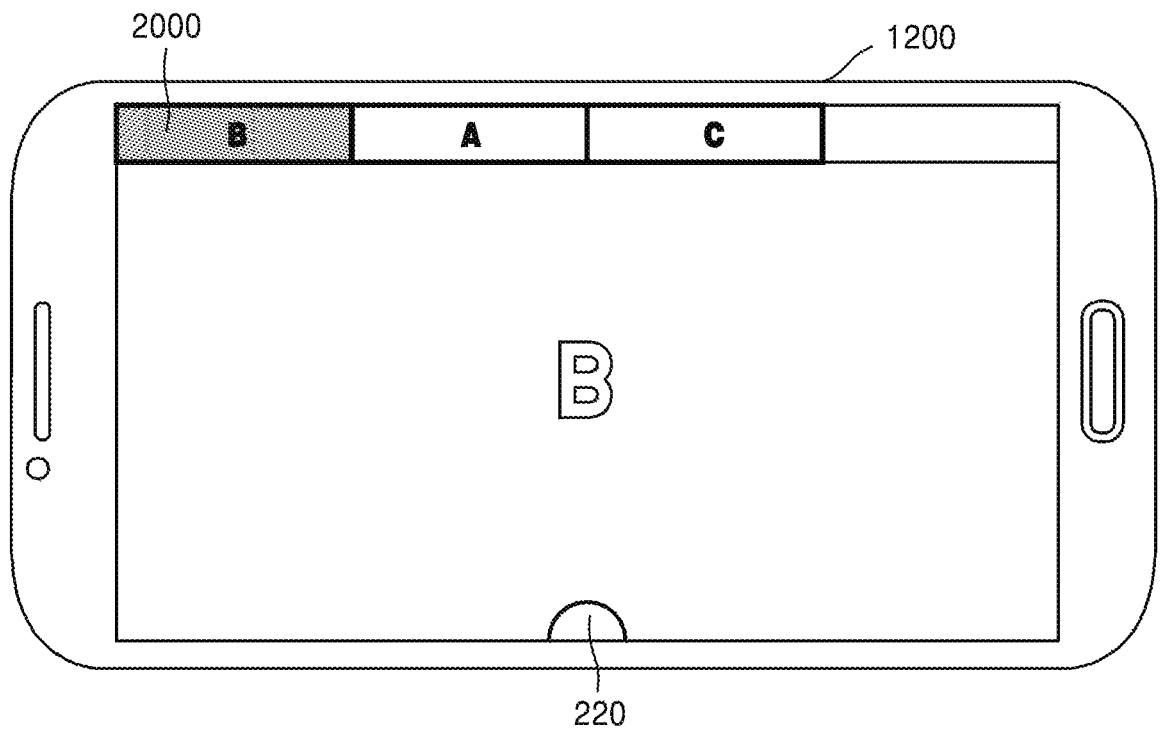

Also, on the touch screen, the display device may display a user interface for controlling the display device according to a displayed location of the floating button. According to some embodiments, the display device may display a user interface that includes a layout button around the floating button (S1202). The layout button may indicate an object that determines a display method of an application execution window. The display method may refer to a display mode of displaying the application execution window. For example, the display method may be any one selected from, but is not limited to, a window mode of displaying application execution windows respectively in regions 1210, 1220, and 1230 set in the touch screen as shown in FIG. 13, a partition mode of displaying the application execution windows respectively in regions that divide the touch screen as shown in FIG. 19, and a tab mode of displaying tabs 2000 that respectively correspond to applications as shown in FIG. 21.

Next, the display device may select the layout button based on an input of the user. The input of the user may be a touch input with respect to the layout button displayed on the touch screen. When the layout button is selected (S1203), the display device may display the execution windows of the plurality of applications on the touch screen according to the selected layout button (S1204).

FIGS. 13 to 23 are exemplary diagrams of a display device displaying an application execution window, according to some embodiments.

Figure 13:
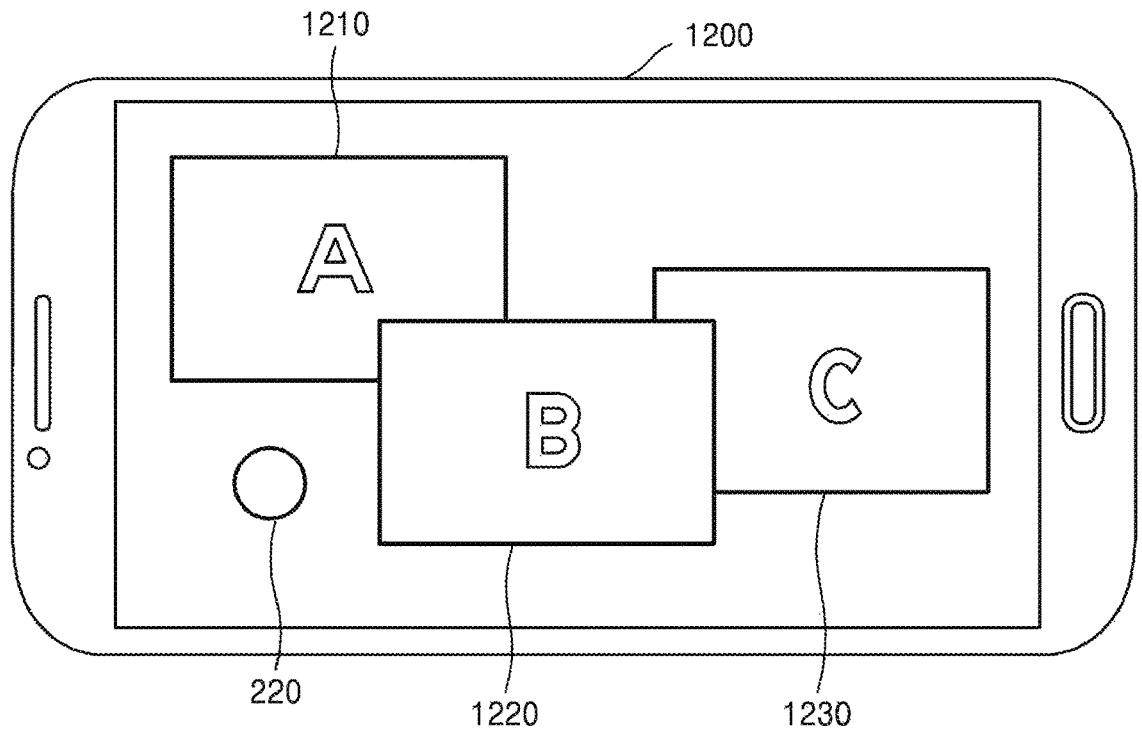
FIGS. 13 to 23 are exemplary diagrams of a display device displaying an application execution window, according to some embodiments.

As shown in FIG. 13, a display device 1200 may display the button 220 on a touch screen. The button 220 may be a floating button. Also, the display device 1200 may display at least one application execution window. For example, when a display method is the window mode, the display device 1200 may display application execution windows respectively in the regions 1210, 1220, and 1230 that are set in the touch screen. FIGS. 13 to 18 illustrate examples in which the display device displays the application execution windows in the case that the display method is the window mode.

Figure 14:
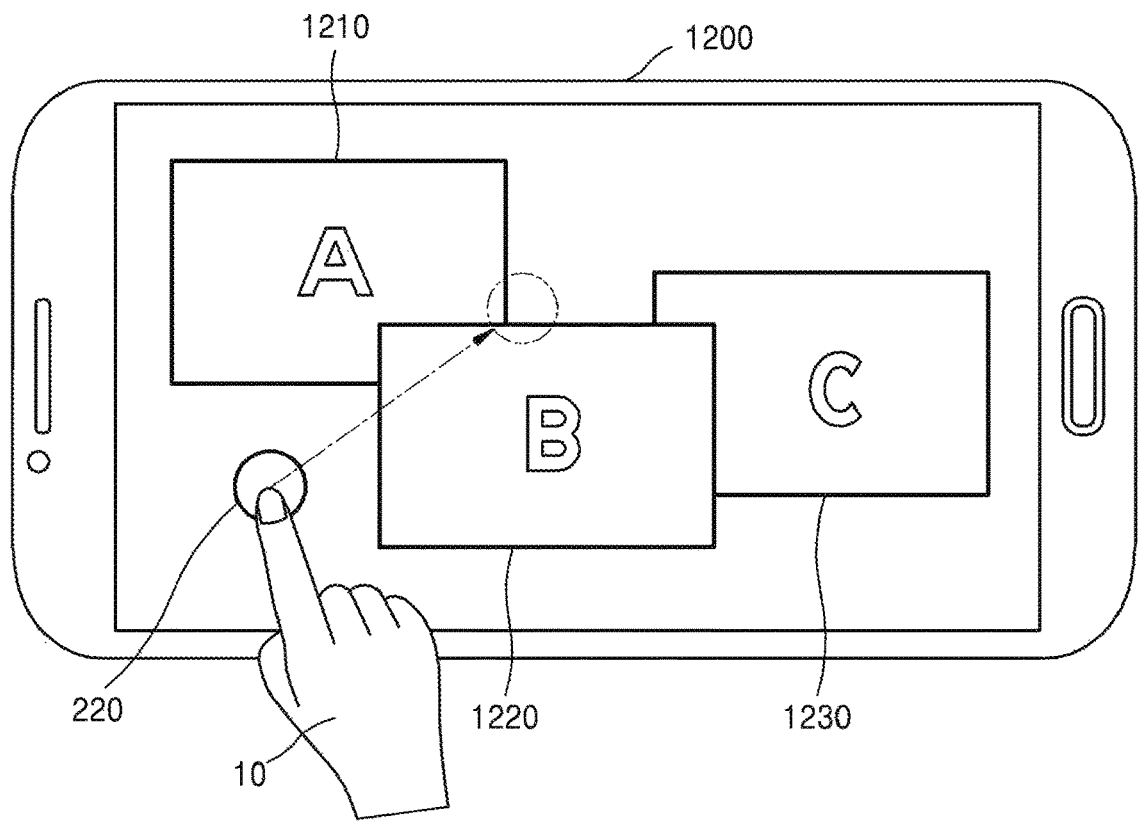
Figure 15:
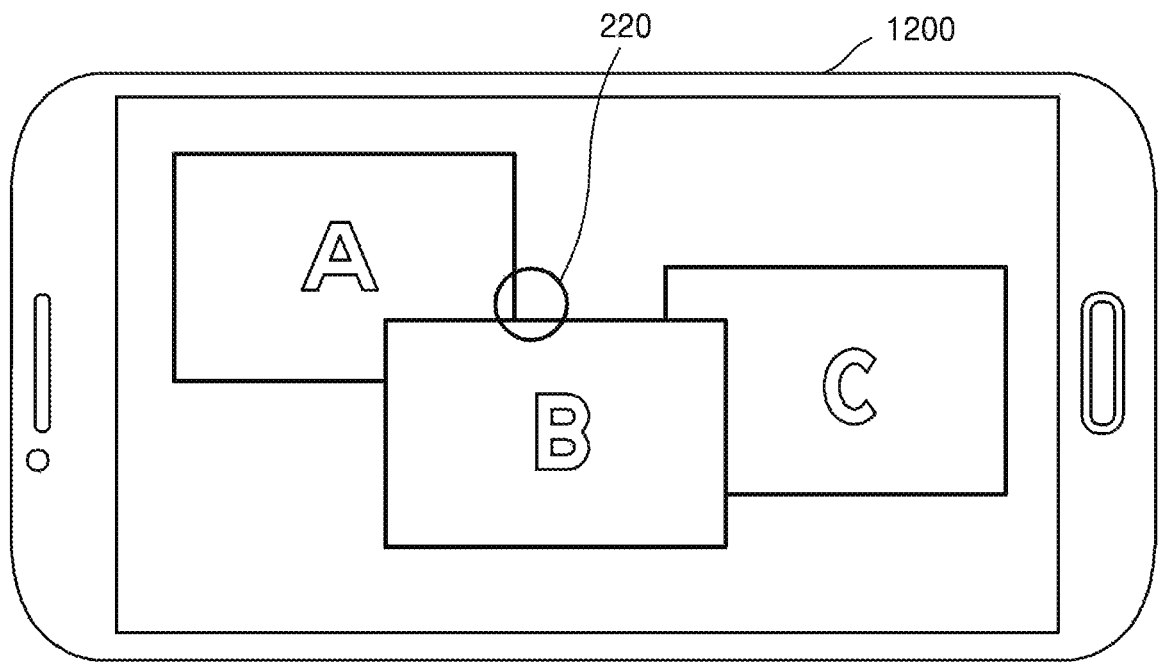

When the button 220 is a floating button, a display location of the button 220 may change according to a touch input of the user. For example, as shown in FIG. 14, the display device 1200 may receive a drag input that starts at a display location of the button 220 via the touch screen from the user 10. When the drag input is received, as shown in FIG. 15, the display device may display the button 220 at a location where the drag input has ended. The drag input is only an example of the touch input for describing an embodiment, and may be replaced with other types of touch input. The button 220 may be transparent or semi-transparent so that the user may see an application execution screen to be displayed in an area where the button 220 is located.

Figure 16:
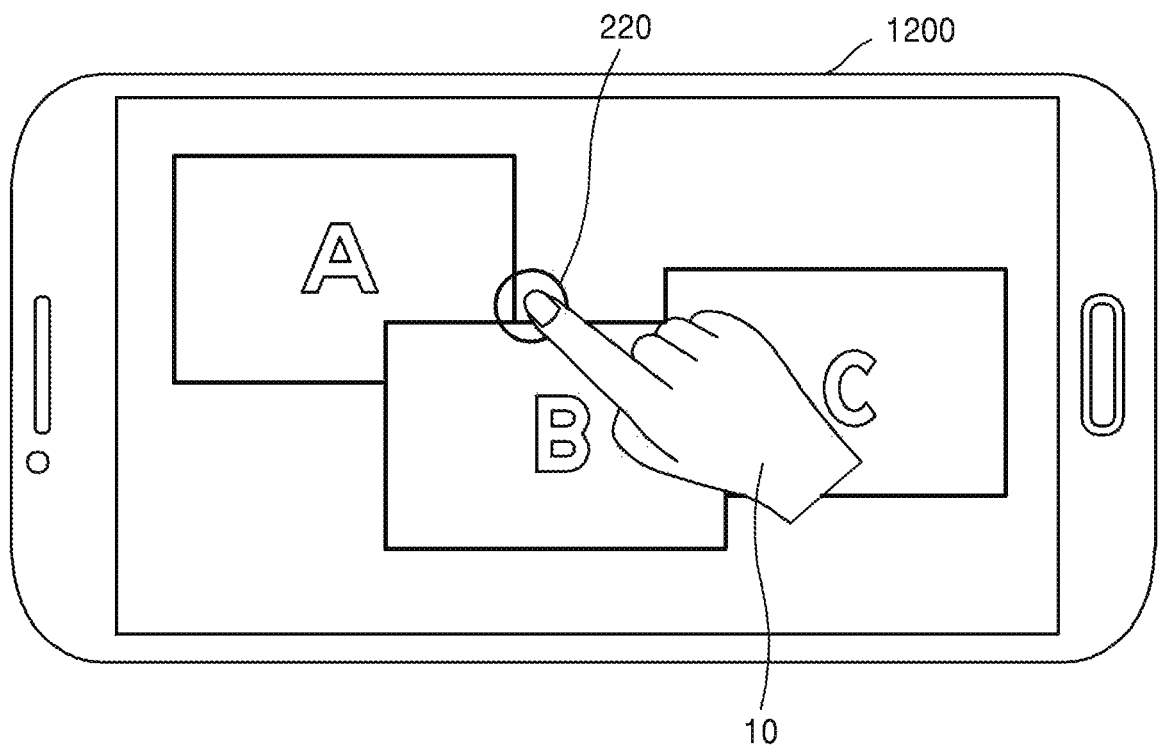
Figure 17:
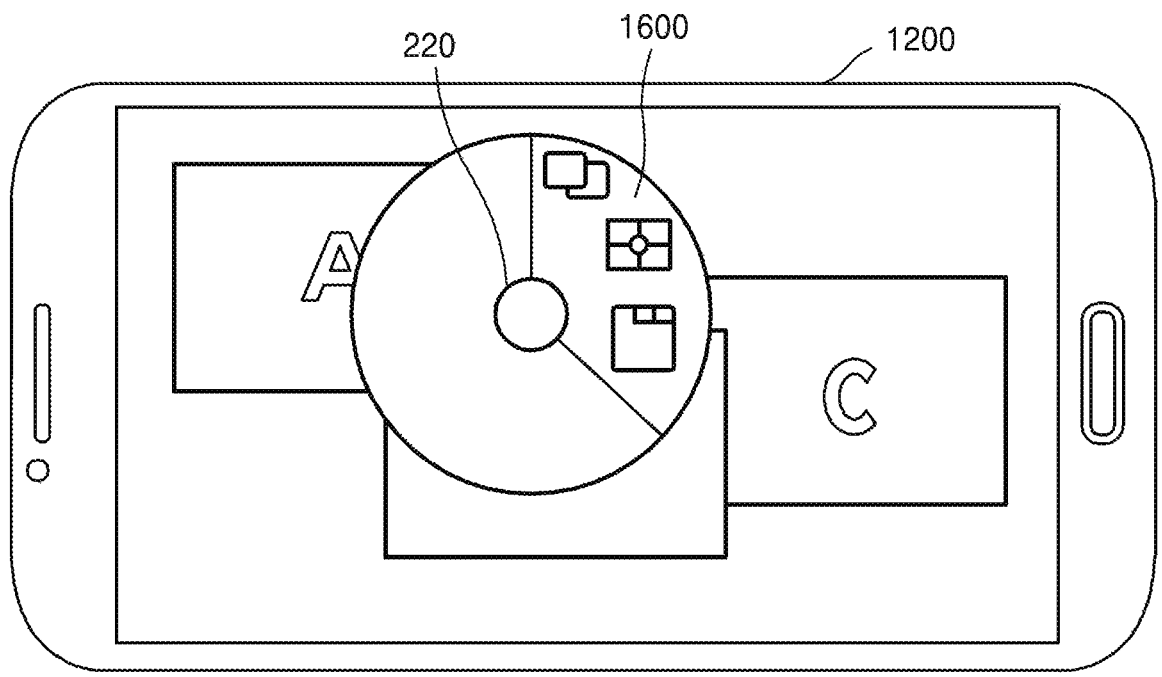

Also, according to some embodiment, the display device 1200 may receive an input of selecting the button 220 from the user 10. For example, as shown in FIG. 16, the display device 1200 may receive a touch input with respect to a display location of the button 220. When the input of selecting the button 220 is received, the display device 1200 may display a user interface 1600 around the button 220 as shown in FIG. 17. The user interface 1600 may include a graphic user interface (GUI) object (e.g., an icon) for the user 10 to control the display device 1200. The layout button may refer to an object that determines a display method of application execution windows. The display method may refer to a display mode of displaying the application execution windows. For example, the display method may be any one selected from, but is not limited to, the window mode of displaying application execution windows respectively in the regions 1210, 1220, and 1230 set in the touch screen as shown in FIG. 13, the partition mode of displaying the application execution windows respectively in regions that divide the touch screen as shown in FIG. 19, and the tab mode of displaying tabs 2000 that respectively correspond to applications as shown in FIG. 21.

Figure 18:
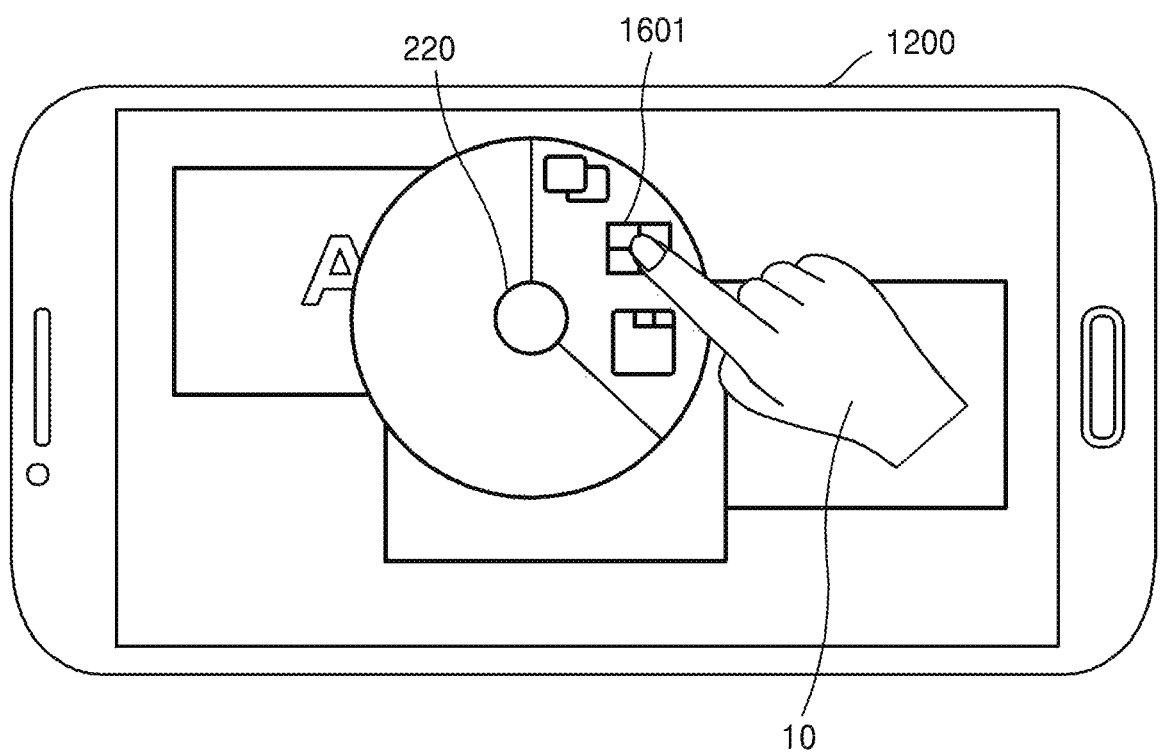

As shown in FIG. 18, when a partition mode button 1601 in the user interface 1600 is selected by a touch input of the user 10, the display device 1200 may divide an entire area of the touch screen into a plurality of regions. The display device 1200 may display an application execution window in each of the plurality of regions. In this case, the display device may divide the entire area of the touch screen based on a location of the button 220, as shown in FIG. 19.

Figure 20:
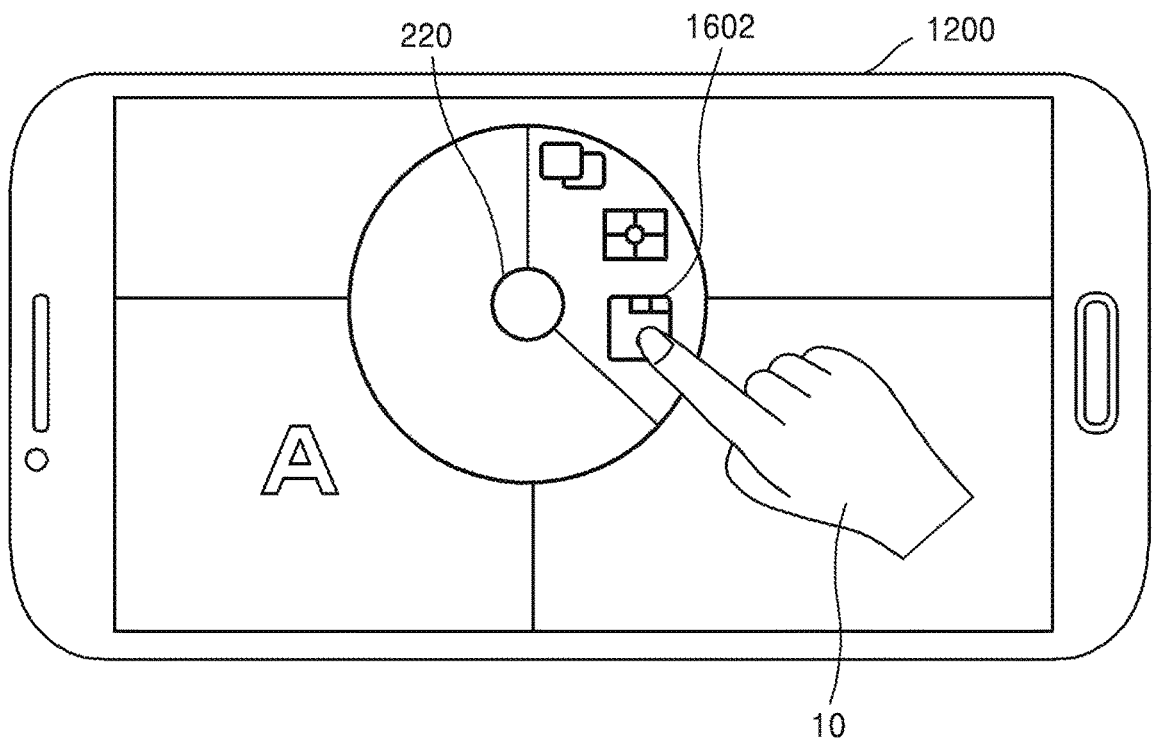

Alternatively, as shown in FIG. 20, when a tab mode button 1602 in the user interface 1600 is selected by a touch input of the user 10, the display device 1200 may display tabs for selecting application execution windows. For example, as shown in FIG. 21, the display device 1200 may display the tabs for selecting the application execution windows on the touch screen. The display device 1200 may display an application execution window corresponding to a selected tab on the touch screen. Also, according to some embodiments, when a user input is received via the user interface 1600, the display device 1200 may perform an operation according to the received user input, and display the button 220 at an edge of the touch screen. When the button 220 is moved to the edge of the touch screen as shown in FIG. 21, the button 220 does not cover an application execution screen.

Figure 22:
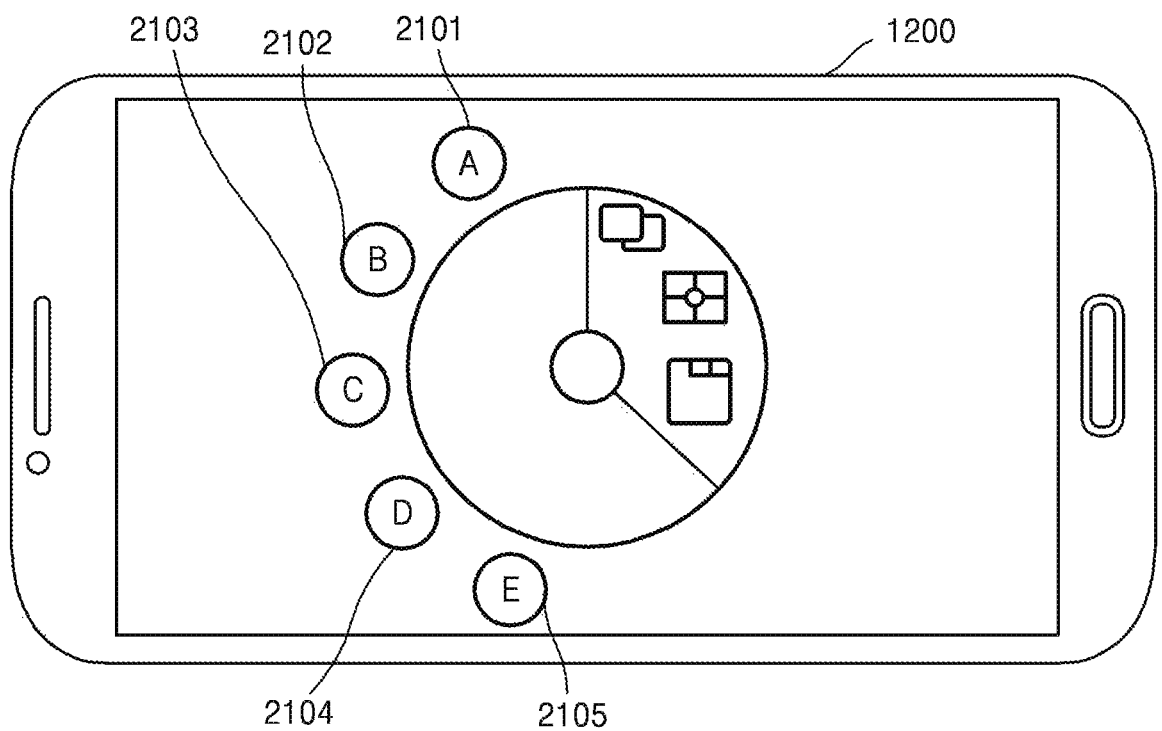
Figure 23:
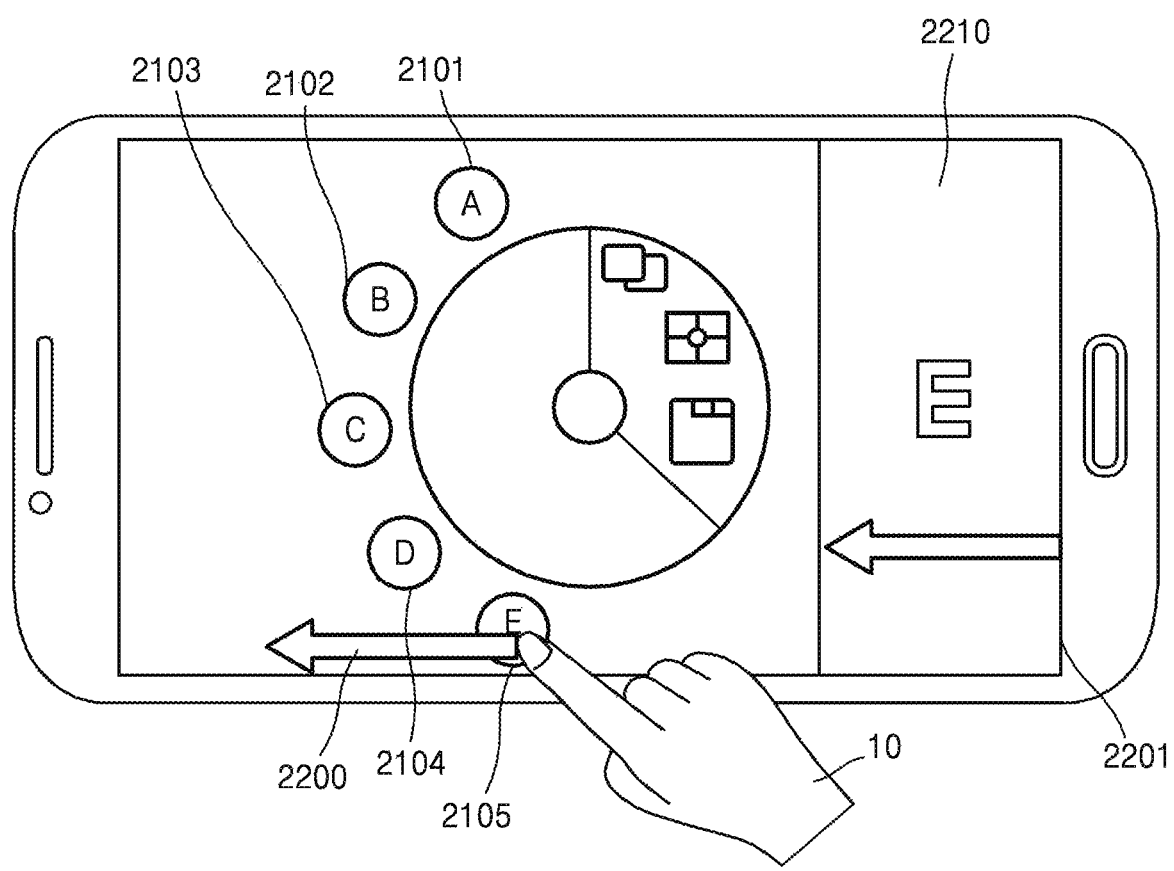

FIGS. 22 and 23 are exemplary diagrams of a display device displaying an application execution window, according to some embodiments.

According to some embodiments, the display device 1200 may display application execution icons around a button. The application execution icons may respectively represent applications that are being executed or applications installed in the display device 1200. For example, as shown in FIG. 22, the display device 1200 may display application execution icons 2101, 2102, 2103, 2104, and 2105.

When the display device 1200 receives a user input with respect to the displayed application execution icons, the display device 1200 may display an application execution window that corresponds to the application execution icons. For example, as shown in FIG. 23, the user 10 may drag the application execution icon 2105 corresponding to an E application in a direction 2200. When a touch input of dragging the application execution icon 2105 is received, the display device 1200 may display an execution window 2210 of the E application from an edge 2201 in a direction that is opposite to a direction of the drag input.

Figure 24:
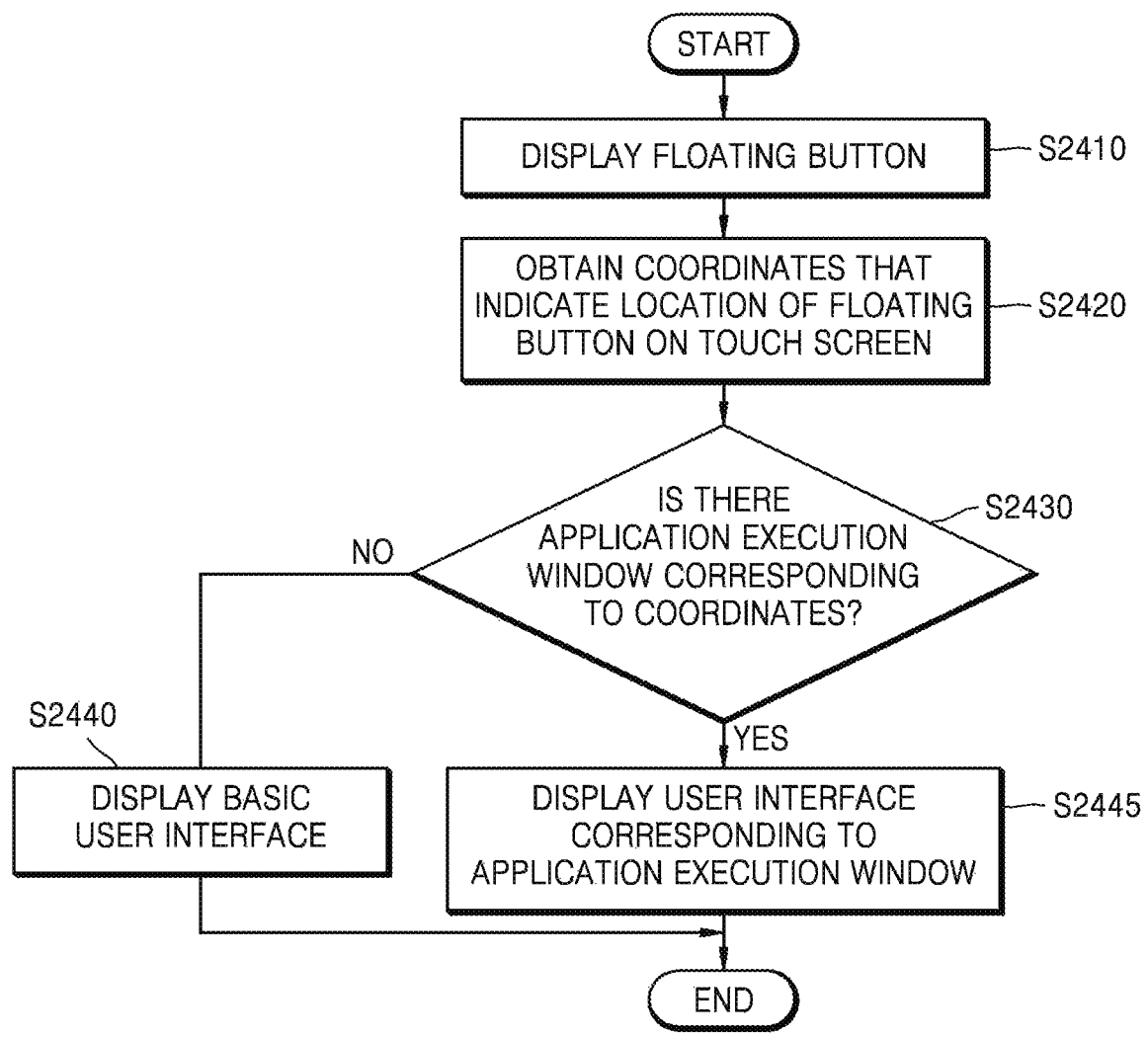
FIG. 24 is a flowchart of a process of displaying a user interface by using a display device, according to some embodiments.

FIG. 24 is a flowchart of a process of displaying a user interface by using a display device, according to some embodiments.

First, the display device may display a floating button on a touch screen (S2410). The floating button may refer to an object that is displayed "on top" in front of content (e.g., an application execution window) displayed by the display device, and moved according to an input of a user. For example, the floating button may be a semi-transparent icon that is moved when a drag input is received from the user.

Next, the display device may obtain coordinates that indicate a display location of the floating button on the touch screen (S2420). For example, the display device may obtain a coordinates that indicate a location of the center of the floating button. However, embodiments are not limited thereto. A coordinates obtain method of the display device may vary according to embodiments. The display device may determine whether there is an application execution window corresponding to the coordinates obtained in operation S2420 (S2430).

Figure 25:
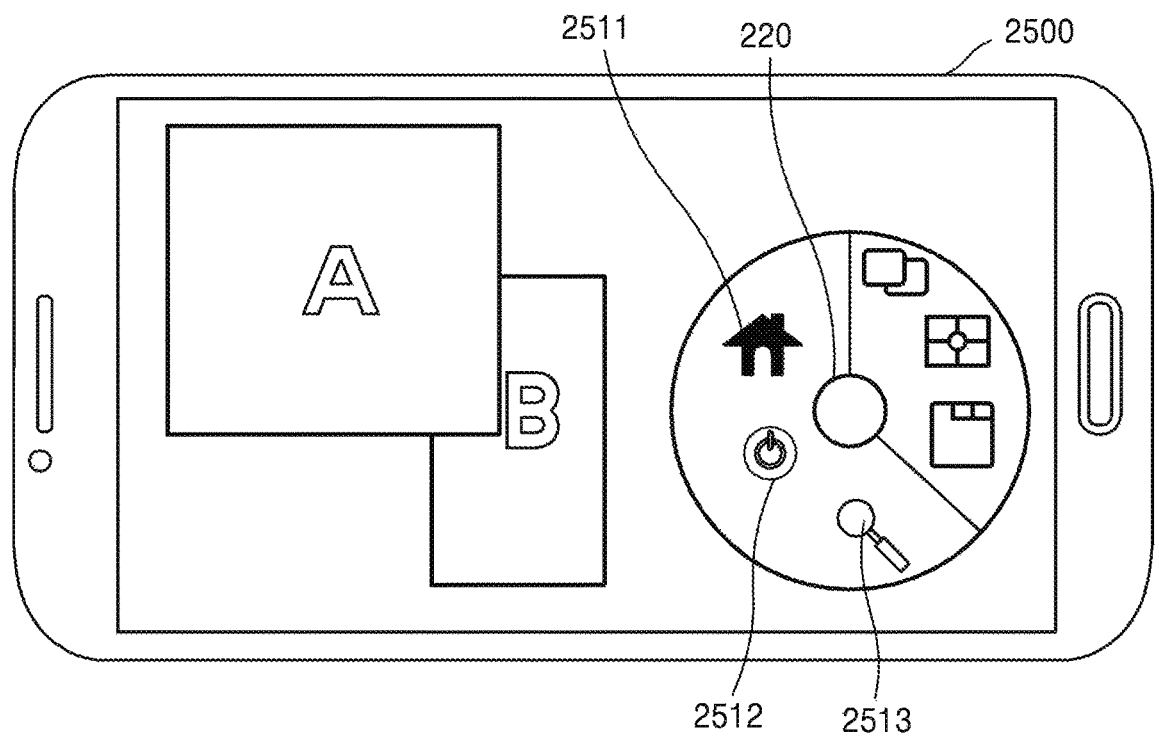
FIGS. 25 to 27 are exemplary diagrams of a display device displaying a user interface, according to some embodiments.
Figure 26:
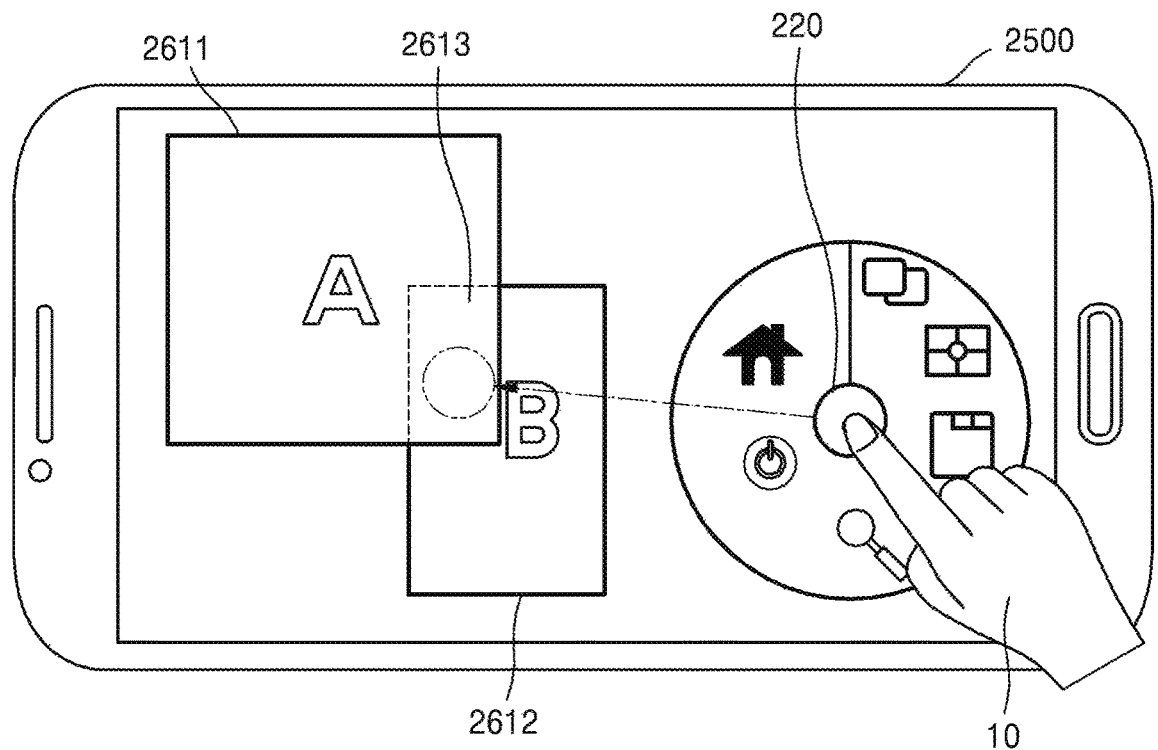

When there is no application execution window corresponding to the coordinates obtained in operation S2420, the display device may display a basic user interface (S2440). FIG. 25 is an exemplary diagram of a display device 2500 displaying a basic user interface, according to some embodiments. When the button 220 is located in a region where application execution windows are not displayed, the display device 2500 may display a basic user interface around the button 220 as shown in FIG. 25. For example, the display device 2500 may display a user interface, which includes a home button 2511, a power button 2512, and a search button 2513, around the button 220.

Figure 27:
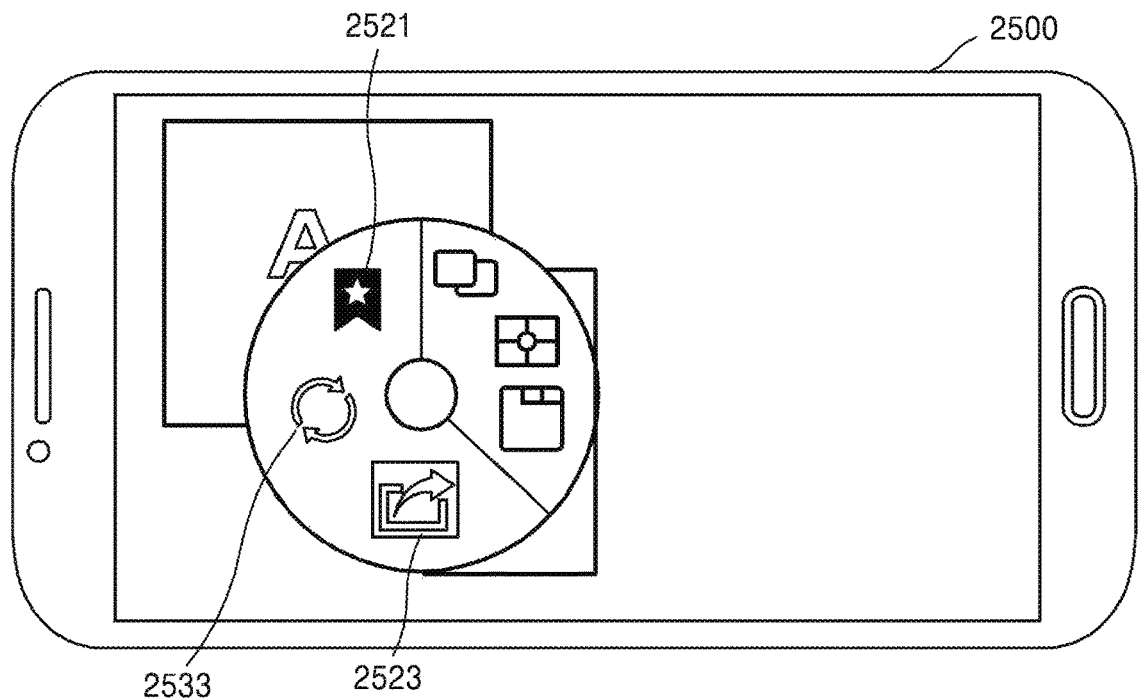

Also, where there is an application execution window corresponding to the coordinates obtained in operation S2420, the display device may display a user interface that corresponds to the application execution window (S2445). FIG. 25 is an exemplary diagram of the display device 2500 receiving an input of dragging the button 220, according to some embodiments. As shown in FIG. 25, from the user 10, the display device 2500 may receive an input of dragging the button 220 on a touch screen of the display device 2500 to a region 2613 that corresponds to an A application 2611 and a B application 2612. As shown in FIG. 25, when there are a plurality of applications that correspond to coordinates of the button 220 that is moved, a user interface that corresponds to an application at the top of an activity stack may be displayed from among the plurality of applications. FIG. 27 is an exemplary diagram of the display device displaying a user interface that corresponds to an application corresponding to coordinates of the button 220, according to some embodiments. When the button 220 is located in the region 2613 that corresponds to the A application 2611 and the B application 2612, the display device 2500 may display a user interface that corresponds to the A application 2611 that is at an upper part of an activity stack than the B application 2612. For example, when the A application 2611 is an Internet browser, the display device 2500 may display a user interface that includes a bookmark button 2521, a refresh button 2522, and a share button 2523.

Figure 28:
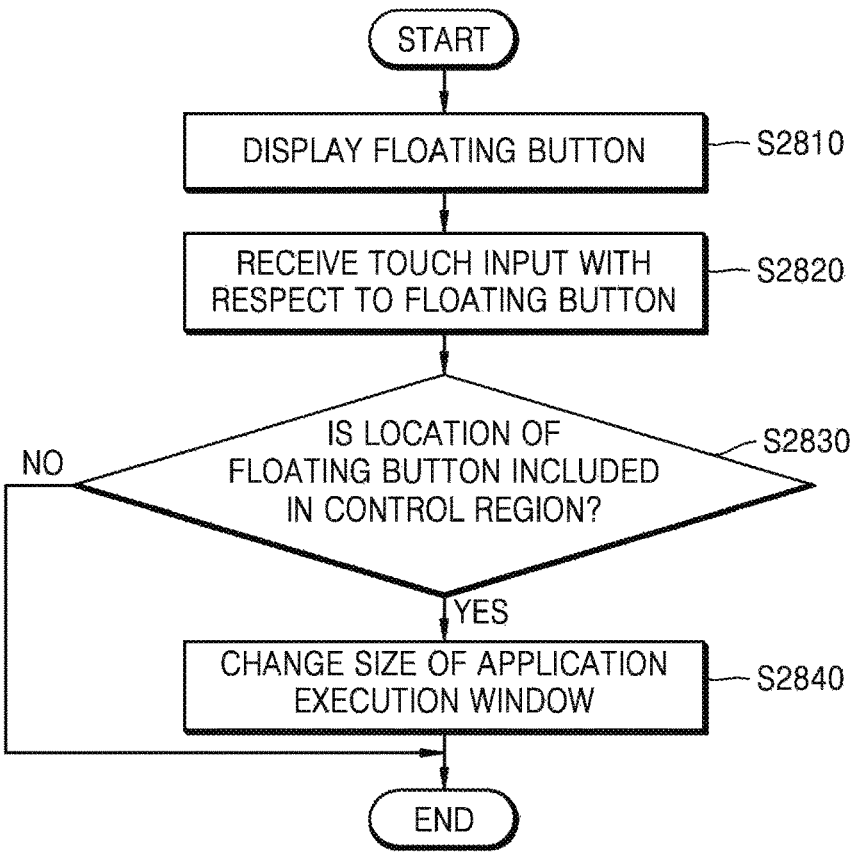
FIG. 28 is a flowchart of a process of displaying an application execution window by using a display device, according to some embodiments.

FIG. 28 is a flowchart of a process of displaying an application execution window by using a display device, according to some embodiments.

First, the display device may display a floating button on a touch screen (S2810). The display device may receive a touch input with respect to the floating button (S2820). For example, the display device may receive an input of dragging the floating button. When a location of the floating button at a time point of receiving a touch input is within a control region (S2830), the display device may change a size of the application execution window (S2840).

FIGS. 29 to 33 are exemplary diagrams of a display device displaying an application execution window, according to some embodiments.

Figure 29:
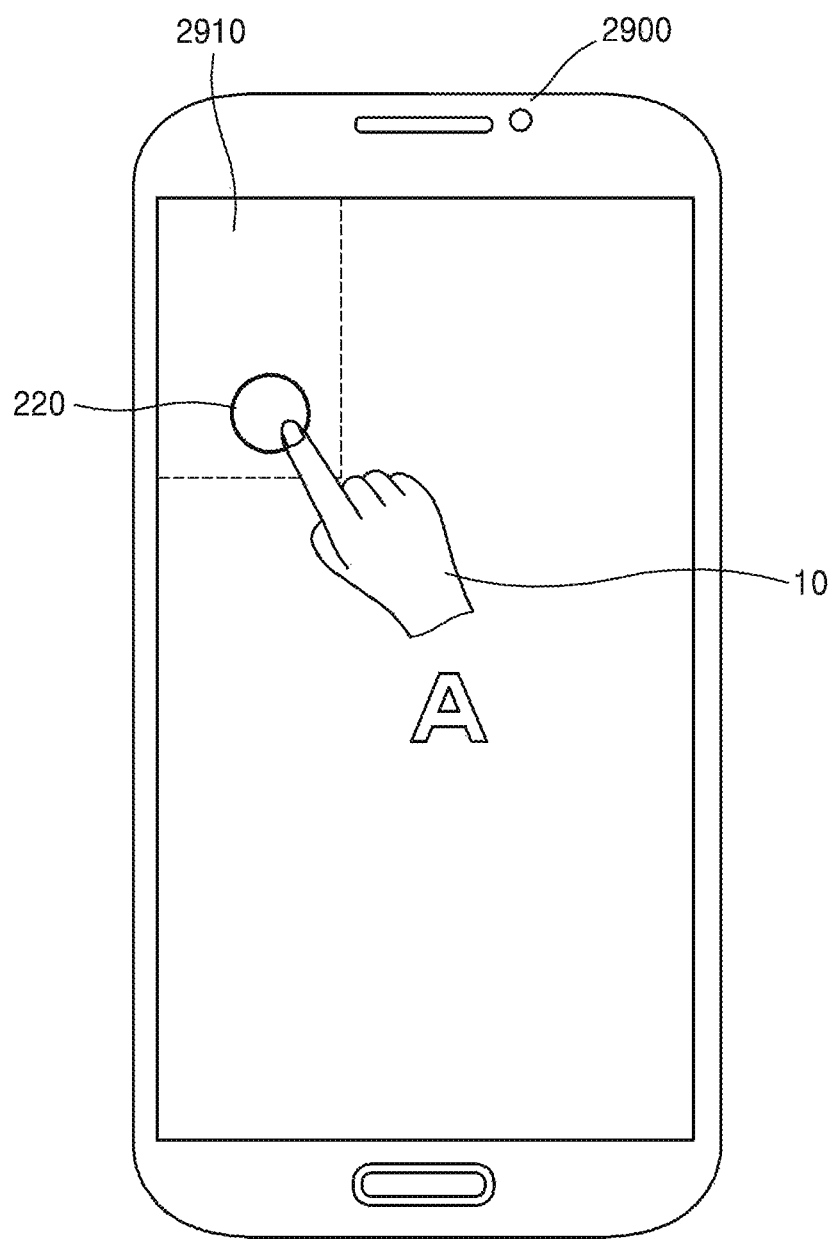
FIGS. 29 to 33 are exemplary diagrams of a display device displaying an application execution window, according to some embodiments.
Figure 30:
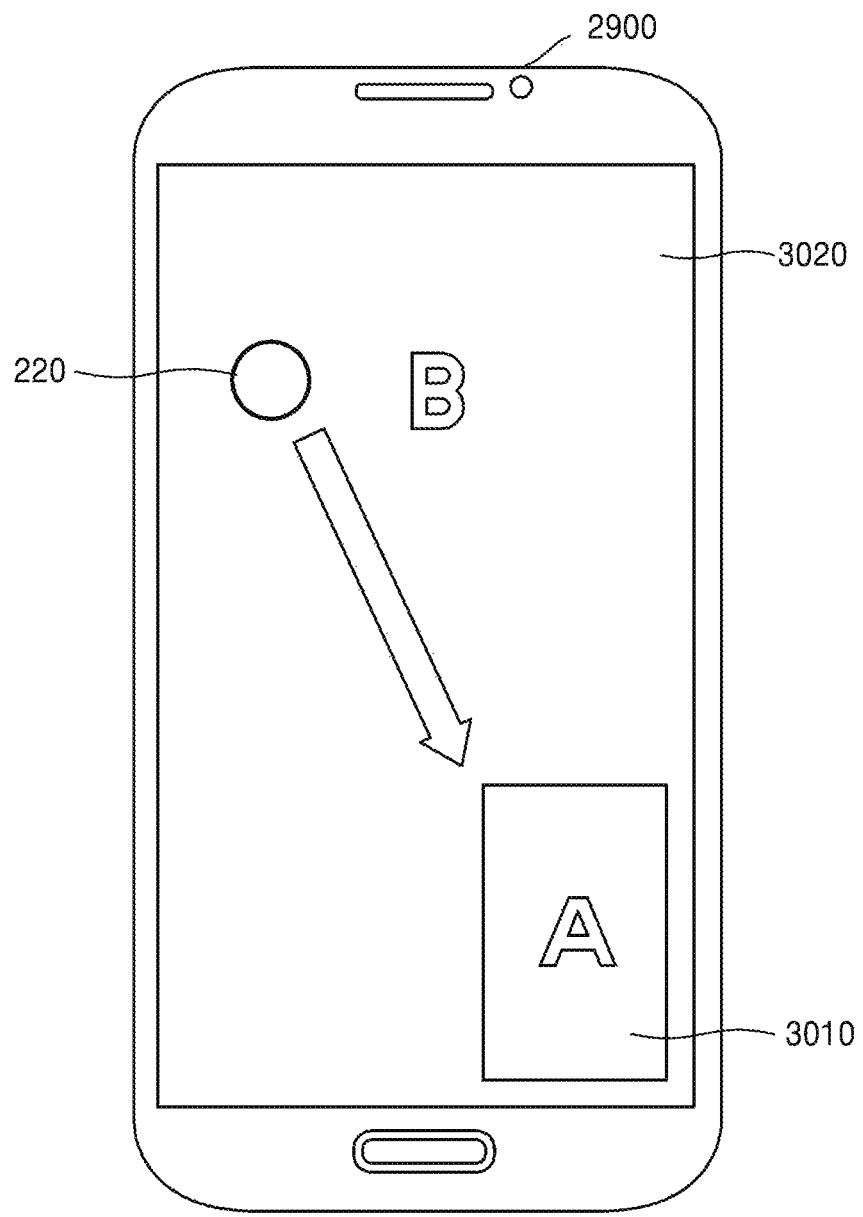

As shown in FIG. 29, in a state in which an execution screen of an A application is displayed on a touch screen, a display device 2900 may receive a touch input with respect to the button 220 in a control region 2910 from the user 10. For example, the touch input may be an input of dragging the button 220. In this case, the control region 2910 may be a portion of a region in which the execution screen of the A application is displayed. When the touch input with respect to the button 220 in the control region 2910 is received from the user 10, the display device 2900 may display an reduced execution screen 3010 of the A application, and display an execution screen 3020 of a B application in a region where the execution screen 3010 of the A application is not displayed, as shown in FIG. 30.

Figure 31:
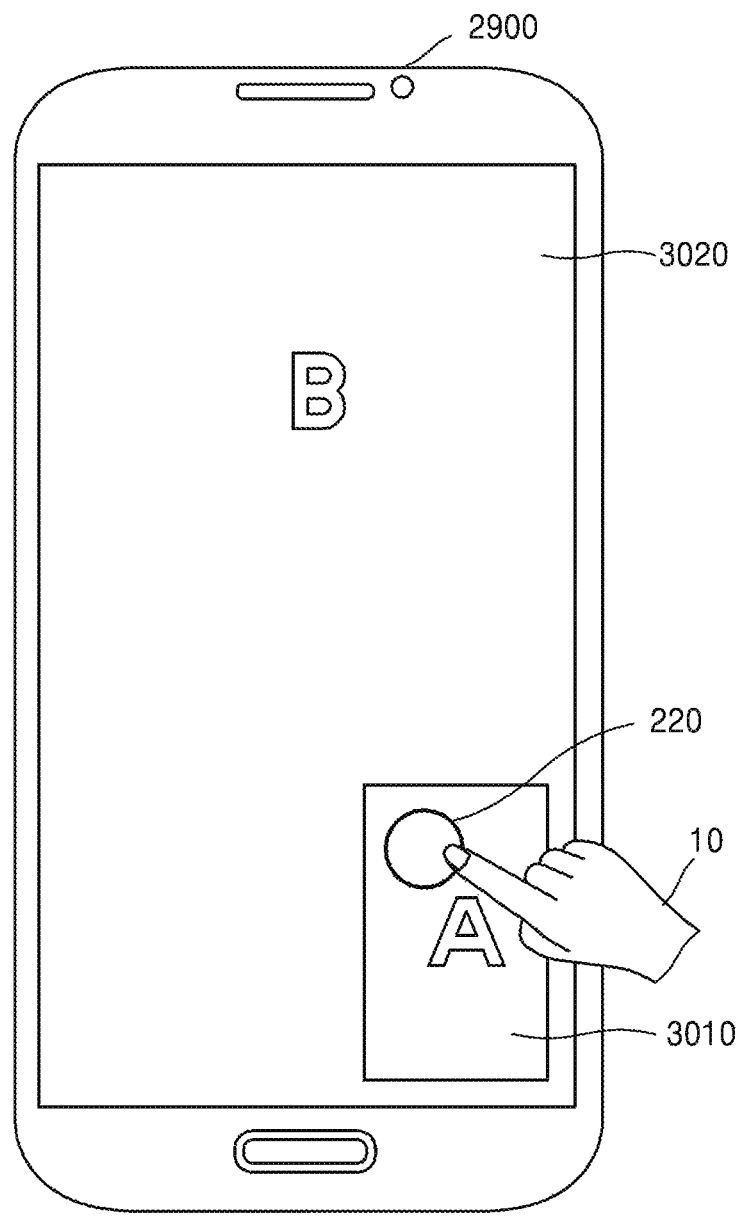
Figure 32:
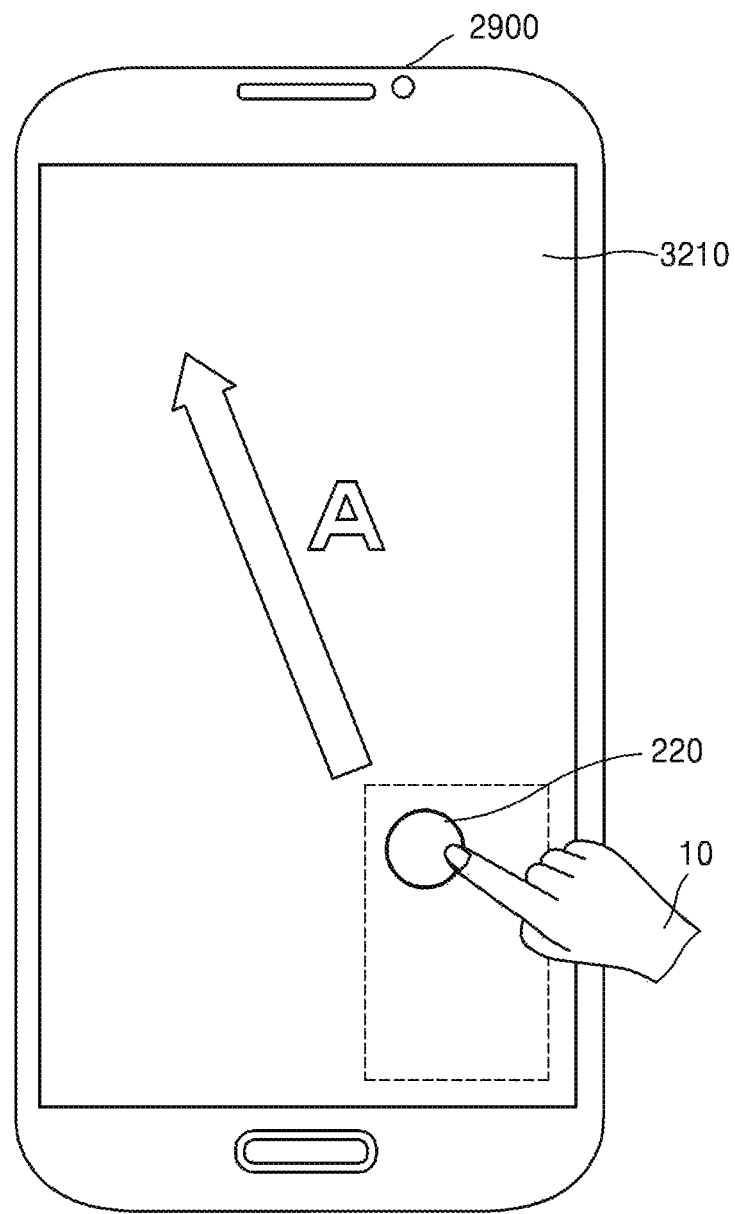
Figure 33:
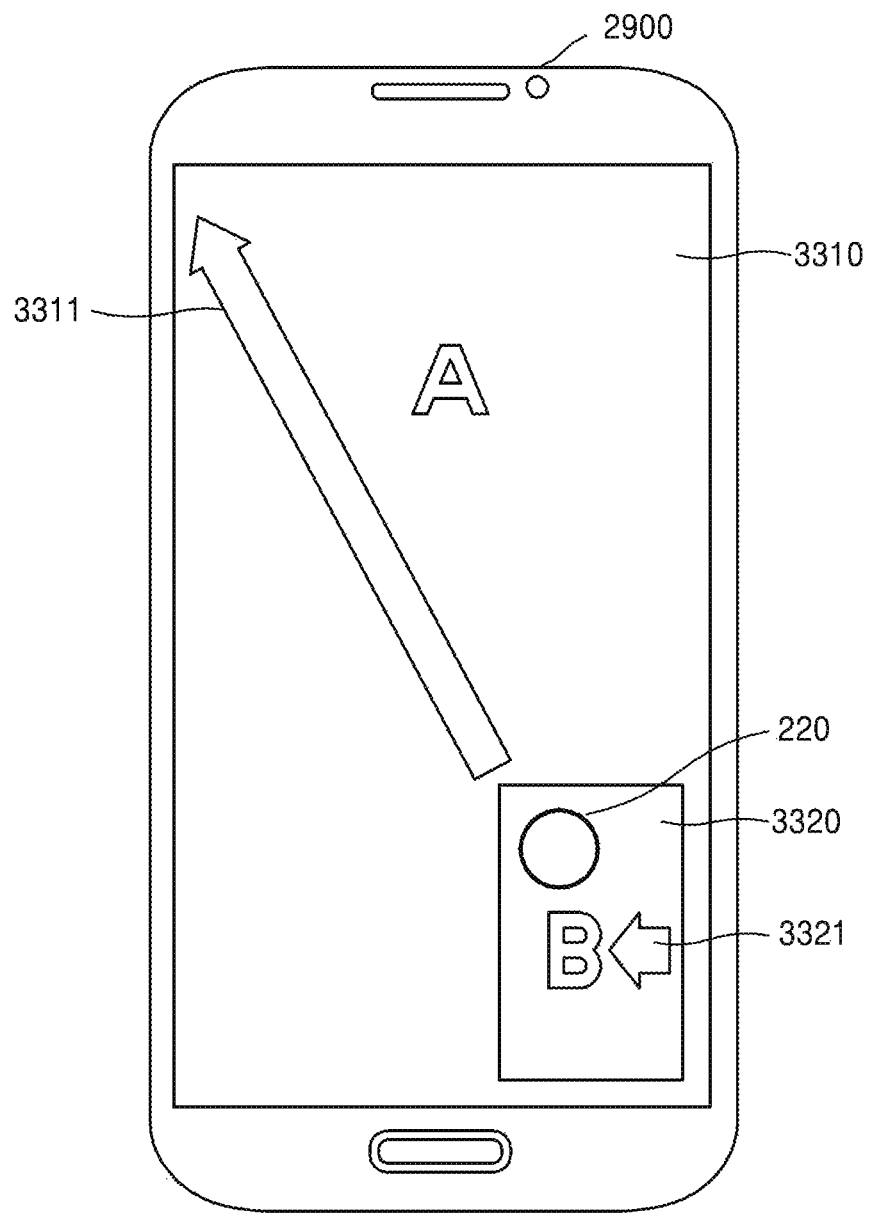

Alternatively, in a state in which the execution screen 3010 of the A application and the execution screen 3020 of the B application are displayed, the display device 2900 may receive a touch input with respect to the button 220 in a region displaying the execution screen 3010 of the A application from the user 10, as shown in as in FIG. 31. In this case, the region displaying the execution screen 3010 of the A application may be a control region. As shown in FIG. 32, when a touch input of dragging the button 220 is received from the user 10, the display device 2900 according to some embodiments may display an execution screen 3210 of the A application on the entire area of the touch screen. Alternatively, the display device 2900 according to other embodiments may display an animation of enlarging an execution screen 3310 of the A application in a first direction 3311. Also, an animation of moving an execution screen 3320 of the B application in a second direction 3321 may be displayed.

Figure 34:
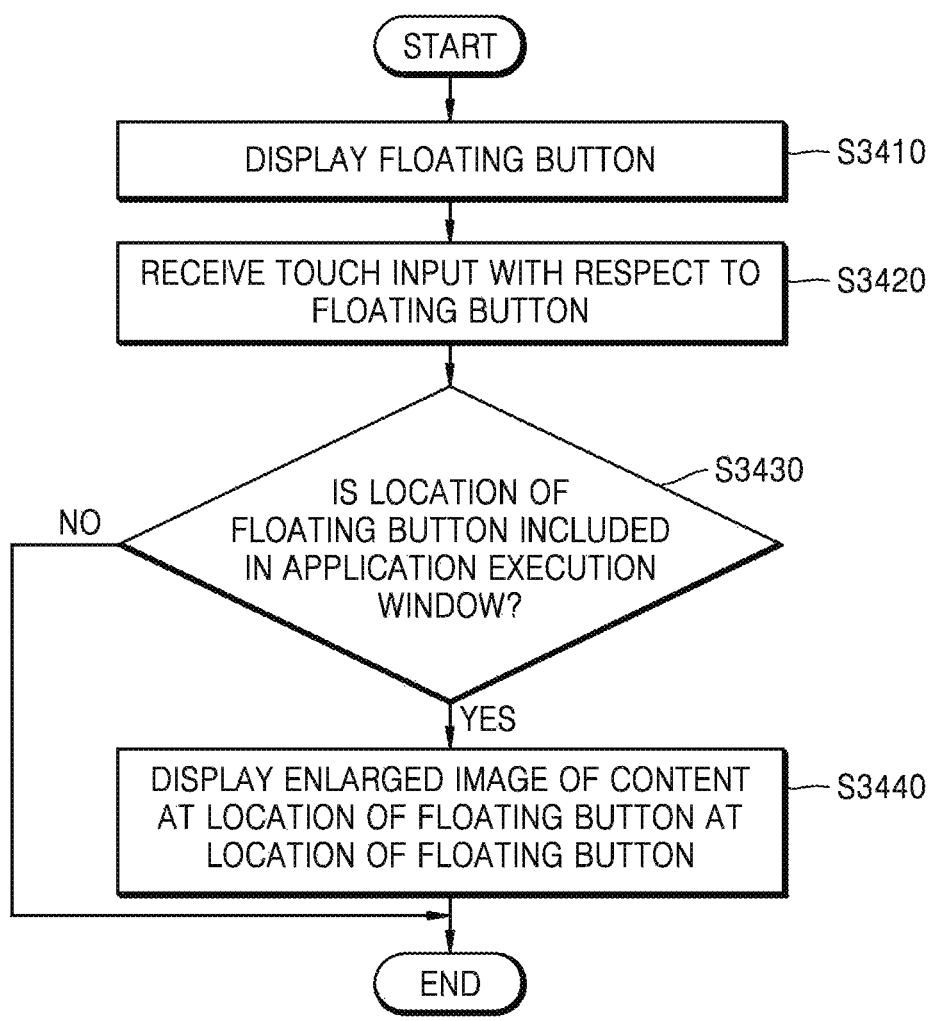
FIG. 34 is a flowchart of a process of providing an additional function by using a button, according to some embodiments.
Figure 35:
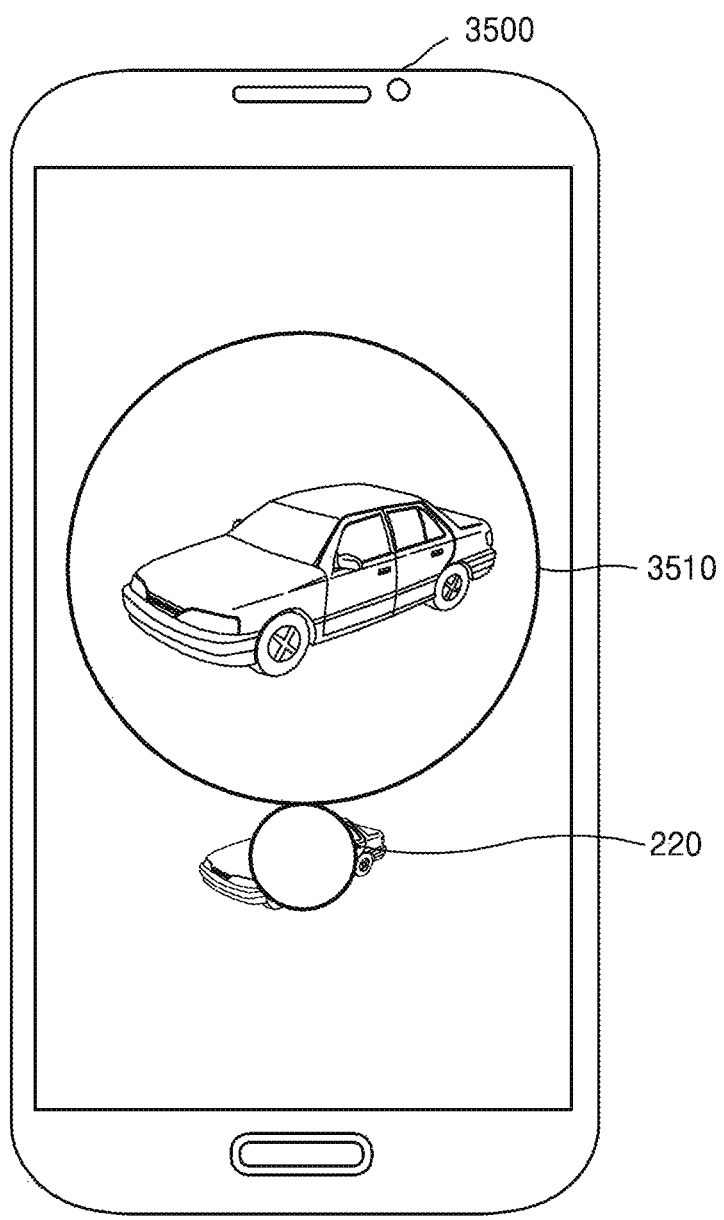
FIG. 35 is an exemplary diagram of a display device that provides an additional function by using a button, according to some embodiments.

FIG. 34 is a flowchart of a process of providing an additional function by using a button, according to some embodiments. Also, FIG. 35 is an exemplary diagram of a display device that provides an additional function by using a button, according to some embodiments.

First, the display device may display a floating button on a touch screen (S3410). The display device may receive a touch input with respect to the floating button (S3420). For example, the display device may receive an input of double touching the floating button. 'Double touching' may refer to an input of touching a button two times within a predetermined time.

When the touch input with respect to the floating button is received, when a location of the floating button is included in an application execution window (S3430), the display device may display, around the button, an enlarged image of content displayed at the location of the floating button (S3440). Referring to FIG. 35, a display device 3500 may display an enlarged image 3510 of content around the button 220. The content may refer to information displayed on a touch screen, for example, an image or a video.

One or more exemplary embodiments can be implemented through computer-readable code/instructions, such as a computer-executed program module, stored in/on a medium, e.g., a computer-readable medium. The computer-readable medium may be a random computer-accessible medium, and may include volatile media, non-volatile media, separable media and/or non-separable media. Also, the computer-readable medium may correspond to any computer storage media and communication media. The computer storage media includes volatile media, non-volatile media, separable media and/or non-separable media which are implemented by using a method or technology for storing information, such as computer-readable code/instructions, data structures, program modules, or other data. The communication media generally includes computer-readable code/instructions, data structures, program modules, or other data of modulated data signals such as carrier waves, or other transmission mechanisms, and random information transmission media. Examples of the computer storage media include ROMs, RAMs, flash memories, CDs, DVDs, magnetic disks, or magnetic tapes. According to an embodiment of the present invention, a program may be recorded in a computer storage medium, the program which is for executing displaying an application execution window in each of a plurality of regions on a touch screen, displaying a button on at least one boundary line that divides the plurality of regions, receiving an input of selecting the button, and based on the input, displaying, on a predetermined region from among the plurality of regions, a list of at least one application that is executed in the predetermined region.

It should be understood that the exemplary embodiments described therein should be considered in a descriptive sense only and not for purposes of limitation. Descriptions of features or aspects within each embodiment should typically be considered as available for other similar features or aspects in other embodiments. For example, a single element may be separately implemented, and separate elements may be implemented in a combined form.

The scope of the present invention is defined not by the detailed description above but by the appended claims, and the meaning and the scope of the claims and all differences within the scope will be construed as being included in the present invention.

The invention claimed is:

1. A method of executing an application by using a display device that comprises a touch screen, the method comprising:
    displaying an application execution window in each of a plurality of regions on the touch screen;
    displaying a selectable button on at least one boundary line that divides the plurality of regions on the touch screen;
    receiving an input of selecting the selectable button;
    receiving a second input of selecting an active region from among the plurality of regions;
    in response to the second input, causing an indicator, on the selectable button, to be displayed indicating a direction of the active region displayed on the touch screen, wherein the indicator on the selectable button is displayed on the touch screen along with the active region and is used for adjusting sizes of the plurality of regions by moving the at least one boundary line;
    displaying, based on the input, on the active region from among the plurality of regions, a list of at least one icon that represents at least one application that is executable in the active region;
    receiving a touch input of dragging an icon in the list of the at least one icon;
    dividing the active region based on a location of the selectable button and a location where the touch input ends; and
    in response to the touch input, executing the at least one application corresponding to the dragged icon in the divided region,
    wherein a portion of the selectable button that includes the indicator is located over the active region, and
    wherein another portion of the selectable button, which is separate from the indicator, is located over another region among the plurality of regions.

2. The method of claim 1, wherein the active region is controllable by an input from a user.

3. The method of claim 2, wherein the active region is a region that is a most recent selection by the user from among the plurality of regions before receiving the input of selecting the selectable button.

4. The method of claim 1, further comprising:
    in response to the touch input being received, displaying an execution window of the at least one application corresponding to the dragged icon on the divided region.

5. The method of claim 1, wherein the displaying of the list further comprises displaying, on the active region, an icon that represents an operation related to an application execution window displayed in the active region.

6. The method of claim 5, wherein the icon comprises at least one of a capture button that captures the application execution window displayed in the active region, a close button that closes the application execution window displayed in the active region, or a full screen button that displays the application execution window displayed in the active region on an entire area of the touch screen.

7. A display device comprising:
    a touch screen for:
        displaying an application execution window in each of a plurality of regions,
        displaying a selectable button on at least one boundary line that divides the plurality of regions,
        receiving an input of selecting the selectable button,
        receiving a second input of selecting an active region from among the plurality of regions, and
        in response to the second input, causing an indicator, on the selectable button, indicating a direction of the active region displayed on the touch screen,
    wherein the indicator on the selectable button is displayed on the touch screen along with the active region and is used for adjusting sizes of the plurality of regions by moving the at least one boundary line; and a controller for:

controlling, based on the input, the touch screen such that a list of at least one icon that represents at least one application executed in the active region is displayed on the active region, receiving a touch input of dragging an icon in the list of the at least one icon, dividing the active region based on a location of the selectable button and a location where the touch input ends, and in response to the touch input, executing the at least one application corresponding to the dragged icon in the divided region, wherein a portion of the selectable button that includes the indicator is located over the active region, and wherein another portion of the selectable button, which is separate from the indicator, is located over another region among the plurality of regions.

8. The display device of claim 7, wherein the active region is controllable by an input from a user.

9. The display device of claim 7, wherein, in response to the touch input being received, the controller controls the touch screen such that an execution window of the at least one application corresponding to the dragged icon is displayed on the divided region.

10. The display device of claim 7, wherein the touch screen further displays, on the active region, an icon that represents an operation related to an application execution window displayed in the active region.

11. The display device of claim 10, wherein the icon comprises at least one of a capture button that captures the application execution window displayed in the active region, a close button that closes the application execution window displayed in the active region, or a full screen button that displays the application execution window displayed in the active region on an entire area of the touch screen.

12. A non-transitory computer-readable recording medium having recorded thereon a program, which, when executed by a computer, performs the method of claim 1.

13. The method of claim 1, wherein the selectable button overlaps the plurality of regions.

14. The display device of claim 7, wherein the selectable button overlaps the plurality of regions.

* * * * *